United States Patent
Hayashi

(10) Patent No.: US 9,307,211 B2
(45) Date of Patent: Apr. 5, 2016

(54) IMAGE PROCESSING SYSTEM, TRANSMITTING-SIDE DEVICE AND RECEIVING-SIDE DEVICE

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/564,312

(22) Filed: Dec. 9, 2014

(65) Prior Publication Data

US 2015/0138398 A1    May 21, 2015

Related U.S. Application Data

(63) Continuation of application No. PCT/JP2013/061872, filed on Apr. 23, 2013.

(30) Foreign Application Priority Data

Jun. 13, 2012 (JP) .................................. 2012-133938

(51) Int. Cl.
*H04N 9/64* (2006.01)
*H04N 1/64* (2006.01)
(Continued)

(52) U.S. Cl.
CPC ............... *H04N 9/646* (2013.01); *H04N 1/648* (2013.01); *H04N 5/77* (2013.01); *H04N 9/045* (2013.01); *H04N 9/65* (2013.01); *H04N 9/793* (2013.01); *H04N 9/8042* (2013.01); *H04N 9/873* (2013.01)

(58) Field of Classification Search
CPC ...................................................... H04N 9/045
See application file for complete search history.

(56) References Cited

U.S. PATENT DOCUMENTS

| 6,546,157 B1 * | 4/2003 | Okuno .................. G06T 3/4007 358/525 |
| 8,482,628 B1 * | 7/2013 | Khan et al. .................. 348/222.1 |

(Continued)

FOREIGN PATENT DOCUMENTS

| JP | 2004-304712 A | 10/2004 |
| JP | 2009-147875 A | 7/2009 |

(Continued)

OTHER PUBLICATIONS

International Search Report issued in PCT/JP2013/061872 dated Jun. 25, 2013.

(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

Provided is an image processing system capable of coping with data which is obtained in a new color filter array, and making full use of the performance of a receiving-side device by reducing the influence of a difference in the performance of the receiving-side device on an image quality. An image processing system 100 includes a transmitting-side device 101 and a receiving-side device 102. The transmitting-side device 101 generates intermediate data by preprocessing RAW data, generates three-plane color data by processing synchronization of the intermediate data, and outputs placement information for specifying pixel positions corresponding to the three-plane color data and the intermediate data. The receiving-side device 102 restores the intermediate data using the three-plane color data and the placement information from the transmitting-side device 101, and generates the three-plane color data from the restored intermediate data.

5 Claims, 43 Drawing Sheets

(51) Int. Cl.
*H04N 9/04* (2006.01)
*H04N 9/65* (2006.01)
*H04N 9/873* (2006.01)
*H04N 5/77* (2006.01)
*H04N 9/793* (2006.01)
*H04N 9/804* (2006.01)

(56) References Cited

U.S. PATENT DOCUMENTS

2004/0196381 A1  10/2004  Matsuzaka
2009/0324099 A1  12/2009  Hayashi
2010/0195929 A1   8/2010  Inoue
2012/0294582 A1  11/2012  Jannard et al.
2013/0322753 A1*  12/2013  Lim et al. .................. 382/167

FOREIGN PATENT DOCUMENTS

JP   2010-035143 A    2/2010
JP   2010-524408 A    7/2010
JP   2010-226365 A   10/2010
WO   WO 2008/075745 A1   6/2008

OTHER PUBLICATIONS

Written Opinion of the International Searching Authority issued in PCT/JP2013/061872 dated Jun. 25, 2013.

* cited by examiner

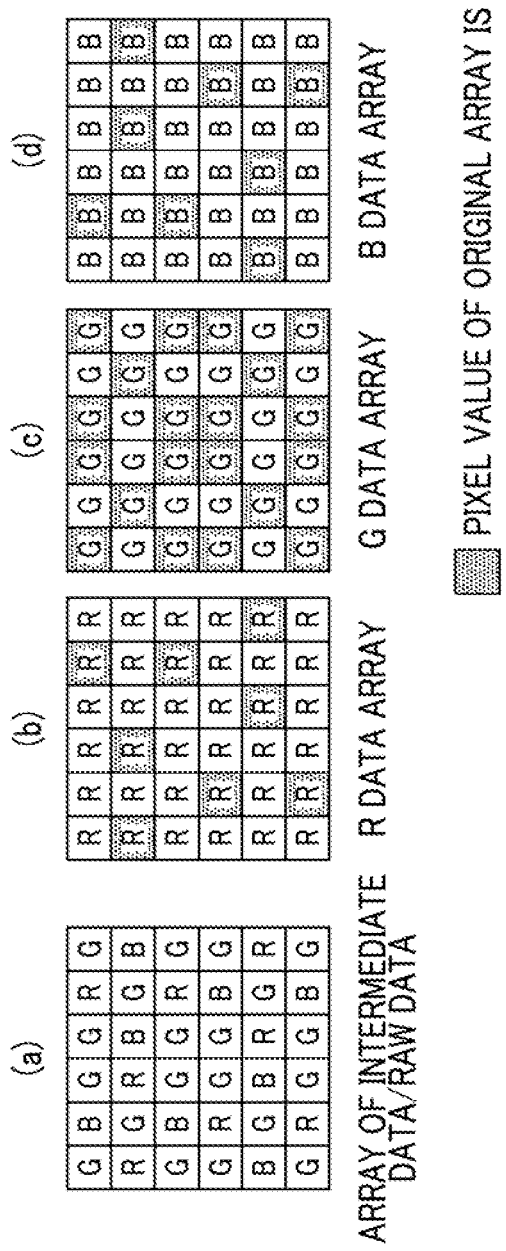

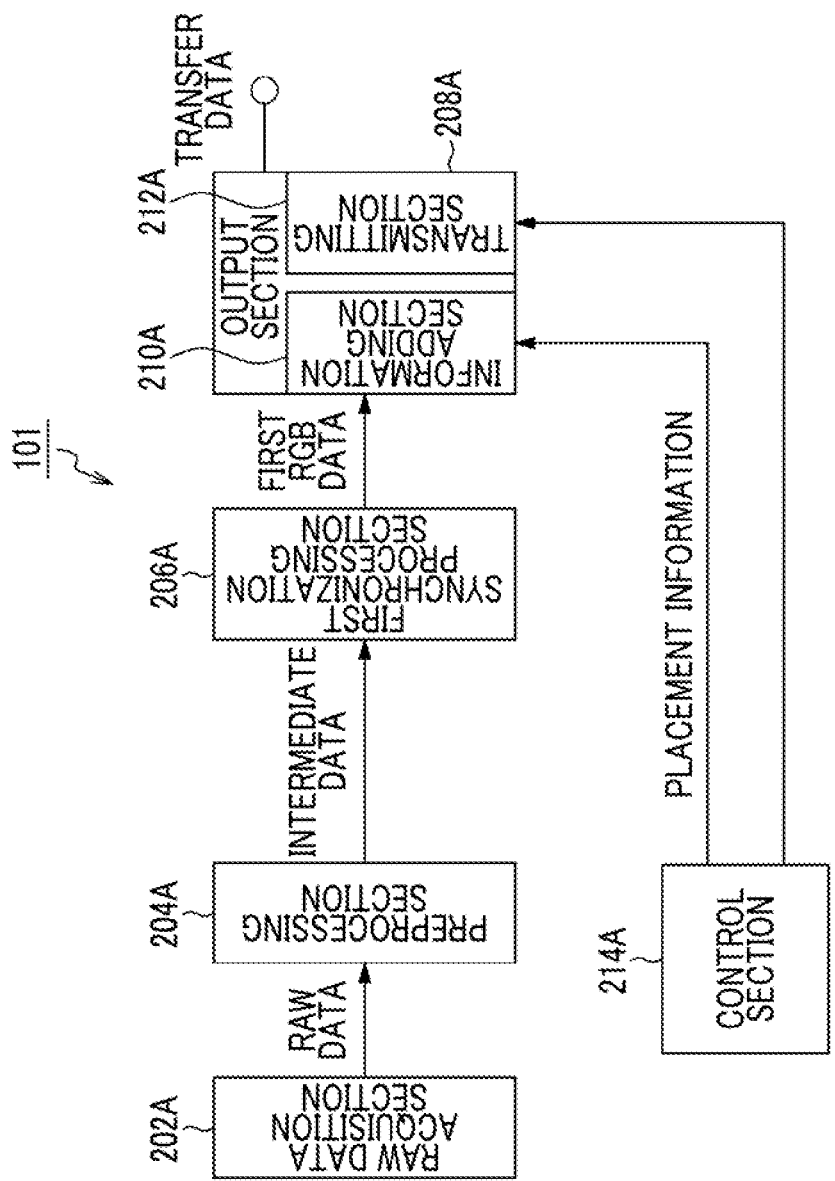

IMAGE PROCESSING SYSTEM, TRANSMITTING-SIDE DEVICE AND RECEIVING-SIDE DEVICE

CROSS REFERENCE TO RELATED APPLICATIONS

This application is a Continuation of PCT International Application No. PCT/JP2013/061872 filed on Apr. 23, 2013, which claims priority under 35 U.S.C §119(a) to Patent Application No. 2012-133938 filed in Japan on Jun. 13, 2012, all of which are hereby expressly incorporated by reference into the present application.

BACKGROUND OF THE INVENTION

1. Field of the Invention

The present invention relates to an image processing system, a transmitting-side device and a receiving-side device, and particularly relates to a technique for performing image processing on various types of image data (such as RAW data).

2. Description of the Related Art

When an image of a subject is captured by digital cameras, portable terminals having an image capture device, or the like and image processing is performed, a method of using digital image data (RAW data), obtained by A/D-converting the amount of light picked up by an image pickup element, in image processing as it is, and a method of applying some kind of processing (for example, processing of conversion from RAW data to RGB data) to RAW data are considered.

For example, JP2009-147875A discloses an image reading display device that displays an image by switching RGB data or RAW data depending on a display mode to be selected. In such a device of JP2009-147875A, when the RAW data is corrected to generate the RGB data, the pixel values of the RAW data are used as the RGB data in a case where color pixel data corresponding to the RAW data (image pickup pixel values) is present, and the RGB data is obtained from the pixel values of peripheral RAW data in a case where color pixel data corresponding to the RAW data is present.

JP2010-226365A discloses a white balance processing method of acquiring a raw image file (RAW data) to which image pickup information is attached to specify an image pickup model, and adjusting the white balance of image data on the basis of the specified image pickup model.

SUMMARY OF THE INVENTION

In recent years, a new color filter array has been proposed. However, when image processing is performed, it is necessary to perform optimum processing according to a color filter array in order to obtain a better image quality. In addition, in order to process data which is obtained through color filters of a new array, signal processing corresponding to the new color filter array may be required. In this case, it is necessary to prepare development software or receiving-side appliances capable of performing signal processing corresponding to a new color filter array, but a commensurate load is required for the implementation of such software and the preparation of the appliances.

In addition, there is a tendency for a new color filter array to become more complicated than a Bayer array of the related art, and signal processing corresponding to the aforementioned new color filter array is also likely to be complicated in conformity thereto. In this case, an image quality changes depending on a difference in the performance of a device that performs signal processing, and the image quality varies depending on the device that performs signal processing.

In addition, in spite of RAW development or the like being able to be performed at the data receiving side, the performance of the data receiving side cannot be used when RGB data (such as JPEG and TIFF) or the like, for example, is transmitted at the transmitting side.

The present invention is contrived in view of such circumstances, and an object thereof is to provide an image processing system and a device constituting the same which are capable of coping with data obtained in a new color filter array, and making full use of the performance of a receiving-side device by reducing the influence of a difference in the performance of the receiving-side device on an image quality.

In order to achieve the above-mentioned object, according to an aspect of the present invention, there is provided an image processing system including: a transmitting-side device; and at least one receiving-side device of a first receiving-side device compatible with RAW development and a second receiving-side device incompatible with RAW development, wherein the transmitting-side device includes a RAW data acquisition unit configured to acquire unprocessed RAW data corresponding to a predetermined color filter array from a single-plate color image pickup element having color filters of the color filter array arranged on a plurality of pixels which are arrayed two-dimensionally, a preprocessing unit configured to generate intermediate data before synchronization processing by performing preprocessing on the RAW data, a first synchronization processing unit configured to process synchronization of the intermediate data, and generate first three-plane color data, and an output unit configured to add placement information for specifying a pixel position of the intermediate data of each piece of color data to the first three-plane color data, and an output the resultant data, the first receiving-side device includes a first input unit configured to input the first three-plane color data and the placement information, an intermediate data extraction unit configured to extract the intermediate data from the first three-plane color data on the basis of the placement information, a second synchronization processing unit configured to process synchronization of the extracted intermediate data, and generate second three-plane color data, and a first post-processing unit configured to generate image data for recording or image data for display by performing processing after synchronization processing on the second three-plane color data, and the second receiving-side device includes a second input unit configured to input the first three-plane color data, and a second post-processing unit configured to generate image data for recording or image data for display by performing processing after synchronization processing on the first three-plane color data which is input.

Thereby, it is possible to perform appropriate processing on data which is obtained in a new color filter array, and to make full use of the performance of the receiving-side device by reducing the influence of a difference in the performance of the receiving-side device on an image quality.

According to another aspect of the present invention, there is provided an image processing system including: a transmitting-side device; and at least one receiving-side device of a first receiving-side device compatible with RAW development and a second receiving-side device incompatible with RAW development, wherein the transmitting-side device includes a RAW data acquisition unit configured to acquire unprocessed RAW data corresponding to a predetermined color filter array from a single-plate color image pickup element having color filters of the color filter array arranged on a plurality of pixels which are arrayed two-dimensionally, a first preprocessing unit configured to generate first intermediate data before synchronization processing by performing preprocessing on the RAW data, a restoration information acquisition unit configured to acquire restoration information for restoration to the RAW data from the first intermediate data, a first synchronization processing unit configured to process synchronization of the first intermediate data, and generate first three-plane color data, and an output unit configured to add the restoration information and placement information for specifying a pixel position of the first intermediate data of each piece of color data to the first three-plane color data, and output the resultant data, the first receiving-side device includes a first input unit configured to input the first three-plane color data, the placement information and the restoration information, an intermediate data extraction unit configured to extract the first intermediate data from the first three-plane color data on the basis of the placement information, a restoration processing unit configured to restore the RAW data from the first intermediate data extracted on the basis of the restoration information, a second preprocessing unit configured to generate second intermediate data before synchronization processing by performing preprocessing on the RAW data restored by the restoration processing unit, a second synchronization processing unit configured to process synchronization of the second intermediate data, and generate second three-plane color data, and a first post-processing unit configured to generate image data for recording or image data for display by performing processing after synchronization processing on the second three-plane color data, and the second receiving-side device includes a second input unit configured to input the first three-plane color data, and a second post-processing unit configured to generate image data for recording or image data for display by performing processing after synchronization processing on the first three-plane color data which is input.

Thereby, it is possible to perform appropriate processing on data which is obtained in a new color filter array, and to make full use of the performance of the receiving-side device by reducing the influence of a difference in the performance of the receiving-side device on an image quality.

Preferably, the output unit of the transmitting-side device adds the placement information and the intermediate data to the first three-plane color data, and outputs the resultant data, inputs the first three-plane color data, the placement information and the intermediate data to the input unit of the first receiving-side device, and includes intermediate data selection unit configured to select the intermediate data which is sent from the transmitting-side device, or intermediate data which is obtained from the intermediate data extraction unit, and the second synchronization processing unit performs synchronization processing on the intermediate data selected by the intermediate data selection unit, and generates the second three-plane color data.

In addition, preferably, the output unit of the transmitting-side device adds the placement information and the RAW data to the first three-plane color data, and outputs the resultant data, the input unit of the first receiving-side device inputs the first three-plane color data, the placement information and the RAW data, and includes RAW data selection unit configured to select the RAW data which is sent from the transmitting-side device, or RAW data which is obtained from the restoration processing unit, and the second preprocessing unit generates second intermediate data using the RAW data selected by the RAW data selection unit.

According to another aspect of the present invention, there is provided an image processing system including: a transmitting-side device; and at least one receiving-side device of a first receiving-side device compatible with RAW development and a second receiving-side device incompatible with RAW development, wherein the transmitting-side device includes a RAW data acquisition unit configured to acquire unprocessed RAW data corresponding to a predetermined color filter array from a single-plate color image pickup element having color filters of the color filter array arranged on a plurality of pixels which are arrayed two-dimensionally, a first preprocessing unit configured to generate first intermediate data before synchronization processing by performing preprocessing on the RAW data, a first synchronization processing unit configured to process synchronization of the first intermediate data to generate three-plane color data, by arranging the RAW data instead of intermediate data of the three-plane color data to generate first three-plane color data, and an output unit configured to add placement information for specifying a pixel position of the RAW data of each piece of color data to the first three-plane color data, and output the resultant data, the first receiving-side device includes an input unit configured to input the first three-plane color, data and the placement information, a RAW data extraction unit configured to extract the RAW data from the first three-plane color data on the basis of the placement information, a second preprocessing unit configured to preprocess the RAW data extracted by the RAW data extraction unit and generate second intermediate data, a second synchronization processing unit configured to process synchronization of the second intermediate data and generate second three-plane color data, and a first post-processing unit configured to generate image data for recording or image data for display by performing processing after synchronization processing on the second three-plane color data, and the second receiving-side device includes a second input unit configured to input the first three-plane color data, and a second post-processing unit configured to generate image data for recording or image data for display by performing processing after synchronization processing on the first three-plane color data which is input.

Thereby, it is possible to appropriately cope with data which is obtained in a new color filter array, and to make full use of the performance of the receiving-side device by reducing the influence of a difference in the performance of the receiving-side device on an image quality.

According to another aspect of the present invention, there is provided an image processing system including: a transmitting-side device; and at least one receiving-side device of a first receiving-side device compatible with RAW development and a second receiving-side device incompatible with RAW development, wherein the transmitting-side device includes a RAW data acquisition unit configured to acquire unprocessed RAW data corresponding to a predetermined color filter array from a single-plate color image pickup element having color filters of the color filter array arranged on a plurality of pixels which are arrayed two-dimensionally, a first preprocessing unit configured to generate first intermediate data before synchronization processing by performing preprocessing on the RAW data, a restoration information acquisition unit configured to acquire restoration information for restoration to the first intermediate data from the RAW data, a first synchronization processing unit configured to process synchronization of the first intermediate data to generate three-plane color data, by arranging the RAW data instead of intermediate data of the three-plane color data to generate first three-plane color data, and an output unit configured to add the restoration information and placement information for specifying a pixel position of the RAW data of each piece of color data to the first three-plane color data, and an output the resultant data, the first receiving-side device includes a first input unit configured to input the first three-plane color data, the placement information and the restoration information, a RAW data extraction unit configured to extract the RAW data from the first three-plane color data on the basis of the placement information, a first restoration processing unit configured to preprocess the RAW data extracted by the RAW data extraction unit on the basis of the restoration information, and generate second intermediate data, a second synchronization processing unit configured to process synchronization of the second intermediate data, and generate second three-plane color data, and a first post-processing unit configured to generate image data for recording or image data for display by performing processing after synchronization processing on the second three-plane color data, and the second receiving-side device includes an input unit configured to input the first three-plane color data, the placement information and the restoration information, a RAW data extraction unit configured to extract the RAW data from the first three-plane color data on the basis of the placement information, a second restoration processing unit configured to preprocess the RAW data extracted by the RAW data extraction unit on the basis of the restoration information, and generate third intermediate data, a RAW pixel correction processing unit configured to perform correction of replacing RAW pixels in the first three-plane color data with the third intermediate data, and generate third three-plane color data, and a second post-processing unit configured to generate image data for recording or image data for display by performing processing after synchronization processing on the third three-plane color data.

Preferably, the output unit of the transmitting-side device includes output unit configured to add the placement information and the RAW data to the first three-plane color data, and output the resultant data, and the input unit of the first receiving-side device inputs the first three-plane color data, the placement information and the RAW data, and includes a RAW data selection unit configured to select the RAW data, or RAW data which is obtained from the RAW data extraction unit.

In addition, preferably, the output unit of the transmitting-side device includes an output unit configured to add the placement information, the restoration information and the first intermediate data to the first three-plane color data, and output the resultant data, and the input unit of the first receiving-side device inputs the first three-plane color data, the placement information, the restoration information and the first intermediate data, and includes an intermediate data selection unit configured to select the first intermediate data or the second intermediate data.

In addition, preferably, the restoration information acquired by the restoration information acquisition unit of the transmitting-side device is difference data between the RAW data and the first intermediate data, or a processing content of the preprocessing.

In addition, preferably, the first receiving-side device includes a third post-processing unit configured to generate image data for recording or image data for display by performing processing after synchronization processing on the first three-plane color data, and a selection unit configured to select the image data for recording or the image data for display which is obtained from the first post-processing unit, or the image data for recording or the image data for display which is obtained from the third post-processing unit.

In addition, preferably, the transmitting-side device includes a selection unit configured to select at least a piece of data of the first three-plane color data and the intermediate data, and the output unit adds the placement information to the at least a piece of data selected by the selection unit, and outputs the resultant data.

In addition, preferably, the transmitting-side device includes a selection unit configured to select at least a piece of data of the first three-plane color data and the RAW data, and the output unit adds the placement information and the restoration information to the at least a piece of data selected by the selection unit, and outputs the resultant data.

In addition, preferably, the transmitting-side device selects at least a piece of data of the first three-plane color data and the RAW data, and the output unit adds the placement information to at least a piece of data selected by the intermediate data selection unit, and outputs the resultant data.

In addition, preferably, the transmitting-side device includes a selection unit configured to select at least a piece of data of the first three-plane color data and the first intermediate data, and the output unit adds the placement information and the restoration information to the at least a piece of data selected by the selection unit, and outputs the resultant data.

In addition, preferably, the first receiving-side device includes a RAW pixel correction processing unit configured to perform correction of replacing the RAW pixel in the first three-plane color data, using the second intermediate data which is obtained from the first restoration processing unit, and generate fourth three-plane color data, a third post-processing unit configured to generate image data for recording or image data for display by performing third post-processing on the fourth three-plane color data, and a selection unit configured to select the image data for recording or the image data for display which is obtained from the first post-processing unit, or the image data for recording or the image data for display which is obtained from the third post-processing unit.

In addition, in order to achieve the above-mentioned object, according to an aspect of the present invention, there is provided a transmitting-side device that outputs data and information for processing data obtained by an image pickup element to data capable of image display or recording, including: a RAW data acquisition unit configured to acquire unprocessed RAW data corresponding to a predetermined color filter array from a single-plate color image pickup element having color filters of the color filter array arranged on a plurality of pixels which are arrayed two-dimensionally; a preprocessing unit configured to generate intermediate data before synchronization processing by performing preprocessing on the RAW data; a synchronization processing unit configured to process synchronization of the intermediate data, and generate three-plane color data; and an output unit configured to add placement information for specifying a pixel position of the intermediate data of each piece of color data to the three-plane color data, and output the resultant data.

According to another aspect of the present invention, there is provided a transmitting-side device that outputs data and information for processing data obtained by an image pickup element to data capable of image display or recording, including: a RAW data acquisition unit configured to acquire unprocessed RAW data corresponding to a predetermined color filter array from a single-plate color image pickup element having color filters of the color filter array arranged on a plurality of pixels which are arrayed two-dimensionally; a preprocessing unit configured to generate intermediate data before synchronization processing by performing preprocessing on the RAW data; a synchronization processing unit configured to process synchronization of the intermediate data, and generate three-plane color data; a synchronization processing unit configured to process synchronization of the intermediate data, and generate three-plane color data; and an output unit configured to add the restoration information and placement information for specifying a pixel position of the intermediate data of each piece of color data to the three-plane color data, and output the resultant data.

In addition, according to another aspect of the present invention, there is provided a transmitting-side device that outputs data and information for processing data obtained by an image pickup element to data capable of image display or recording, including: a RAW data acquisition unit configured to acquire unprocessed RAW data corresponding to a predetermined color filter array from a single-plate color image pickup element having color filters of the color filter array arranged on a plurality of pixels which are arrayed two-dimensionally; a preprocessing unit configured to generate intermediate data before synchronization processing by performing preprocessing on the RAW data; a synchronization processing unit configured to process synchronization of the intermediate data to generate three-plane color data, by arranging the RAW data instead of intermediate data of the three-plane color data, and generate three-plane color data, and an output unit configured to add placement information for specifying a pixel position of the RAW data of each piece of color data to the three-plane color data, and output the resultant data.

In addition, according to another aspect of the present invention, there is provided a transmitting-side device that outputs data and information for processing data obtained by an image pickup element to data capable of image display or recording, including: a RAW data acquisition unit configured to acquire unprocessed RAW data corresponding to a predetermined color filter array from a single-plate color image pickup element having color filters of the color filter array arranged on a plurality of pixels which are arrayed two-dimensionally; a preprocessing unit configured to generate intermediate data before synchronization processing by performing preprocessing on the RAW data; a restoration information acquisition unit configured to acquire restoration information for restoration to the intermediate data from the RAW data; synchronization processing unit configured to process synchronization of the intermediate data to generate three-plane color data, by arranging the RAW data instead of intermediate data of the three-plane, color data, and generate three-plane color data; and an output unit configured to add the restoration information and placement information for specifying a pixel position of the RAW data of each piece of color data to the three-plane color data, and output the resultant data.

In addition, in order to achieve the above-mentioned object, according to an aspect of the present invention, there is provided a receiving-side device that generates intermediate data before synchronization processing by preprocessing unprocessed RAW data corresponding to a predetermined color filter array which is acquired from a single-plate color image pickup element having color filters of the color filter array arranged on a plurality of pixels which are arrayed two-dimensionally, and receives first three-plane color data generated by process synchronization of the intermediate data, and placement information for specifying a pixel position of the intermediate data of each piece of color data which is added to the first three-plane color data, including: a first input unit configured to input the first three-plane color data and the placement information; an intermediate data extraction unit configured to extract the intermediate data from the first three-plane color data on the basis of the placement information; a second synchronization processing unit configured to process synchronization of the extracted intermediate data, and generate second three-plane color data; and a post-processing unit configured to generate image data for recording or image data for display by performing processing after synchronization processing on the second three-plane color data.

In addition, according to another aspect of the present invention, there is provided a receiving-side device that generates first intermediate data before synchronization processing by preprocessing unprocessed RAW data corresponding to a predetermined color filter array which is acquired from a single-plate color image pickup element having color filters of the color filter array arranged on a plurality of pixels which are arrayed two-dimensionally, and receives first three-plane color data generated processing synchronization of the first intermediate data, placement information for specifying a pixel position of the first intermediate data of each piece of color data which is added to the first three-plane color data, and restoration information for restoration to the RAW data from the first intermediate data which is added to the first three-plane color data, including: a first input unit configured to input the first three-plane color data, the placement information and the restoration information, an intermediate data extraction unit configured to extract the first intermediate data from the first three-plane color data on the basis of the placement information, a restoration processing unit configured to restore the RAW data from the first intermediate data extracted on the basis of the restoration information, a second preprocessing unit configured to generate second intermediate data before synchronization processing by performing preprocessing on the RAW data restored by the restoration processing unit, a second synchronization processing unit configured to process synchronization of the second intermediate data, and generate second three-plane color data, and a post-processing unit configured to generate image data for recording or image data for display by performing processing after synchronization processing on the second three-plane color data.

In addition, according to another aspect of the present invention, there is provided a receiving-side device that generates first intermediate data before synchronization processing by preprocessing unprocessed. RAW data corresponding to a predetermined color filter array which is acquired from a single-plate color image pickup element having color filters of the color filter array arranged on a plurality of pixels which are arrayed two-dimensionally, generates three-plane color data processing synchronization of the first intermediate data, and receives first three-plane color data which is obtained by arranging the RAW data instead of intermediate data of the three-plane color data, and placement information for specifying a pixel position of the RAW data of each piece of color data which is added to the first three-plane color data, including: an input unit configured to input the first three-plane color data and the placement information; a RAW data extraction unit configured to extract the RAW data from the first three-plane color data on the basis of the placement information; a second preprocessing unit configured to preprocess the RAW data extracted by the RAW data extraction unit and generate second intermediate data; a second synchronization processing unit configured to process synchronization of the second intermediate data and generate second three-plane color data; and a post-processing unit configured to generate image data for recording or image data for display by performing processing after synchronization processing on the second three-plane color data.

In addition, according to another aspect of the present invention, there is provided a receiving-side device that generates first intermediate data before synchronization processing by preprocessing unprocessed RAW data corresponding to a predetermined color filter array which is acquired from a single-plate color image pickup element having color filters of the color filter array arranged on a plurality of pixels which are arrayed two-dimensionally, generates three-plane color data processing synchronization of the first intermediate data, and receives first three-plane color data which is obtained by arranging the RAW data instead of intermediate data of the three-plane color data, placement information for specifying a pixel position of the RAW data of each piece of color data which is added to the first three-plane color data, and restoration information for restoration to the first intermediate data from the RAW data which is added to the first three-plane color data, including: a first input unit configured to input the first three-plane color data, the placement information and the restoration information, a RAW data extraction unit configured to extract the RAW data from the first three-plane color data on the basis of the placement information, a first restoration processing unit configured to preprocess the RAW data extracted by the RAW data extraction unit on the basis of the restoration information, and generate second intermediate data, a second synchronization processing unit configured to process synchronization of the second intermediate data, and generate second three-plane color data, and a post-processing unit configured to generate image data for recording or image data for display by performing processing after synchronization processing on the second three-plane color data.

In addition, according to another aspect of the present invention, there is provided a receiving-side device that generates first intermediate data before synchronization processing by preprocessing unprocessed RAW data corresponding to a predetermined color filter array which is acquired from a single-plate color image pickup element having color filters of the color filter array arranged on a plurality of pixels which are arrayed two-dimensionally, generates three-plane color data processing synchronization of the first intermediate data, and receives first three-plane color data which is obtained by arranging the RAW data instead of intermediate data of the three-plane color data, placement information for specifying a pixel position of the RAW data of each piece of color data which is added to the first three-plane color data, and restoration information for restoration to the first intermediate data from the RAW data which is added to the first three-plane color data, including: an input unit configured to input the first three-plane color data, the placement information and the restoration information; a RAW data extraction unit configured to extract the RAW data from the first three-plane color data on the basis of the placement information; a restoration processing unit configured to preprocess the RAW data extracted by the RAW data extraction unit on the basis of the restoration information, and generate second intermediate data; a RAW pixel correction processing unit configured to perform correction of replacing RAW pixels in the first three-plane color data with the second intermediate data, and generate second three-plane color data; and a post-processing unit configured to generate image data for recording or image data for display by performing processing after synchronization processing on the second three-plane color data.

Thereby, in the receiving-side device, it is possible to adjust such an image quality as to respond to a user's request again.

According to the present invention, in the transmitting-side device, since data can be transmitted by adding information so as to be capable of image processing depending on the performance of the receiving-side device, it is possible to appropriately cope with data which is obtained in a new color filter array. In addition, in the receiving-side device, since data which is sent in response to each device compatible with RAW development or incompatible with RAW development can be processed, it is possible to make full use of the performance of the receiving-side device by reducing the influence of a difference in the performance of the receiving-side device on an image quality. Further, in the system constituted by the transmitting-side device and the receiving-side device of the present invention, it is possible to acquire an image having a good image quality depending on the color filter array and the image processing performance of the receiving side.

BRIEF DESCRIPTION OF THE DRAWINGS

FIG. 1D is a diagram illustrating synchronization processing.

FIG. 2 is a functional block diagram illustrating a transmitting-side device according to a first embodiment of the present invention.

DESCRIPTION OF THE PREFERRED EMBODIMENTS

Hereinafter, embodiments of an image processing system according to the present invention will be described with reference to the accompanying drawings. Meanwhile, the following description is an example of the embodiments, and thus the embodiments of the present invention are not limited thereto.

[Concept of Image Processing System According to the Present Invention]

Figure 1A:
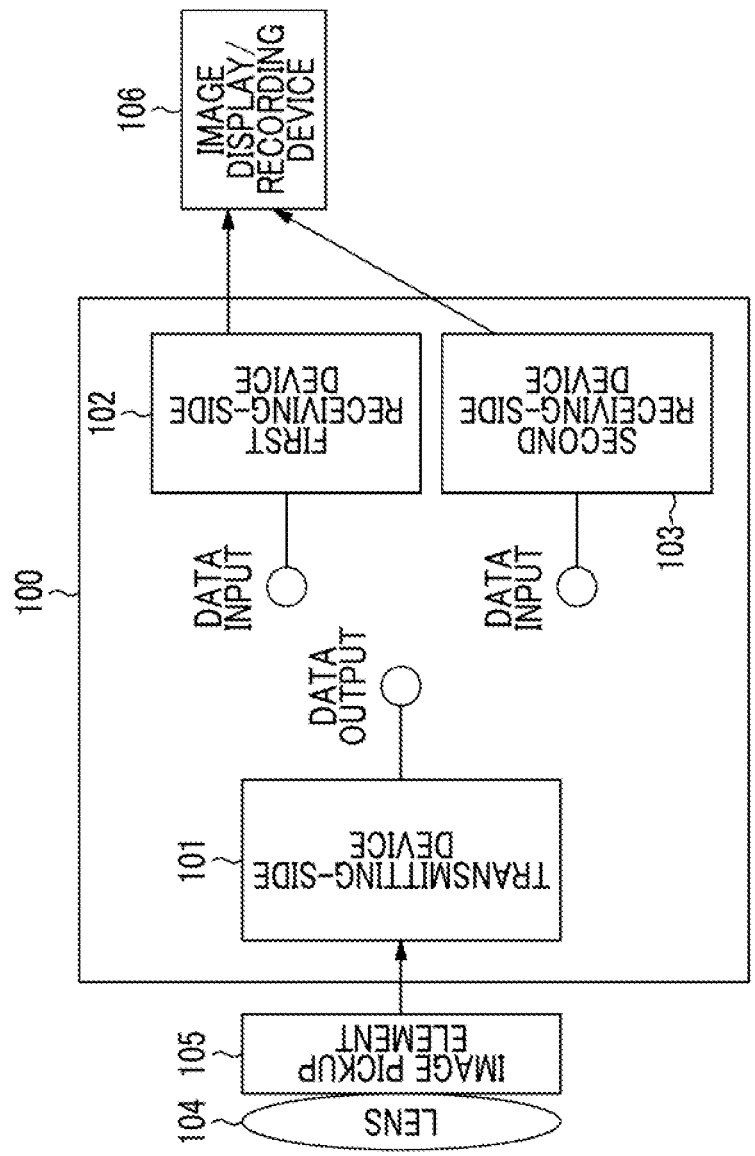
FIG. 1A is a diagram used for describing a concept of an image processing system according to the present invention.

FIG. 1A shows a concept of an image capture device including an image processing system 100 according to the present invention. Light picked up by a lens 104 is sent to an image pickup element 105, and an image pickup element 105 emits a signal in response to the sent light. The image pickup element 105 is constituted by a single-plate color image pickup element (such as CCD or CMOS) provided with color filters having a predetermined array (such as, for example, Bayer array, honeycomb array, or G stripe RIG complete checkered pattern). A transmitting-side device 101 of the image processing system 100 acquires the signal generated in response to this light as RAW data. In addition, the color filters having a predetermined array can be replaced by entirely new ones.

Figure 1B:
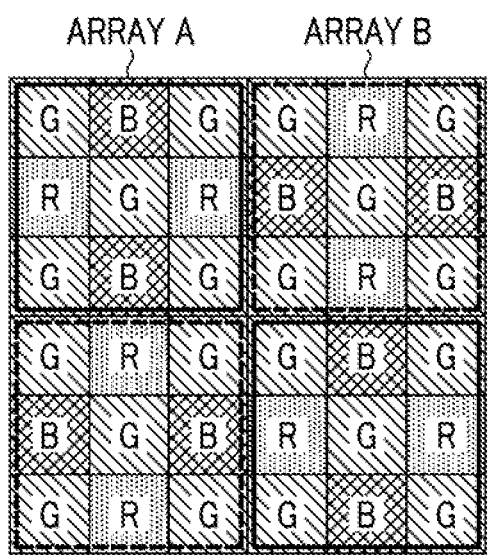
FIG. 1B is a schematic diagram illustrating an example of a new color filter.

For example, FIG. 1B is a diagram illustrating a new basic array pattern example of color filters. Meanwhile in FIG. 1B, "R" represents a red filter, "G" represents a green filter, and "B" represents a blue filter.

The color filters shown in FIG. 1B are configured such that a basic array pattern P composed of square array patterns corresponding to M×N (6×6) pixels is repeatedly arranged in a horizontal direction and a vertical direction. Therefore, when image processing or the like of RAW data (mosaic image) of RGB read out from the image pickup element 105 is performed, it is possible to perform processing in accordance with a repetitive pattern. In such a color filter array, filters (R filter, G filter, and B filter) of respective colors of red (R), green (G), and blue (B) are arrayed with a predetermined periodicity.

In the color filters having another array shown in FIG. 1B, array A of 3×3 pixels surrounded by a solid-line frame and array B of 3×3 pixels surrounded by a broken-line frame are alternately lined up in a horizontal direction and a vertical direction.

In each of array A and array B, the G filter is arranged at four corners and the center, and the G filter is arranged on both diagonals. In array A, the R filters are arrayed in a horizontal direction with the central G filter interposed therebetween, and the B filters are arrayed in a vertical direction with the central G filter interposed therebetween. On the other hand, in array B, the B filters are arrayed in a horizontal direction with the central G filter interposed therebetween, and the R filters are arrayed in a vertical direction with the central G filter interposed therebetween. That is, in array A and array B, a positional relationship between the R filter and the B filter is reversed, but the other arrangements are the same as each other.

In addition, the G filters of four corners in array A and array B become G filters having a square array corresponding to 2×2 pixels by array A and array B being alternately arranged in horizontal and vertical directions.

Figure 1C:
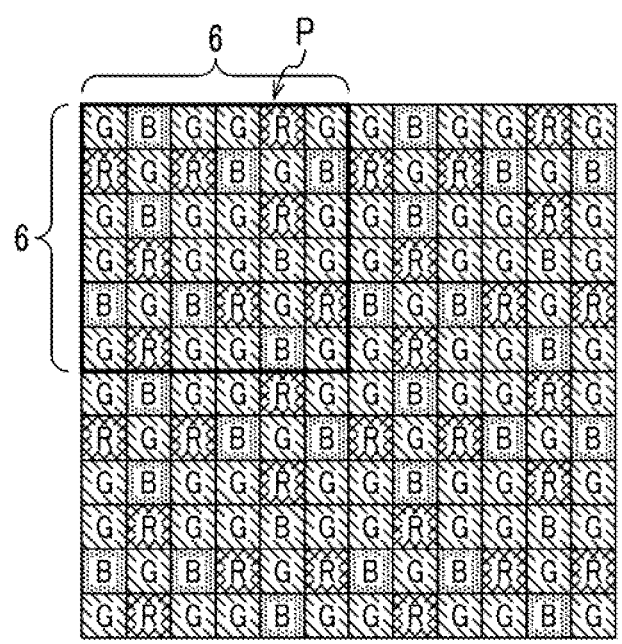
FIG. 1C is a schematic diagram illustrating an example of a new color filter.

FIG. 1C illustrates a color filter array in which two color filters having a basic array pattern shown in FIG. 1B are arranged side by side in a horizontal direction and a vertical direction. In this color filter array, one or more G filters corresponding to a color (G color in this embodiment) which contributes most to generally obtaining a luminance signal are arranged within each line of the color filter array in horizontal, vertical, oblique right upward (NE), and oblique left upward (NW) directions.

NE means an oblique right upward direction, and NW means an oblique right downward direction. For example, in an array of square pixels, oblique right upward and oblique right downward directions become directions of 45° with respect to a horizontal direction. However, in an arrays of rectangular pixels, the directions are rectangular diagonal directions and the angle thereof may change depending on the lengths of the long side and the short side.

According to such a color filter array, since the G filter corresponding to a luminance-based pixel is arranged within each line of the color filter array in horizontal, vertical, and oblique (NE, NW) directions, it is possible to improve the reproduction accuracy of synchronization processing (also called demosaic processing) in a high-frequency region regardless of a high-frequency direction.

In addition, in the color filter array shown in FIG. 1C, one or more R filters and one or more B filters corresponding to two or more different colors (R and B colors in this embodiment) other than the above G color are arranged within each line of the basic array pattern in horizontal, and vertical directions.

Since the R filter and the B filter are arranged within each line of the color filter array in horizontal and vertical directions, it is possible to reduce the generation of a false color (color moire). Thereby, it is possible to omit an optical low-pass filter for reducing (suppressing) the generation of a false color. Meanwhile, even when the optical low-pass filter is applied, it is possible to apply a filter having a weak function of cutting off a high frequency component for preventing a false color from being generated, and not to damage a resolution.

Further, in the basic array pattern P of the color filter array shown in FIG. 1C, the numbers of R pixels, G pixels, and B pixels corresponding to the R, and B filters within the basic array pattern are 8, 20, and 8, respectively. That is, the ratio of the respective numbers of RGB pixels is 2:5:2, and the ratio of the number of G pixels which contribute most to obtaining a luminance signal is larger than the ratio of the numbers of R pixels and B pixels of different colors.

As described above, in the color filter array shown in FIG. 1C, the ratios of the number of G pixels and the numbers of R and B pixels are different from each other. Particularly, since the ratio of the number of G pixels which contribute most to obtaining a luminance signal is made larger than the ratios of the number of R and B pixels, it is possible to suppress aliasing at the time of synchronization processing, and to improve high frequency reproducibility.

Data which is output from the transmitting-side device 101 is input to at least one of a first receiving-side device 102 compatible with RAW development and a second receiving-side device 103 incompatible with RAW development. Data for image display and/or recording is output from at least one of the first receiving-side device 102 and the second receiving-side device 103 to an image display and/or recording device. Here, as a device that captures the image of a subject, various ones are considered. For example, the device may be a digital camera or a portable terminal device having an image capture function. The portable terminal device as used herein includes, for example, a cellular phone, a smartphone, a PDA (Personal Digital Assistants), or a portable game console.

In addition, the image processing system 100 of the present invention can be embedded in the device in various aspects. For example, a digital camera having the image processing system 100 of the present invention, a digital camera having the transmitting-side device 101 of the image processing system 100 of the present invention, and the like are considered. In addition, for example, a personal computer or a portable terminal having the image processing system 100 of the present invention, and a personal computer or a portable terminal having at least one of the first receiving-side device 102 and the second receiving-side device 103 of the image processing system 100 of the present invention are considered.

First Embodiment

FIG. 2 is a functional block diagram illustrating the transmitting-side device 101 according to a first embodiment of the present invention.

The transmitting-side device 101 is configured to mainly include a RAW data acquisition section 202A, a preprocessing section 204A, a first synchronization processing section 206A, an output section 208A, an information adding section 210A, a transmitting section 212A, and a control section 214A. An unprocessed signal which is output by the image pickup element 105 in response to the picked-up light, that is, RAW data is acquired by the RAW data acquisition section 202A of the transmitting-side device 101.

The RAW data acquired by the RAW data acquisition section 202A is sent to the preprocessing section 204A. In the preprocessing section 204A, offset correction, white balance correction (WB correction) and the like are mainly performed on the RAW data. That is, the offset correction for arranging a black level is performed on the RAW data which is sent from the RAW data acquisition section 202A. The white balance correction is performed on the RAW data after the offset correction.

Here, after the RAW data is analyzed and a light source type, for example, (sunlight, fluorescent lamp, tungsten-filament lamp, or the like) is specified, gain values Rg, Gg, and Bg for white balance correction are set to gain values Rg, Gg, and Bg which are stored in advance corresponding to the light source type, or are set to gain values Rg, Gg, and Bg corresponding to color temperature or the light source type manually selected on a menu screen for performing the white balance correction.

When preprocessing is performed on the RAW data in the preprocessing section 204A of the present invention, intermediate data can be obtained before the synchronization processing.

The intermediate data obtained by performing the preprocessing is sent to the first synchronization processing section 206A, and is subject to the synchronization processing in the first synchronization processing section 206A. The synchronization processing as used herein refers to processing of interpolating the spatial deviation of a color signal associated with a single-plate color filter array to convert the color signal into a synchronized type, and is also referred to as demosaic processing. In addition, the conversion into a synchronized type is not limited to one aspect. It is also possible to perform conversion into a synchronized type on which directivity or weighting is performed, and to perform conversion into various synchronized types depending on an image quality requested by a user and the performance of the device for performing the synchronization processing.

The first synchronization processing section 206A performs the synchronization processing on the intermediate data, thereby allowing first three-plane color data (for example, RGB data) to be output. The synchronization processing will be described in more detail in FIG. 1D. FIG. 1D(a) shows an array of the intermediate data or the RAW data. FIGS. 1D(b) to 1D(d) show data of each color of R (red), G (green), and B (blue). When the synchronization processing is performed, the pixels are used in places where pixel values are present in the array of the intermediate data or the RAW data (shaded portions in FIGS. 1D(b) to 1D(d)), and interpolated pixel values are used in places where pixel values are not present in the intermediate data (white portions in FIGS. 1D(b) to 1D(d)).

The first three-plane color data is sent to the output section 208A, The output section 208A of the present invention is mainly constituted by the information adding section 210A and the transmitting section 212A. In the information adding section 210A, placement information is added to the first three-plane color data which has been sent. The placement information refers to information capable of specifying a pixel having a color corresponding to the intermediate data on color data of each color in the first three-plane color data, that is, a pixel used in the first three-plane color data as it is. For example, the information is array information of a color filter array, leading pixel information, or information for specifying a pixel position having a color in the intermediate data of the color data of each color.

The first three-plane color data to which the placement information is added is sent to the transmitting section 212A. In the transmitting section 212A, the first three-plane color data to which the placement information is added is output. The output three-plane color data to which the placement information is added is sent to the receiving-side device as transfer data. Here, in the transmitting-side device 101, the placement information is added to the three-plane color data, and thus it is possible to output data capable of corresponding to both the first receiving-side device 102 compatible with RAW development and the second receiving-side device incompatible with RAW development, and to output data on which the synchronization processing can be performed again in the receiving-side device.

Meanwhile, the information adding section 210A and the transmitting section 212A are controlled by the control section 214A.

Figure 3:
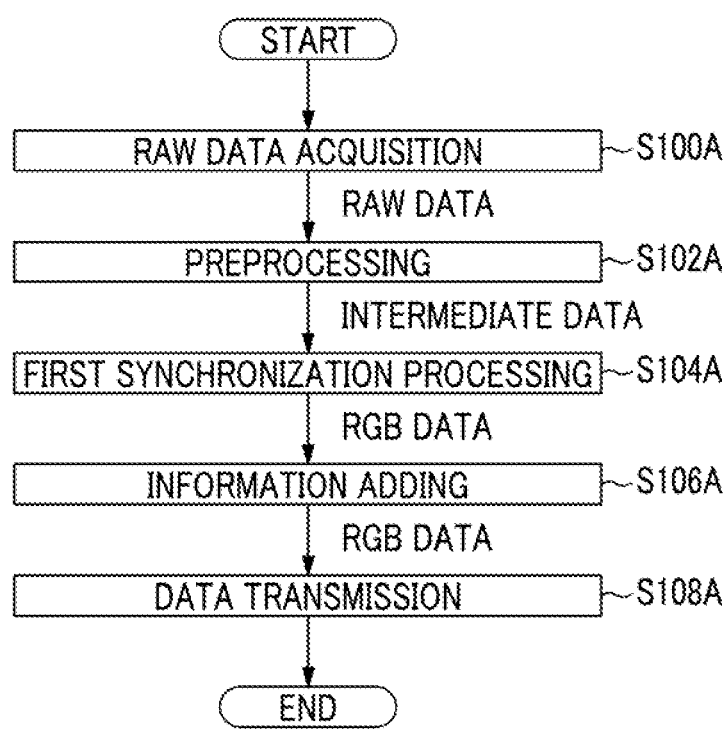
FIG. 3 is a flow diagram illustrating a processing procedure of the transmitting-side device according to the first embodiment of the present invention.

FIG. 3 is a flow diagram illustrating processing operations which are performed in the transmitting-side device 101 of the present invention.

First, the RAW data which is sent from the image pickup element 105 is acquired (step S100A), and preprocessing is performed on the RAW data (step S102A). Thereafter, first synchronization processing is performed using intermediate data which is output by the preprocessing (step S104A). Information is added to the first three-plane color data (for example, RGB data) which is output to the first synchronization processing (step S106A). In this step, colors are present in the intermediate data on the first three-plane color data, and thus placement information capable of specifying the used pixels is added to the first three-plane color data as it is. The three-plane color data to which the placement information is added is transmitted (step S108A), and thus the processing operations performed in the transmitting-side device 101 of the present invention are terminated.

Figure 4:
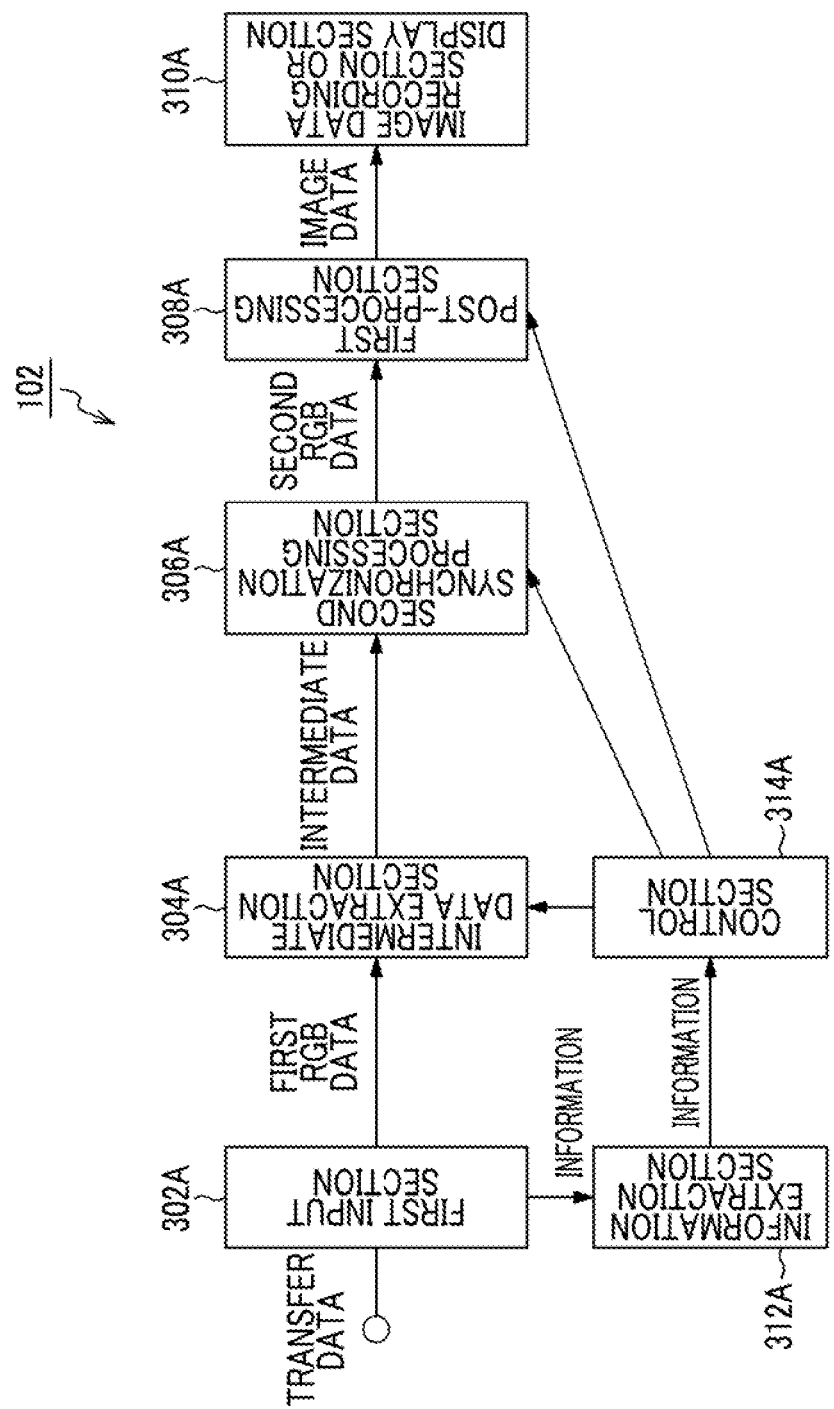
FIG. 4 is a functional block diagram illustrating a first receiving-side device according to the first embodiment of the present invention.

FIG. 4 is a functional block diagram illustrating the first receiving-side device 102 compatible with RAW development in the image processing system 100 of the present invention.

The first receiving-side device 102 of the present invention is mainly constituted by a first input section 302A, an intermediate data extraction section 304A, a second synchronization processing section 306A, a first post-processing section 308A, an image data recording section or a display section 310A, information extraction section 312A, and a control section 314A.

The transfer data which is output from the transmitting-side device 101 is input to the first input section 302A of the first receiving-side device 102. The data which is input to the first input section 302A has the placement information added to first three-plane color data. The above-mentioned placement information is extracted by the information extraction section 312A, and is sent to the control section 314A.

The first three-plane color data which is input to the first input section 302A is sent to the intermediate data extraction section 304A. In the intermediate data extraction section 304A, the intermediate data which is original data in the first synchronization processing performed in the transmitting-side device 101 is extracted and generated from the first three-plane color data That is in the intermediate data extraction section 304A, data (shaded portions in FIGS. 1D(b) to 1D(d)) in which data of a pixel originally existing as the intermediate data on the first three-plane color data is used, as it is, in the three-plane color data is extracted on the basis of the added placement information, and original intermediate data is generated. The extracted and generated intermediate data is sent to the second synchronization processing section 306A.

In the second synchronization processing section 306A, second synchronization processing is performed on the basis of the intermediate data generated by the intermediate data extraction section 304A, That is, processing of interpolating the spatial deviation of a color signal associated with a single-plate color filter array to convert the color signal into a synchronized type is performed. In addition, the conversion into a synchronized type is not limited to one aspect. It is also possible to perform conversion into a synchronized type on which directivity or weighting is performed, and to perform conversion into various synchronized types depending on an image quality requested by a user and the performance of the device for performing the synchronization processing.

Second three-plane color data which is generated by the second synchronization processing section 306A is sent to the first post-processing section 308A, In the first post-processing section 308A, post-processing is, performed on the second three-plane color data. The post-processing as used herein also includes correction performed on the three-plane color data in order to obtain a higher-quality image, and correction to a format appropriate to data for display and/or recording. For example, RGB/YC conversion processing is performed. In the RGB/YC conversion processing, R, G, and B data is converted into luminance data Y and color difference data Cr and Cb. Contour correction processing is performed on the luminance data Y, and color tone correction processing is performed on the color difference data Cr and Cb. In the contour correction processing, processing of highlighting the contour portion (portion having a significant change in luminance) of the luminance data Y is performed.

In the color tone correction processing, a matrix arithmetic operation between color-difference signals Cr and Cb to be input and color correction matrix coefficients of two rows by two columns is performed, and color correction for realizing good color reproducibility is performed. The color correction matrix coefficient is appropriately changed in response to a color correction instruction input from a user. In addition, as a format of the image data for recording, it is also considered that conversion into a JPEG or TIFF file may be performed.

The data for display and/or recording obtained in the first post-processing section 308A is sent to the image data recording section or the display section 310A. The image data recording section as used herein is considered to have various specific examples, and is not particularly limited insofar as it can save data. For example, a recording medium such as a hard disk or a CDROM, a recording medium such as a USB or an SD card, and the like are considered. On the other hand, the image data display section is not particularly limited insofar as it can display an image, and is assumed to have various specific examples. For example, the display section is a monitor, a television, or the like. In addition, a display section capable of displaying image data in a portable terminal is considered as a specific example.

Figure 5:
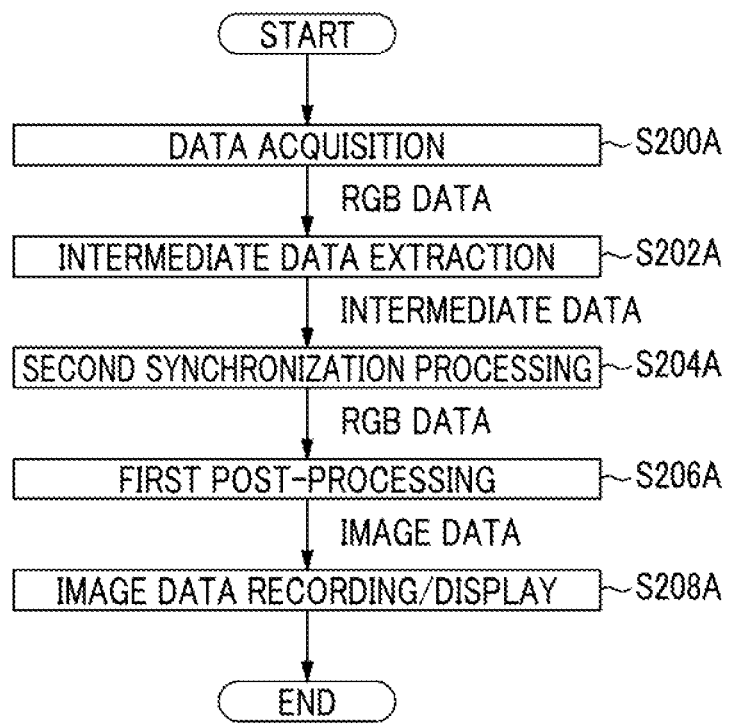
FIG. 5 is a flow diagram illustrating a processing procedure of the first receiving-side device according to the first embodiment of the present invention.

The control section 314A controls the intermediate data extraction section 304A, the second synchronization processing section 306A, and the first post-processing section 308A. FIG. 5 is a flow diagram illustrating processing operations which are performed in the first receiving-side device 102 according to the first embodiment.

First, the first three-plane color data and the placement information data which are transferred from the transmitting-side device 101 are acquired (step S200A). The intermediate data is generated on the basis of the first three-plane color data which is acquired (step S202A). That is, in intermediate data extraction processing (step S202A), data (shaded portions in FIGS. 1D(b) to 1D(d)) in which data of a pixel originally existing as the intermediate data on the first three-plane color data is used, as it is, in the three-plane color data is extracted on the basis of the added placement information, and original intermediate data is generated. Thereafter, using the obtained intermediate data, the second synchronization processing is performed and the second three-plane color data is obtained (step S204A), Next, first post-processing is performed on the second three-plane color data which is obtained (step S206A), and the image data is finally recorded and/or displayed (step S208A).

Figure 6:
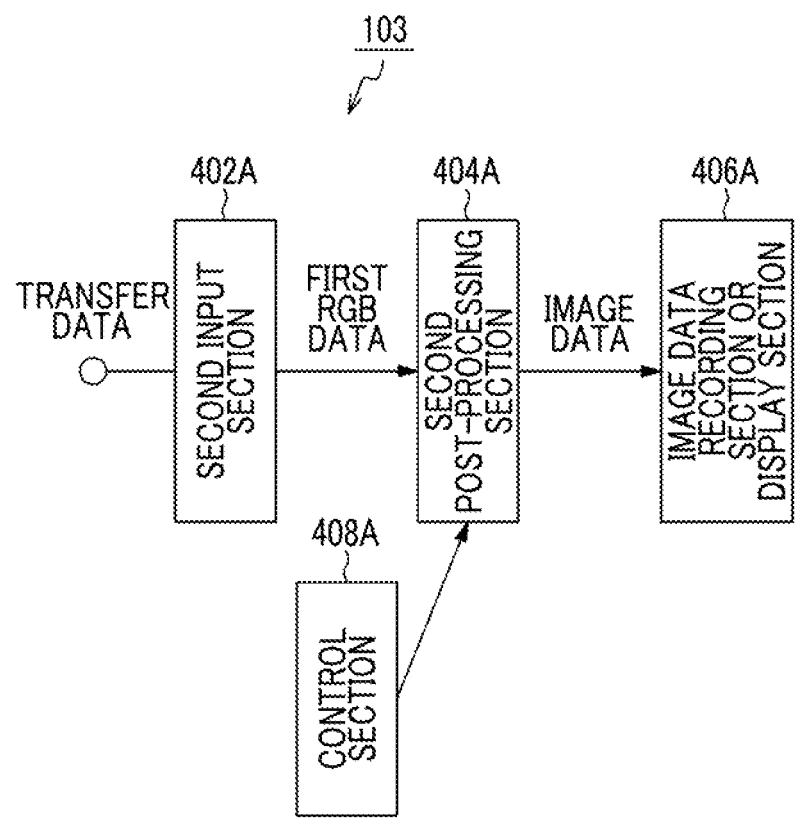
FIG. 6 is a functional block diagram illustrating a second receiving-side device according to the first embodiment of the present invention.

FIG. 6 is a functional block diagram illustrating the second receiving-side device 103 of the image processing system 100. The second receiving-side device 103 is mainly constituted by a second input section 402A, a second post-processing section 404A, and an image data recording or display section 406A. The transfer data which is output from the transmitting-side device 101 is input to the second input section 402A of the second receiving-side device 103. The data which is input to the second input section 402A is sent to the second post-processing section 404A. In the second post-processing section 404A, post-processing is performed on the first three-plane color data which is sent from the transmitting-side device 101. The post-processing as used herein is substantially the same as the first post-processing.

Figure 7:
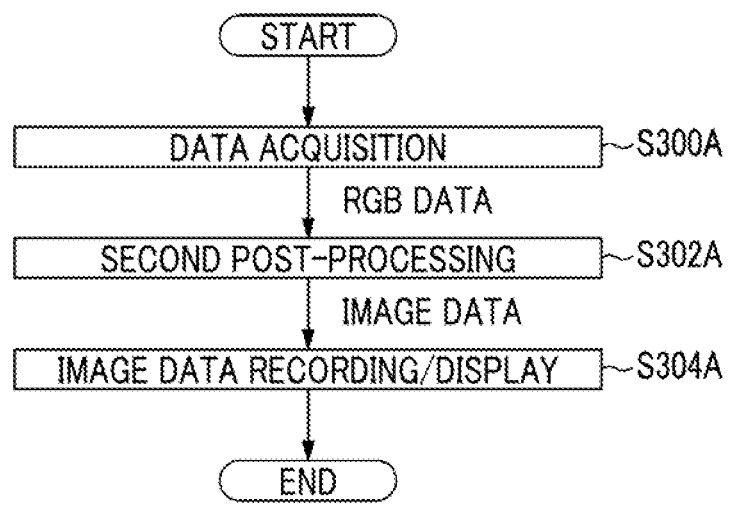
FIG. 7 is a flow diagram illustrating a processing procedure of the second receiving-side device according to the first embodiment of the present invention.

FIG. 7 is a flow diagram illustrating processing operations which are performed in the transmitting-side device 101 of the present invention.

First, the first three-plane color data and the placement information data which are transferred from the transmitting-side device 101 are acquired (step S300A). Thereafter, second post-processing is performed on the first three-plane color data which is acquired (step S302A). Finally, image data recording and/or display is performed (step S304A).

In the first embodiment, particularly, the intermediate data is generated from the first three-plane color data by the processing of the intermediate data extraction section 304A of the first receiving-side device 102, Thereby, since the synchronization processing (second synchronization processing section 306A) can be performed again in the first receiving-side device 102, it is possible to make full use of the image processing performance of the first receiving-side device 102, and to cope with a new color filter array.

Second Embodiment

Figure 8:
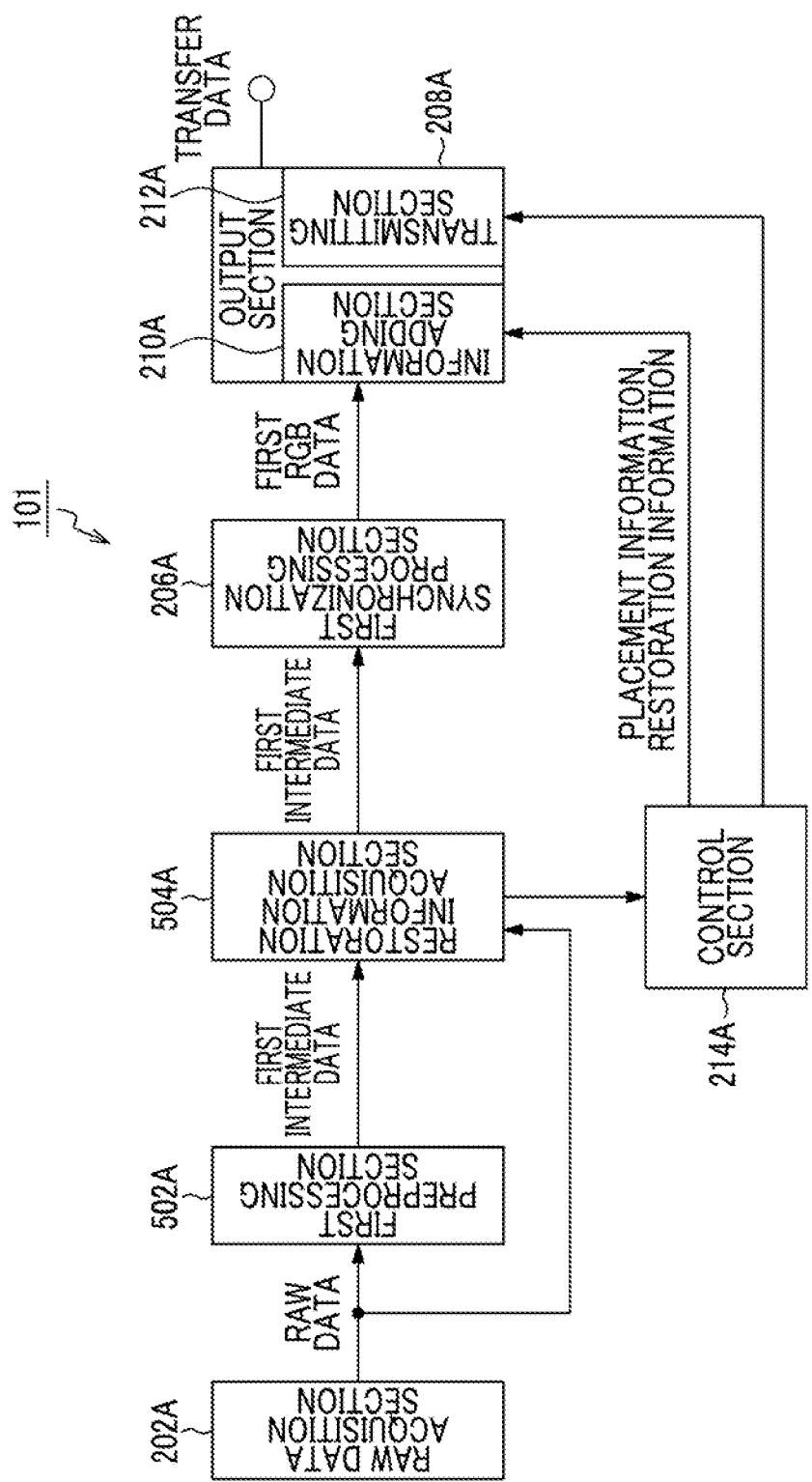
FIG. 8 is a functional block diagram illustrating a transmitting-side device according to a second embodiment of the present invention.

FIG. 8 is a functional block diagram illustrating a transmitting-side device 101 according to a second embodiment of the present invention. Meanwhile, common components with respect to those in the first embodiment are denoted by the same reference numerals and signs, and thus the detailed description thereof will not be given.

The transmitting-side device 101 of the second embodiment shown in FIG. 8 is different from the transmitting-side device 101 of the first embodiment shown in FIG. 2, in that a first preprocessing section 502A and a restoration information acquisition section 504A are added, and that the preprocessing section 204A is not present.

The first preprocessing section 502A receives RAW data from the RAW data acquisition section 202A, and sends first intermediate data to the restoration information acquisition section 504A. The first preprocessing section 502A performs substantially the same processing as that of the preprocessing section 204A in the first embodiment.

In the restoration information acquisition section 504A, the first intermediate data is received from the first preprocessing section 502A, and the first intermediate data is sent to the first synchronization processing section 206A. In the restoration information acquisition section 504A, restoration information for restoration from the first intermediate data to the RAW data is acquired from the RAW data and the first intermediate data, or from the processing content of the preprocessing. That is, by comparing the RAW data with the first intermediate data, for example, difference data is acquired, and the restoration information used for restoration from the first intermediate data to the RAW data is acquired. In addition, restoration from the first intermediate data to the RAW data can also be performed by obtaining the processing content of first preprocessing.

The control section 214A causes the information adding section 210A to add the placement information and the restoration information to the first three-plane color data. Here, in the transmitting-side device 101, the placement information and the restoration information are added to the three-plane color data, and thus it is possible to output data capable of corresponding to both the first receiving-side device 102 compatible with RAW development and the second receiving-side device incompatible with RAW development, and to output data on which the synchronization processing can be performed again in the receiving-side device.

Figure 9:
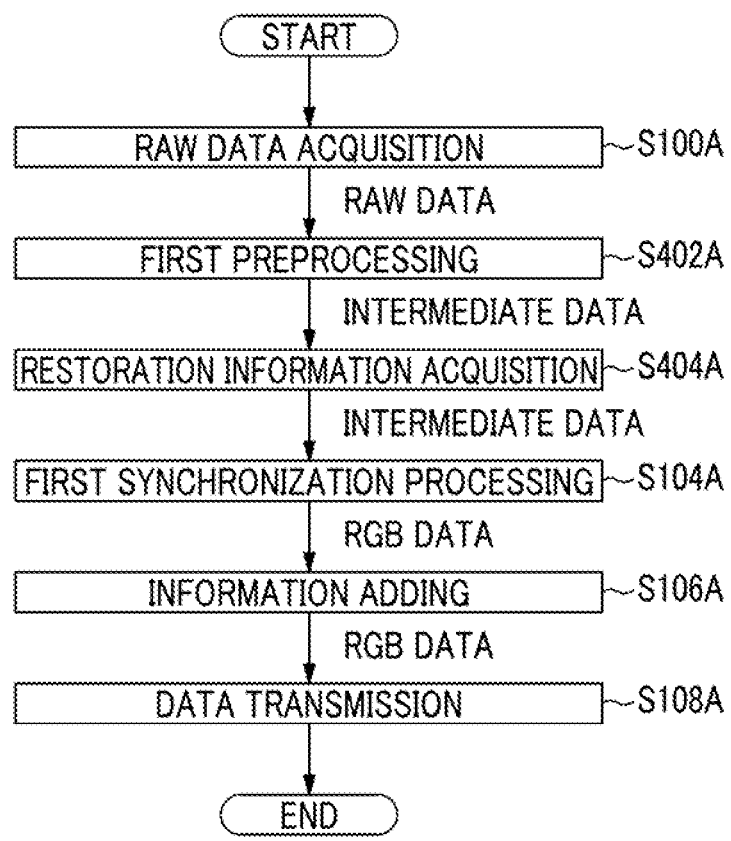
FIG. 9 is a flow diagram illustrating a processing procedure of the transmitting-side device according to the second embodiment of the present invention.

FIG. 9 is a flow diagram illustrating processing operations which are performed in the transmitting-side device 101 of the second embodiment. Meanwhile, common processes with respect to those in the flow diagram illustrating the processing operations of the transmitting-side device 101 of the first embodiment shown in FIG. 3 are denoted by the same step numbers, and thus the detailed description thereof will not be given.

First preprocessing (step S402A) and restoration information acquisition (step S404A) are added to the processing operations of the transmitting-side device 101 of the second embodiment shown in FIG. 9, compared to the processing operations of the transmitting-side device 101 of the first embodiment shown in FIG. 3. In the first preprocessing (step S402A), the first preprocessing is performed on the RAW data which has been sent, and the first intermediate data is generated from the RAW data. The first intermediate data generated by the first preprocessing is used when restoration information acquisition processing (step S404A) is performed. Information used for restoration processing from the first intermediate data to the RAW data is obtained by the restoration information acquisition processing (step S404A). For example, data for which understanding processing performed in the first preprocessing is possible is acquired from the RAW data and the first intermediate data. A specific example includes difference data between the RAW data and the intermediate data. In addition, the processing content of the preprocessing is acquired, and thus the processing performed in the first preprocessing can be ascertained. Therefore, reverse processing of the processing is performed, thereby allowing restoration processing from the first intermediate data to the RAW data to be performed.

Figure 10:
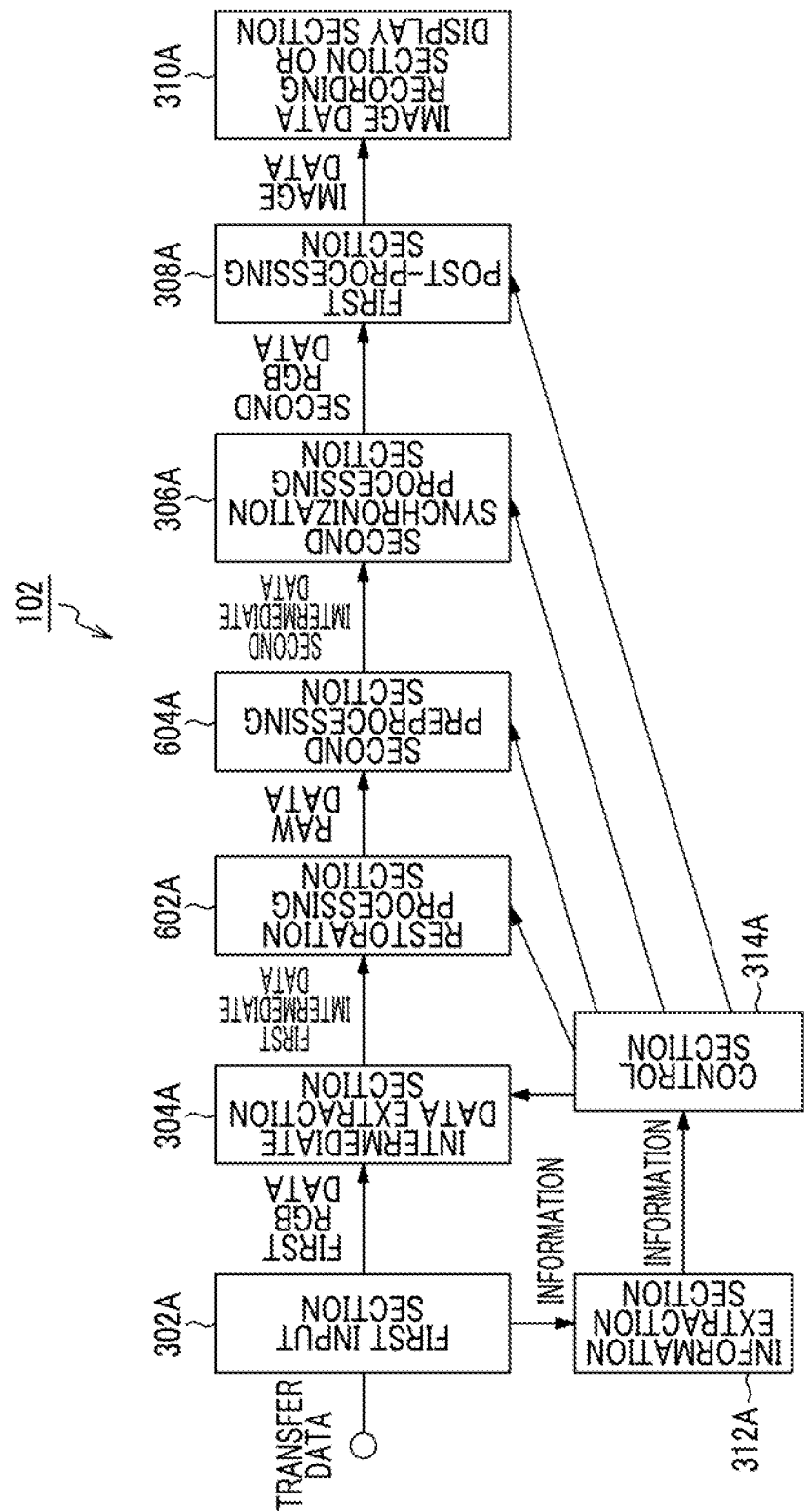
FIG. 10 is a functional block diagram illustrating a first receiving-side device according to the second embodiment of the present invention.

FIG. 10 is a functional block diagram illustrating the first receiving-side device 102 according to the second embodiment. Meanwhile, common components with respect to those in the first embodiment shown in FIG. 4 are denoted by the same reference numerals and signs, and thus the detailed description thereof will not be given.

The first receiving-side device 102 according to the second embodiment shown in FIG. 10 is different from the first receiving-side device 102 according to the first embodiment shown in FIG. 4, in that a restoration processing section 602A and a second preprocessing section 604A are added.

The first intermediate data is sent from the intermediate data extraction section 304A to the restoration processing section 602A. In the restoration processing section 602A, the RAW data is generated from the first intermediate data which has been sent, using the restoration information. For example, reverse processing of the processing performed in the first preprocessing section 502A (see FIG. 8) of the transmitting-side device 101 is performed on the first intermediate data, and the RAW data is generated from the first intermediate data. The obtained RAW data is sent to the second preprocessing section 604A, In the second preprocessing section 604A, preprocessing is performed on the RAW data which is sent from the restoration processing section 602A, In the second preprocessing section 604A, substantially the same processing as that of the preprocessing section 204A of the first embodiment is performed.

When the preprocessing is performed on the RAW data in the second preprocessing section 604A of the present invention, it is possible to obtain second intermediate data before the synchronization processing.

Figure 11:
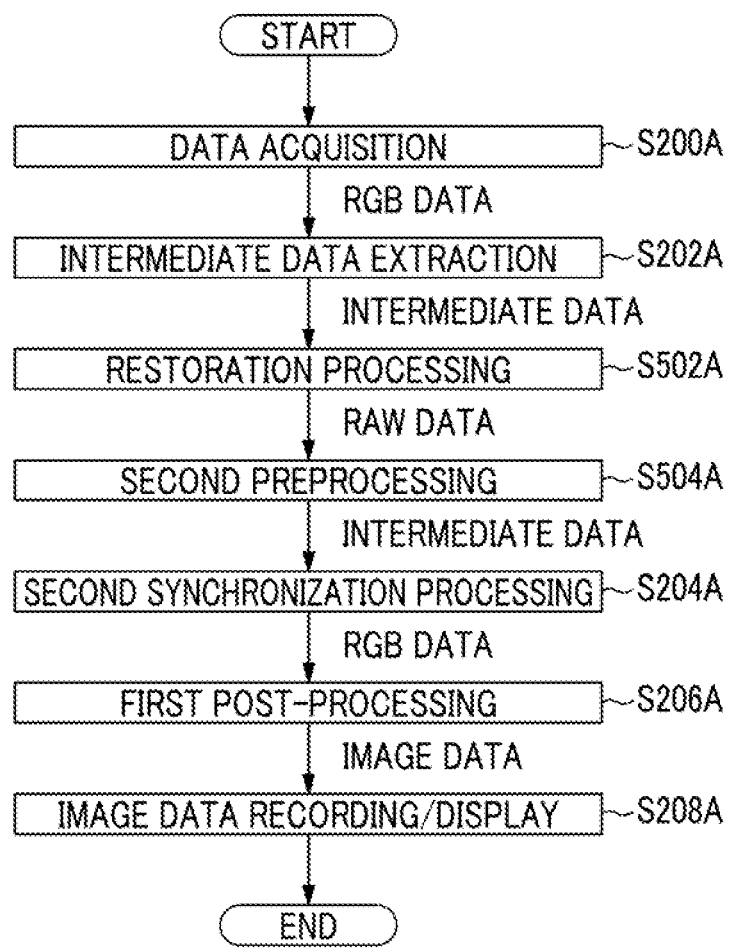
FIG. 11 is a flow diagram illustrating a processing procedure of the first receiving-side device according to the second embodiment of the present invention.

FIG. 11 is a flow diagram illustrating processing operations which are performed in the first receiving-side device 102 according to the second embodiment of the present invention. Meanwhile, common components with respect to those in the first receiving-side device 102 according to the first embodiment shown in FIG. 5 are denoted by the same step numbers, and thus the detailed description thereof will not be given.

The first receiving-side device 102 shown in FIG. 11 is different from the first receiving-side device 102 shown in FIG. 5, in that restoration processing (step S502A) and second preprocessing (step S504A) are added.

In the restoration processing (step S502A), the first intermediate data which has been transmitted is restored to original RAW data. For example, processing reverse to the preprocessing performed on the transmitting side is performed, thereby allowing the first intermediate data to be restored to the RAW data.

The RAW data obtained in the restoration processing (step S502A) is used in the second preprocessing (step S504A).

The second preprocessing is performed, thereby allowing the RAW data which has been sent to be generated from the second intermediate data.

A second receiving-side device. 103 according to the second embodiment has the same configuration and flow of processing operations of the device as those of the second receiving-side device 103 according to the first embodiment (see FIGS. 6 and 7).

In the second embodiment, particularly, the RAW data is reproduced by processing of the restoration processing section 602A, the second preprocessing section 604A, and the second synchronization processing section 306A of the first receiving-side device 102. Thereby, since the preprocessing (second preprocessing section 604A) and the synchronization processing (second synchronization processing section 306A) can be performed again in the first receiving-side device 102, it is possible to make full use of the image processing performance of the first receiving-side device 102, and to cope with a new color filter array.

Third Embodiment

Figure 12:
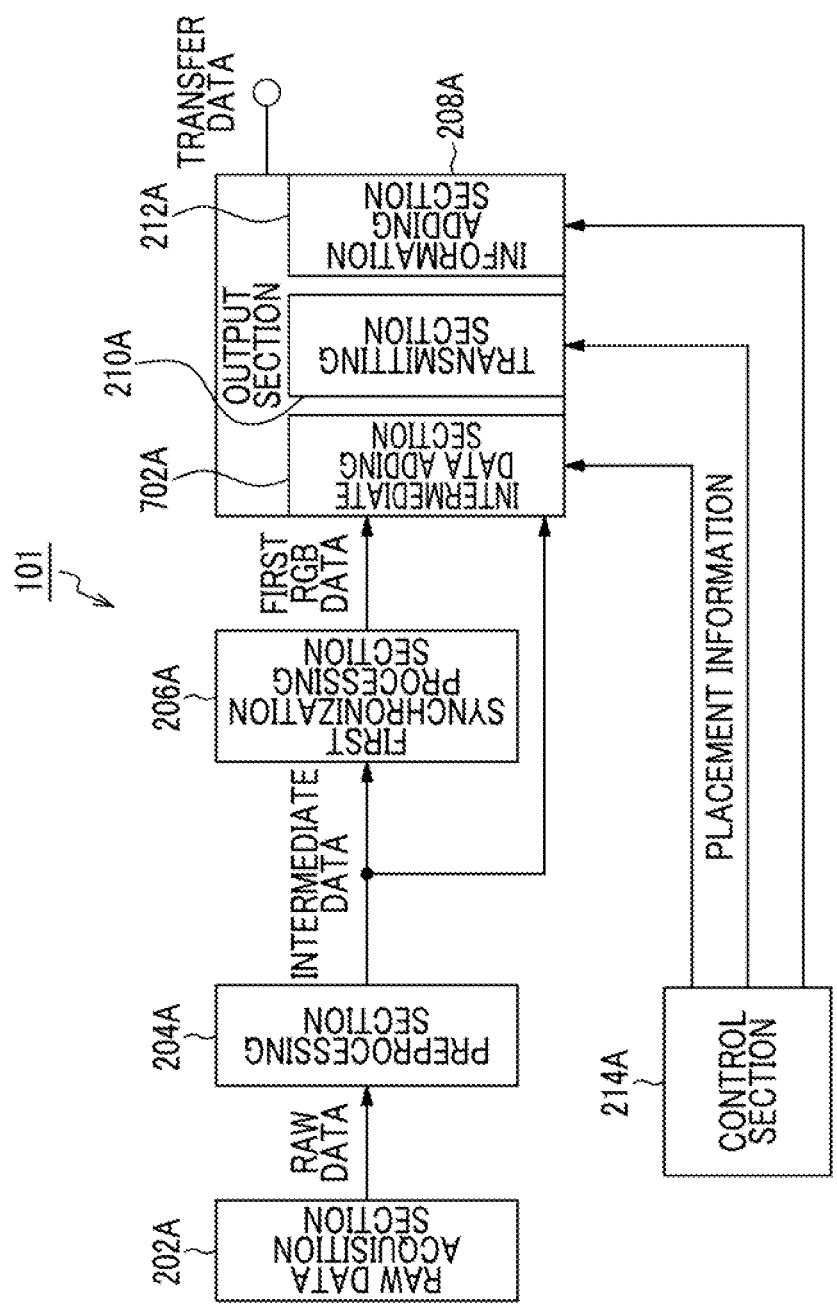
FIG. 12 is a functional block diagram illustrating a transmitting-side device according to a third embodiment of the present invention.

FIG. 12 is a functional block diagram illustrating a transmitting-side device 101 according to a third embodiment of the present invention. Meanwhile, common components with respect to those in the first embodiment are denoted by the same reference numerals and signs, and thus the detailed description thereof will not be given.

The third embodiment is different from the first embodiment, in that intermediate data is output in addition to the three-plane color data in the transmitting-side device 101, and that the intermediate data is used in the processing of the first receiving-side device 102.

The transmitting-side device 101 according to the third embodiment shown in FIG. 12 and the transmitting-side device 101 according to the first embodiment shown in FIG. 2 are different from each other, in that the intermediate data generated in the preprocessing section 204A is sent to an intermediate data adding section 702A, and is added to the first three-plane color data.

Figure 13:
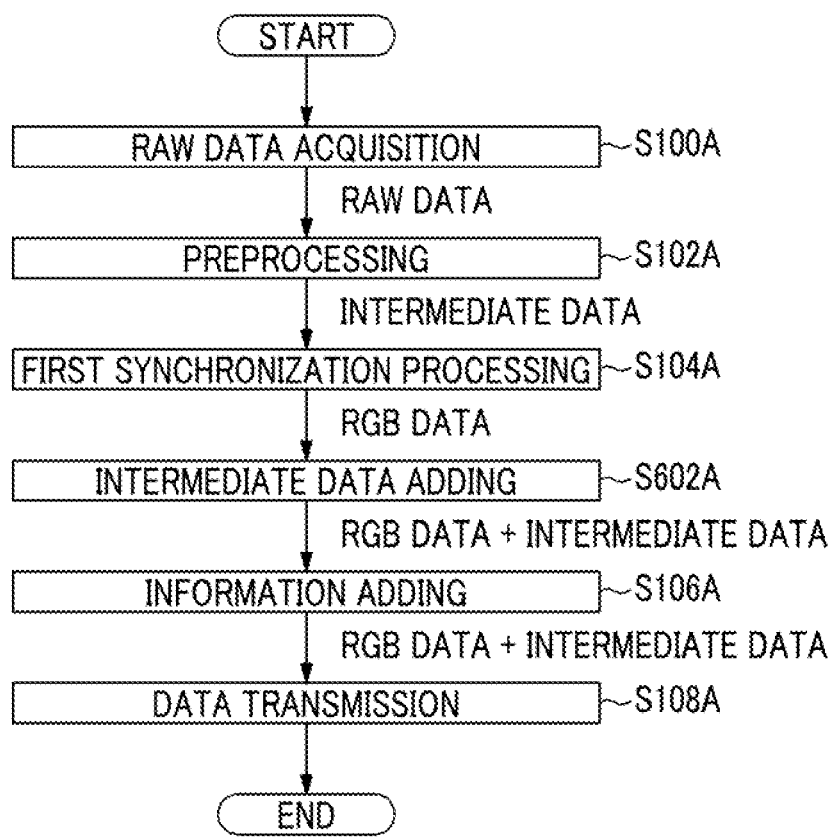
FIG. 13 is a flow diagram illustrating a processing procedure of the transmitting-side device according to the third embodiment of the present invention.

FIG. 13 is a flow diagram illustrating processing operations of the transmitting-side device 101 according to the third embodiment. Meanwhile, common processes with respect to those in the flow diagram illustrating the processing operations of the transmitting-side device 101 according to the first embodiment shown in FIG. 3 are denoted by the same step numbers, and thus the detailed description thereof will not be given.

The processing operations of the transmitting-side device 101 according to the third embodiment shown in FIG. 13 are different from the processing operations of the transmitting-side device 101 according to the first embodiment shown in FIG. 3, in that intermediate data addition (step S602A) is added. The intermediate data adding unit that the intermediate data is generated by the preprocessing (step S102A), but the intermediate data is added to the first three-plane color data.

Figure 14:
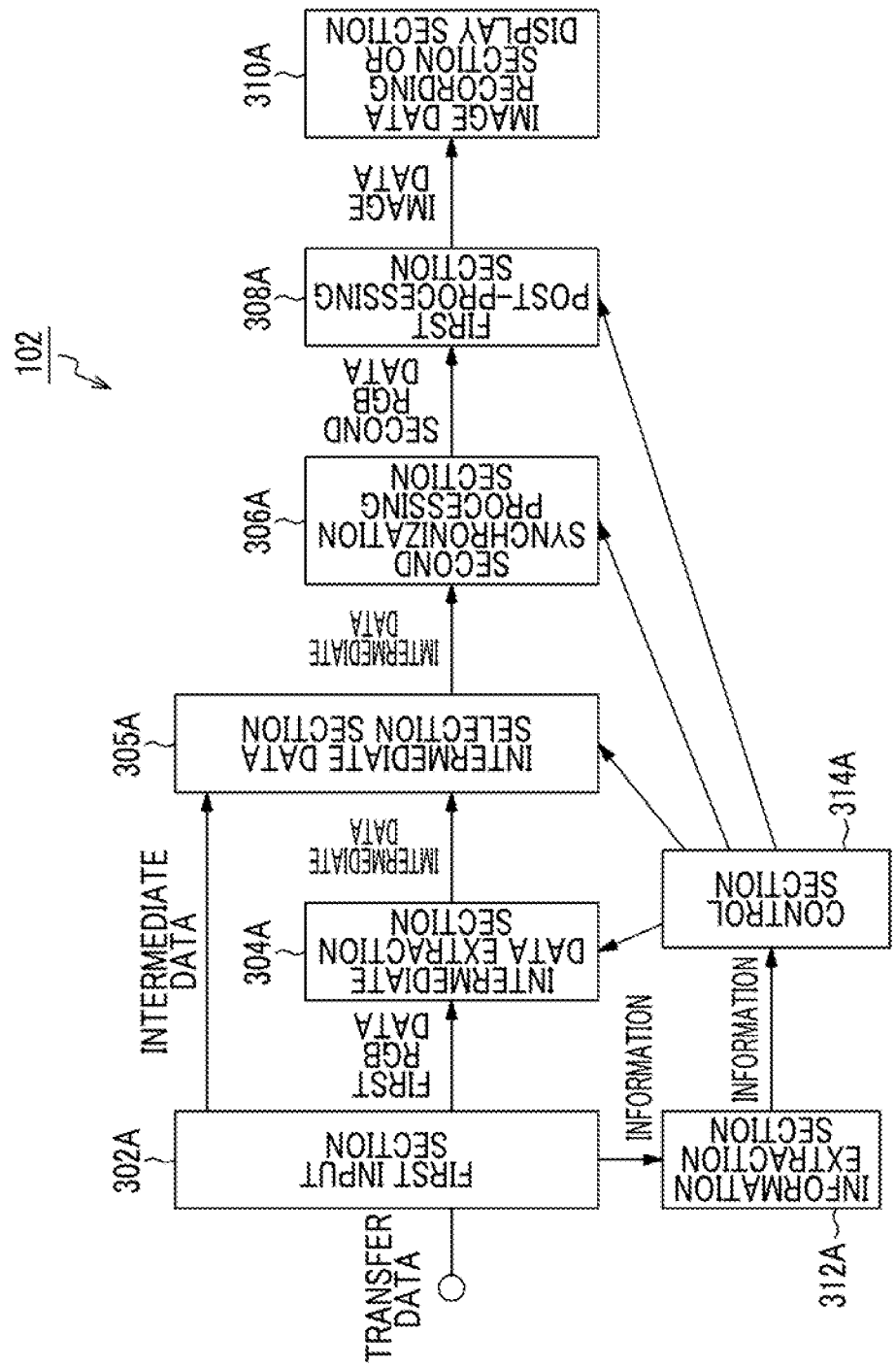
FIG. 14 is a functional block diagram illustrating a first receiving-side device according to the third embodiment of the present invention.

FIG. 14 is a functional block diagram illustrating a first receiving-side device 102 according to the third embodiment. Meanwhile, common components with respect to those in the first embodiment shown in FIG. 4 are denoted by the same reference numerals and signs, and thus the detailed description thereof will not be given.

The functional block diagram of the first receiving-side device 102 according to the third embodiment shown in FIG. 14 is different from the functional block diagram of the first receiving-side device 102 according to the first embodiment shown in FIG. 4, in that an intermediate data selection section 305A is present. In the intermediate data selection section 305A, the intermediate data which is sent from the first input section 302A or the intermediate data which is generated in the intermediate data extraction section 304A is selected. The intermediate data which is selected in the intermediate data selection section 305A is sent to the second synchronization processing, section 306A.

Figure 15:
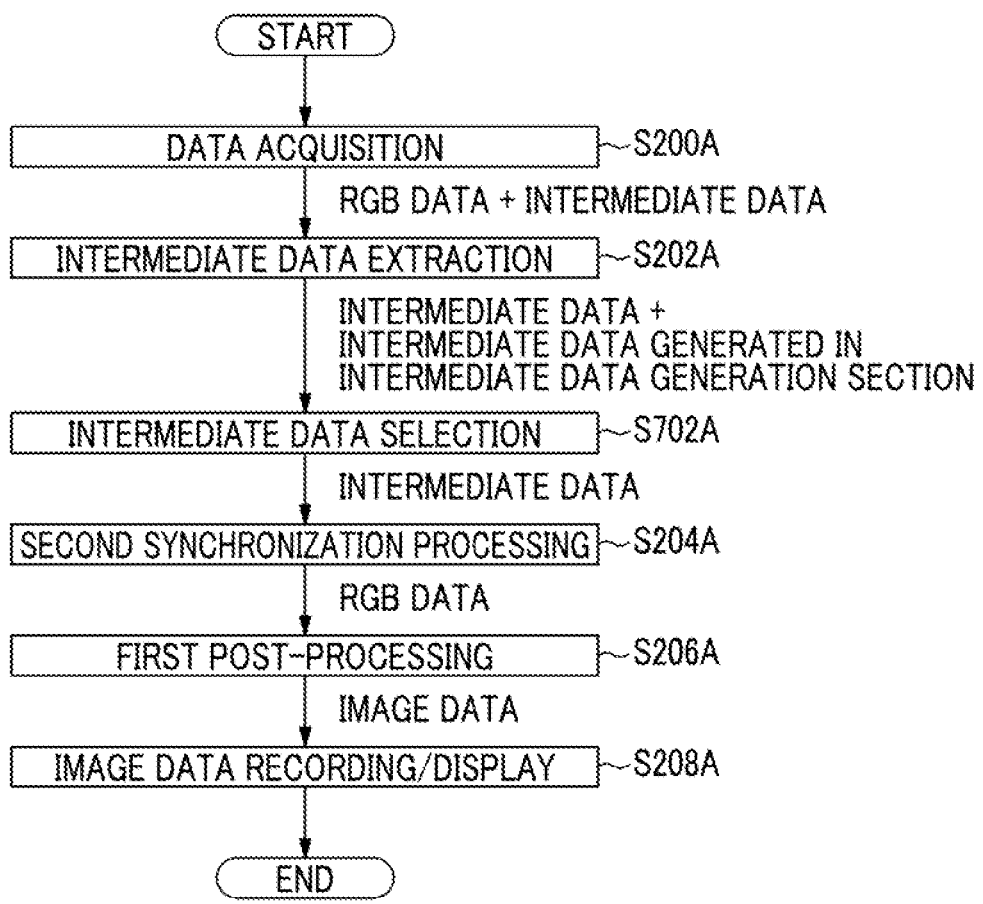
FIG. 15 is a flow diagram illustrating a processing procedure of the first receiving-side device according to the third embodiment of the present invention.

FIG. 15 is a flow diagram illustrating operation processing of the first receiving-side device 102 according to the third embodiment. Meanwhile, common processes with respect to those in the flow diagram illustrating the operation processing of the transmitting-side device 101 according to the first embodiment shown in FIG. 5 are denoted by the same step numbers, and thus the detailed description thereof will not be given.

The operation processing of the first receiving-side device 102 according to the third embodiment shown in FIG. 15 is different from the operation processing of the first receiving-side device according to the first embodiment shown in FIG. 5, in that processing of intermediate data selection (step S702A) is added. The intermediate data selection refers to selection of the intermediate data which is sent from the transmitting-side device 101 or the intermediate data which is generated in the intermediate data extraction section 304A. The selected intermediate data is subject to the second synchronization processing (step S204A).

A second receiving-side device 103 according to the third embodiment has the same configuration and flow of processing operations of the device as those of the second receiving-side device 103 according to the first embodiment (see FIGS. 6 and 7).

In the third embodiment, particularly, in the processing of the output section 208A of the transmitting-side device 101, the first three-plane color data, the placement information, and the intermediate data are output. Thereby, the number of options of processing capable of being performed in the first receiving-side device 102 increases, and thus it is possible to make full use of the image processing performance of the first receiving-side device 102, and to cope with a new color filter array.

Fourth Embodiment

Figure 16:
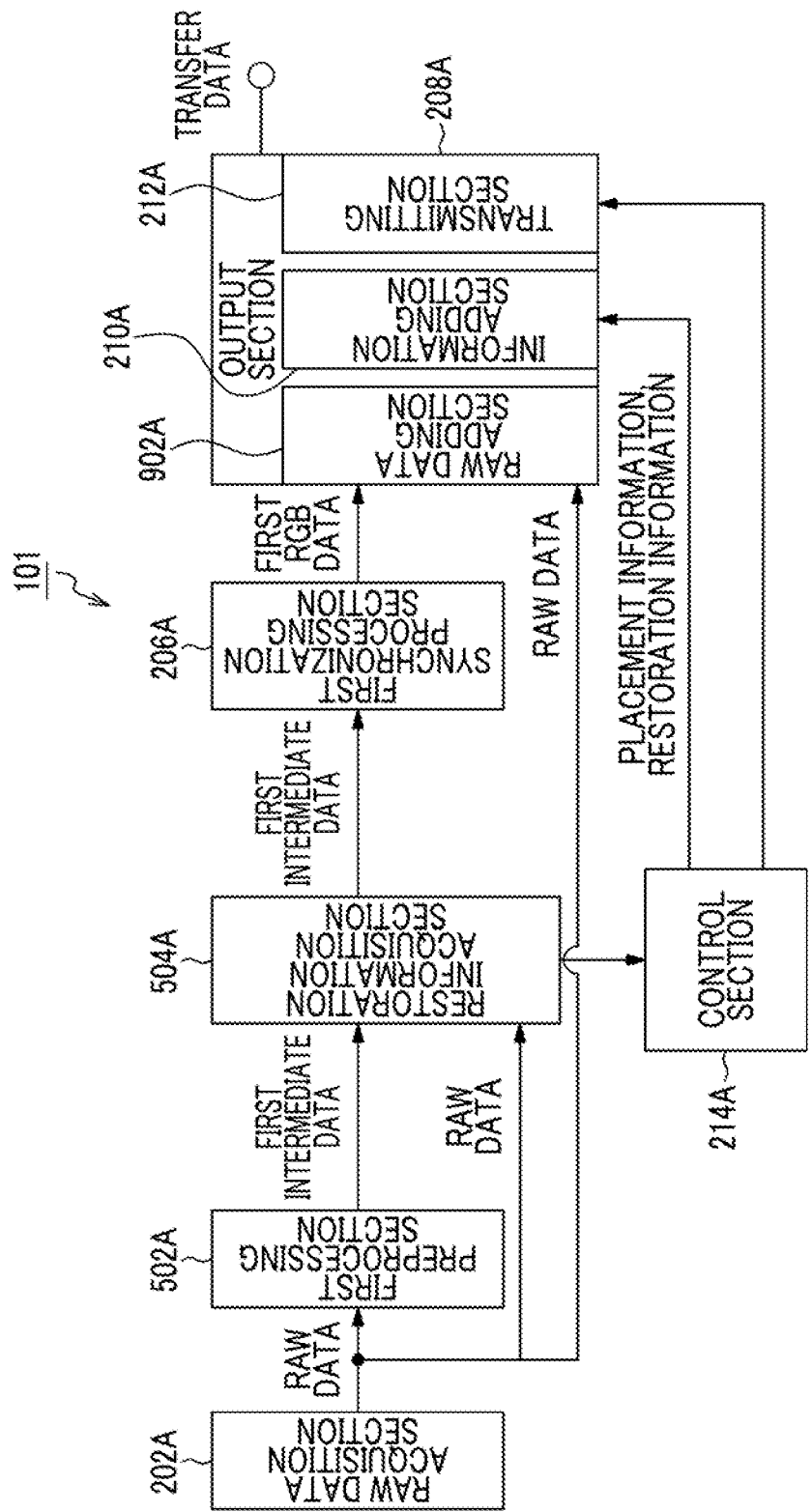
FIG. 16 is a functional block diagram illustrating a transmitting-side device according to a fourth embodiment of the present invention.

FIG. 16 is a functional block diagram illustrating a transmitting-side device 101 according to a fourth embodiment of the present invention. Meanwhile, common components with respect to those in the second embodiment (FIG. 8) are denoted by the same reference numerals and signs, and thus the detailed description thereof will not be given.

The fourth embodiment is different from the second embodiment, in that the RAW data is separately output in the transmitting-side device 101, and that the data is used in the processing of the first receiving-side device 102.

The transmitting-side device 101 according to the fourth embodiment of the present invention shown in FIG. 16 is different from the transmitting-side device 101 according to the second embodiment shown in FIG. 8, in that the transmitting-side device 101 shown in FIG. 16 includes a RAW data adding section 902A, In the RAW data adding section 902A, the RAW data obtained in the RAW data acquisition section 202A is added to the first three-plane color data.

Figure 17:
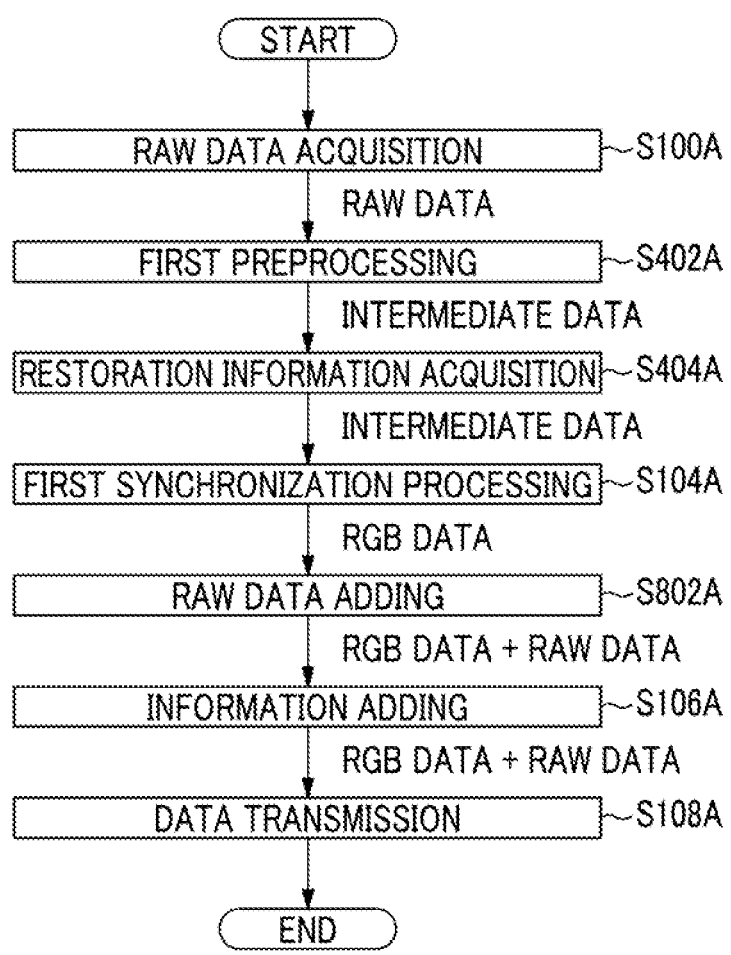
FIG. 17 is a flow diagram illustrating a processing procedure of the transmitting-side device according to the fourth embodiment of the present invention.

FIG. 17 is a flow diagram illustrating processing operations which are performed in the transmitting device according to the fourth embodiment. Meanwhile, common components with respect to those in the second embodiment (FIG. 9) are denoted by the same reference numerals and signs, and thus the detailed description thereof will not be given.

The processing operations of the transmitting device according to the sixth embodiment shown in FIG. 17 are different from those in the second embodiment shown in FIG. 9, in that processing of RAW data addition (step S802A) is added.

In the RAW data addition (step S802A), the RAW data is added to the first three-plane color data.

Figure 18:
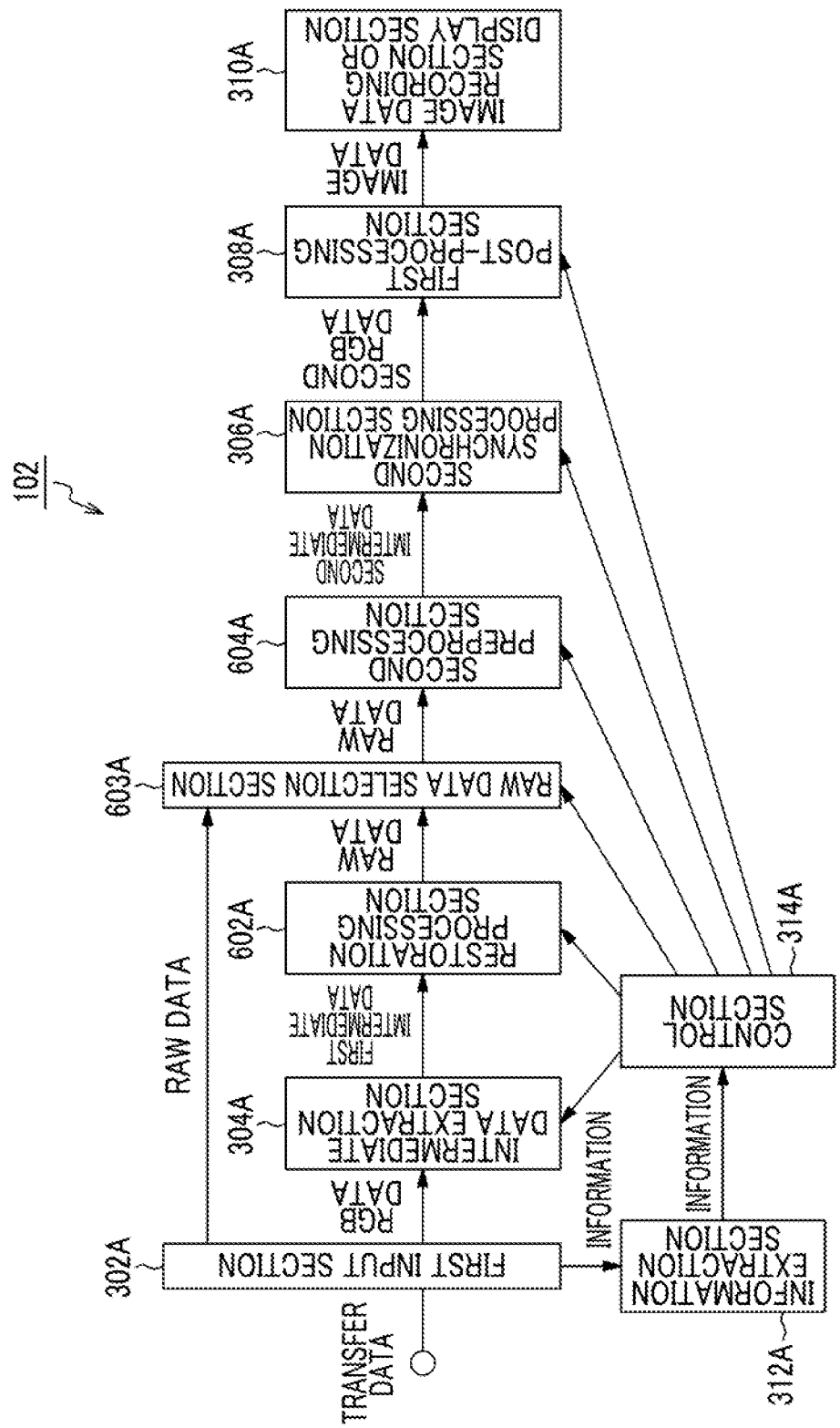
FIG. 18 is a functional block diagram illustrating a first receiving-side device according to the fourth embodiment of the present invention.

FIG. 18 is a functional block diagram illustrating a first receiving-side device 102 according to the fourth embodiment. Meanwhile, common components with respect to those in FIG. 10 which is the functional block diagram of the first receiving-side device according to the second embodiment are denoted by the same reference numerals and signs, and thus the detailed description thereof will not be given.

The functional block diagram of the first receiving-side device 102 according to the fifth embodiment shown in FIG. 18 is different from the functional block diagram of the first receiving-side device 102 according to the second embodiment shown in FIG. 10, in that a RAW data selection section 603A is included. In the RAW data selection section 603A, the RAW data which is sent from the first input section 302A or the RAW data which is generated in the restoration processing section 602A is selected. The RAW data which is selected in the RAW data selection section 603A is sent to the second preprocessing section 604A.

Figure 19:
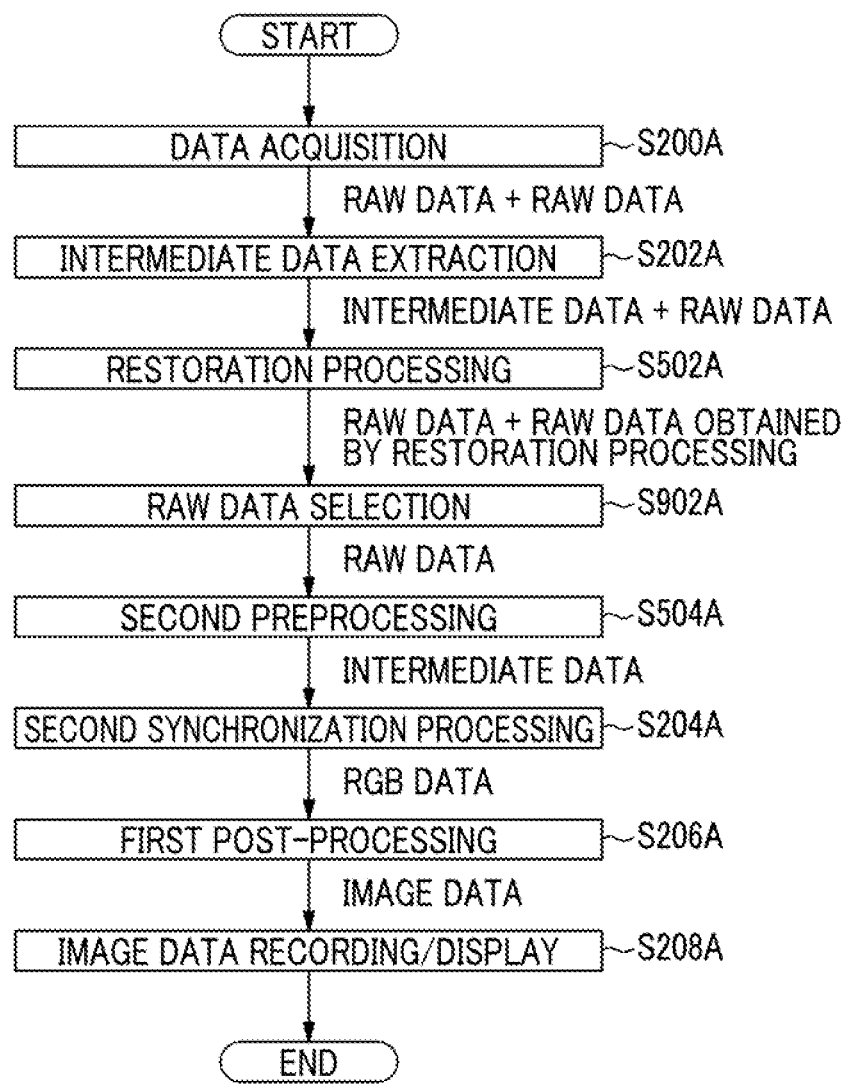
FIG. 19 is a flow diagram illustrating a processing procedure of the first receiving-side device according to the fourth embodiment of the present invention.

FIG. 19 is a flow diagram illustrating operation processing of the first receiving-side device 102 according to the fourth embodiment. Meanwhile, common processes with respect to those in the flow diagram illustrating the operation processing of the transmitting-side device 101 according to the first embodiment shown in FIG. 11 are denoted by the same step numbers, and thus the detailed description thereof will not be given.

The operation processing of the first receiving-side device 102 according to the fourth embodiment shown in FIG. 19 is different from the operation processing of the receiving-side device 102 according to the first embodiment shown in FIG. 11, in that processing of RAW data selection (step S902A) is added. The RAW data selection refers to selection of the RAW data which is sent from the first input section 302A or the RAW data which is obtained by the restoration processing. The selected RAW data is sent to the second preprocessing (step S504A).

A second receiving-side device 103 according to the fourth embodiment has the same configuration and flow of, processing operations of the device as those of the second receiving-side device 103 according to the first embodiment (see FIGS. 6 and 7).

In the fourth embodiment, particularly, in the processing of the output section 208A of the transmitting-side device 101, the first three-plane color data, the placement information, and the RAW data are output. Thereby, the number of options of processing capable of being performed in the first receiving-side device 102 increases, and thus it is possible to make full use of the image processing performance of the first receiving-side device 102, and to cope with a new color filter array.

Fifth Embodiment

Figure 20:
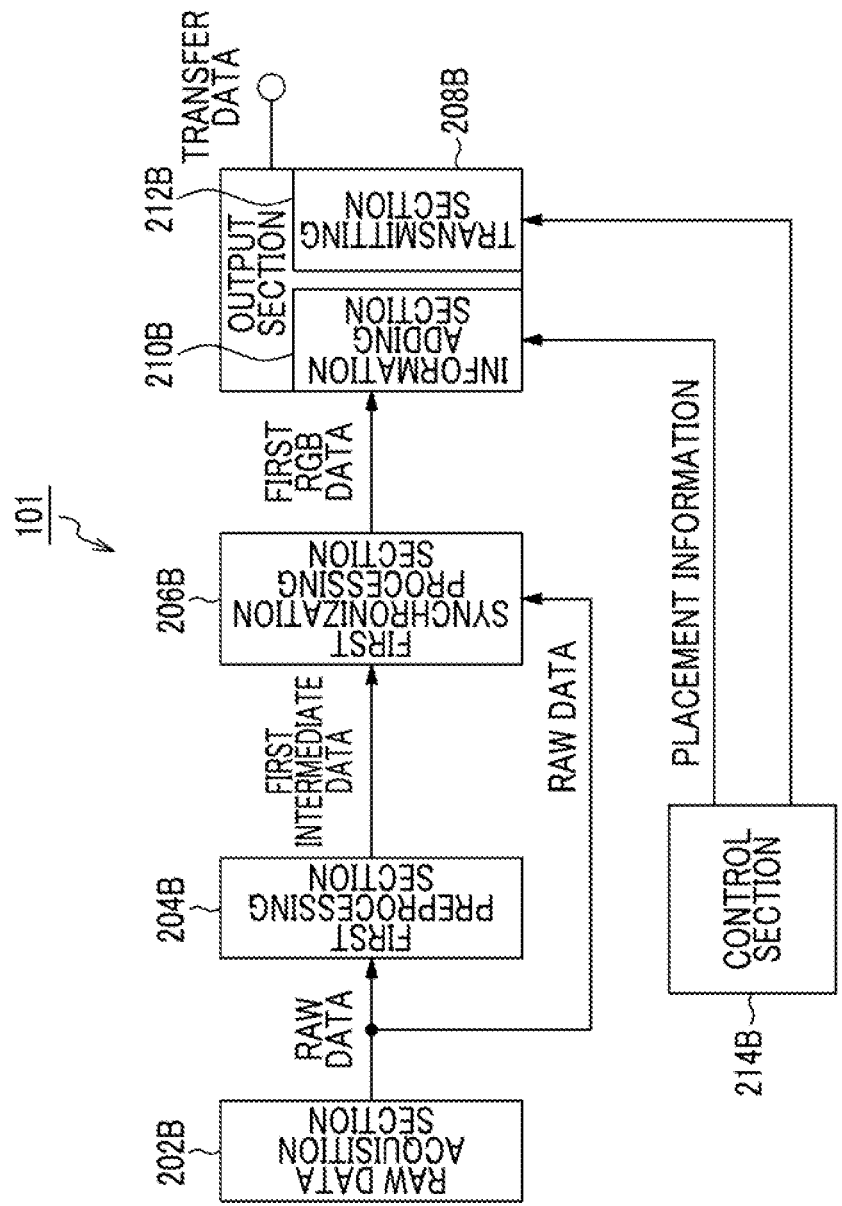
FIG. 20 is a functional block diagram illustrating a transmitting-side device according to a fifth embodiment of the present invention.

FIG. 20 is a functional block diagram illustrating a transmitting-side device 101 according to a fifth embodiment of the present invention.

The transmitting-side device 101 is mainly constituted by a RAW data acquisition section 202B, a first preprocessing section 204B, a first synchronization processing section 206B, an output section 208B, an information adding section 210B, a transmitting section 212B, and a control section 214B. An unprocessed signal which is output in response to light picked up from the image pickup element 105, that is, RAW data is acquired by the RAW data acquisition section 202B of the first transmitting-side device 101.

The acquired RAW data is sent to the first preprocessing section 204B, and is also sent to the first synchronization processing section 206B. In the first preprocessing section 204B, substantially the same processing as that of the preprocessing section 204A in the transmitting-side device 101 according to the first embodiment is performed.

First intermediate data obtained in the first preprocessing section 204B is sent to the first synchronization processing section 206B.

Synchronization processing is performed by the first synchronization processing section 206B. That is, in the first synchronization processing, three-plane color data is generated by performing the synchronization processing on first intermediate data, the RAW data is arranged instead of intermediate data of the three-plane color data, and first three-plane color data is generated. When a description is given with reference to FIG. 1D, the pixels are used in places where pixel values are present in the array of the RAW data (shaded portions in FIGS. 1D(b) to 1D(d)), and interpolated pixel values are used in places where pixel values are not present in the RAW data (white portions in FIGS. 1D(b) to 1D(d)).

The first three-plane color data obtained in the first synchronization processing section 206B is sent to the output section 208B.

The output section 208B of the present invention is mainly constituted by the information adding section 210B and the transmitting section 212B. In the information adding section 210B, placement information is added to the first three-plane color data which has been sent. The placement information refers to information capable of specifying a pixel having a color corresponding to the RAW data on color data of each color in the first three-plane color data, that is, a pixel used in the first three-plane color data as it is. For example, the information is array information of a color filter array, leading pixel information, or information for specifying a pixel position of the RAW data of each piece of color data.

The first three-plane color data to which the placement information is added is sent to the transmitting section 212B, In the transmitting section 212B, the first three-plane color data to which the placement information is added is output. The first three-plane color data which is output and to which the placement information is added is sent to the receiving-side device as transfer data. Here, in the transmitting-side device 101, the placement information is added to the three-plane color data, and thus it is possible to output data capable of corresponding to both the first receiving-side device 102 compatible with RAW development and the second receiving-side device incompatible with RAW development, and to output data on which the synchronization processing can be performed again in the receiving-side device.

Meanwhile, the information adding section 210B and the transmitting section 212B are controlled by the control section 214B.

Figure 21:
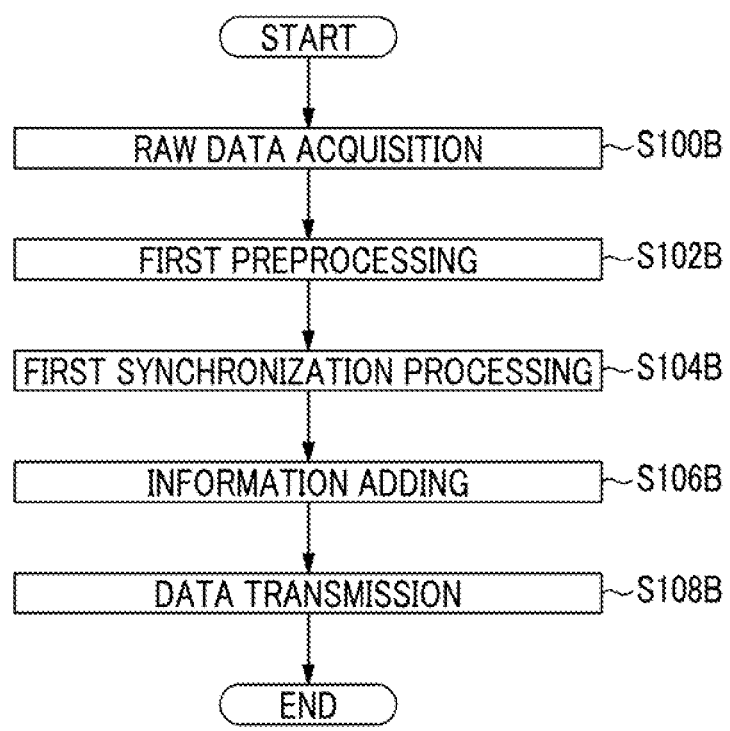
FIG. 21 is a flow diagram illustrating a processing procedure of the transmitting-side device according to the fifth embodiment of the present invention.

FIG. 21 is a flow diagram illustrating processing operations which are performed in the transmitting-side device 101 of the present invention.

First, the RAW data which is sent from the image pickup element 105 is acquired (step S100B), and first preprocessing is performed on the RAW data (step S102B). Thereafter, first synchronization processing is performed using intermediate data which is output by the preprocessing (step S104B). Information is added to the first three-plane color data (for example, RGB data) which is output to the first synchronization processing (step S106B). In this case, colors are present in the RAW data on the first three-plane color data, and thus placement information capable of specifying the used pixels is added to the first three-plane color data as it is. The first three-plane color data to which the placement information is added is transmitted (step S108B), and thus the processing operations performed in the transmitting-side device 101 of the present invention are terminated.

Figure 22:
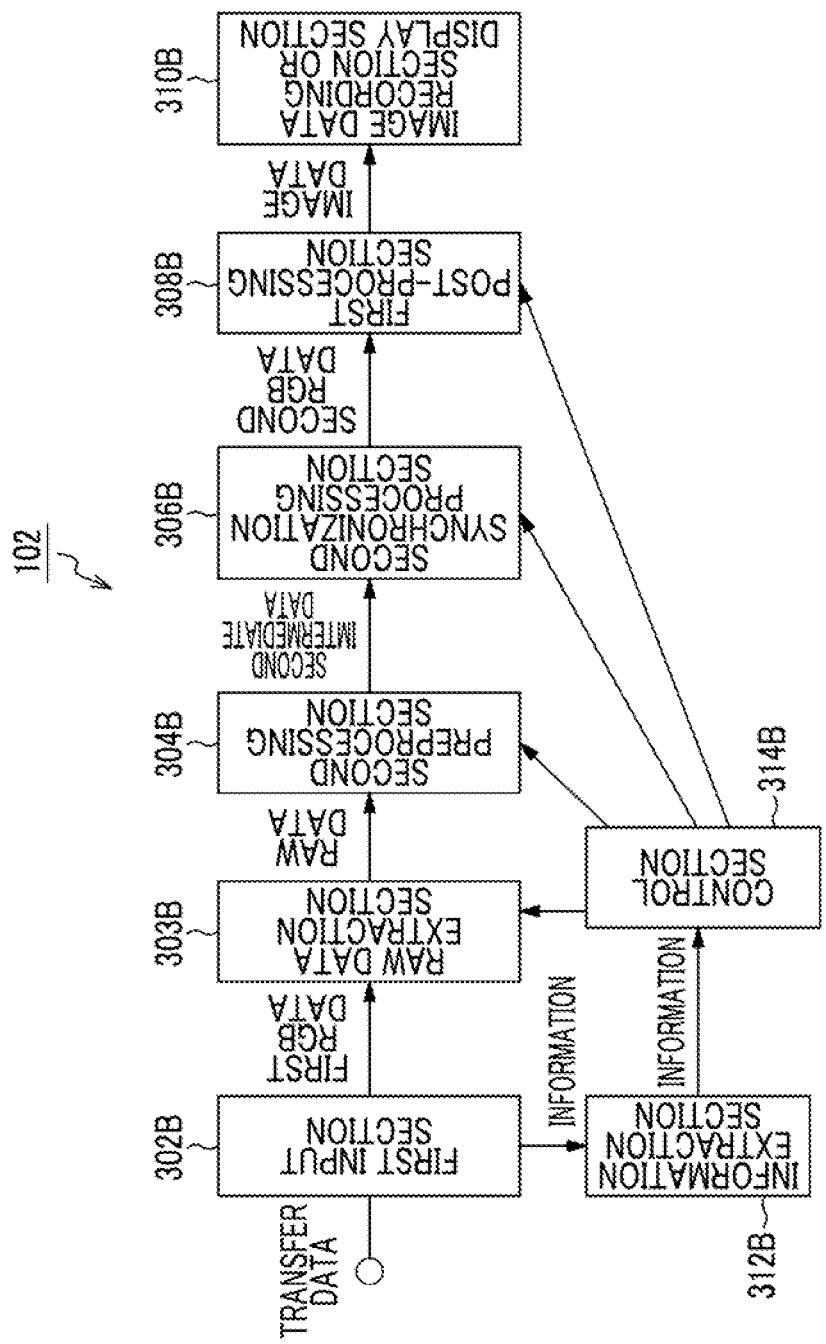
FIG. 22 is a functional block diagram illustrating a first receiving-side device according to the fifth embodiment of the present invention.

FIG. 22 is a functional block diagram illustrating the first receiving-side device 102 compatible with RAW development in the image processing system 100 of the present invention.

The first receiving-side device 102 of the present invention is mainly constituted by a first input section 302B, a RAW data extraction section 303B, a second preprocessing section 304B, a second synchronization processing section 306B, a first post-processing section 308B, an image data recording section or display section 310B, an information extraction section 312B, and a control section 314B.

The transfer data which is output from the transmitting-side device 101 is input to the first input section 302B of the first receiving-side device 102. The data which is input to the first input section 302B has the placement information added to first three-plane color data. The above-mentioned placement information is extracted by the information extraction section 312B, and is sent to the control section 314B.

The first three-plane color data which is input to the first input section 302B is sent to the RAW data extraction section 303B. In the RAW data extraction section 303B, the RAW data of a place in which a color is present in the RAW data in the first synchronization processing section 206B performed in the transmitting-side device 101 and the RAW data is used in the three-plane color data is extracted from the three-plane color data, and the RAW data is generated. That is, in the RAW data extraction section 303B, data (shaded portions in FIGS. 1D(b) to 1D(d)) in which data of a pixel originally existing as the RAW data on the three-plane color data is used, as it is, in the three-plane color data is extracted on the basis of the added placement information, and original RAW data is generated.

In the second preprocessing section 304B, basically the same processing as that of the first preprocessing section 204A is performed on the RAW data obtained by the RAW data extraction section 303B. However, processing conditions or the like can also be appropriately changed. The RAW data is generated as the second intermediate data by the second preprocessing section 304B.

In the second synchronization processing section 306B, processing of the second synchronization processing section 306B is performed on the basis of the second intermediate data generated by the second preprocessing section 304B. That is, processing of interpolating the spatial deviation of a color signal associated with a single-plate color filter array to convert the color signal into a synchronized type is performed. In addition, the conversion into a synchronized type is not limited to one aspect. It is also possible to perform conversion into a synchronized type on which directivity or weighting is performed, and to perform conversion into various synchronized types depending on an image quality requested by a user and the performance of the device for performing the synchronization processing.

The three-plane color data generated by the second synchronization processing section 306B is sent to the first post-processing section 308B. In the first post-processing section 308B, post-processing is performed on the obtained three-plane color data. The post-processing as used herein is substantially the same as the first post-processing.

The data for display and/or recording obtained in the first post-processing section 308B is sent to the image data recording section or display section 310B. The image data recording section as used herein is considered to have various specific examples, and is not particularly limited insofar as it can save data. For example, a recording medium such as a hard disk or a CDROM, a recording medium such as a USB or an SD card, and the like are considered. On the other hand, the image data display section is not particularly limited insofar as it can display an image, and is assumed to have various specific examples. For example, the display section is a monitor, a television, or the like. In addition, a display section having an image data display in a portable terminal is also considered.

The control section 314B controls the RAW data extraction section 303B, the second preprocessing section 304B, the second synchronization processing section 306B, and the first post-processing section 308B.

Figure 23:
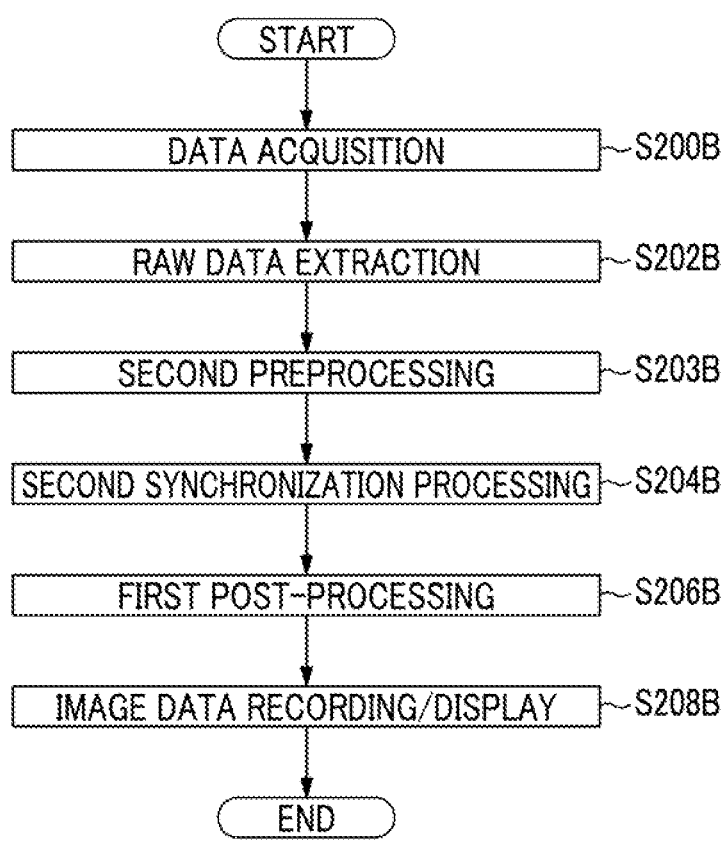
FIG. 23 is a flow diagram illustrating a processing procedure of the first receiving-side device according to the fifth embodiment of the present invention.

FIG. 23 is a flow diagram illustrating processing operations which are performed in the receiving-side device 102 according to the fifth embodiment of the present invention.

First, the first three-plane color data and the placement information data which are transferred from the transmitting-side device 101 are acquired (step S200B). The RAW data is generated from the first three-plane color data on the basis of the acquired placement information (step S202B). That is, in RAW data extraction processing (step S202B), data in which data of a color originally existing as the RAW data on the three-plane color data is used, as it is, in the three-plane color data is extracted on the basis of the added placement information, and original RAW data is generated. Thereafter, the first preprocessing is performed on the obtained RAW data (step S203B). When the second preprocessing (step S203B) is performed on the RAW data, the second intermediate data is generated. Thereafter, using the second intermediate data which is obtained, the second synchronization processing is performed (step S204B) and the second three-plane color data is obtained. Next, first post-processing is performed on the second three-plane color data which is obtained (step S206B), and the image data is finally recorded and/or displayed (step S208B).

A second receiving-side device 103 according to the fifth embodiment has the same configuration and flow of processing operations of the device as those of the second receiving-side device 103 according to the first embodiment (see FIGS. 6 and 7).

In the fifth embodiment, particularly, the second three-plane color data is generated again from the RAW data by the processing of the RAW data extraction section 303B, the second preprocessing section 304B, and the second synchronization processing section 306B of the first receiving-side device 102. Thereby, since the preprocessing (second preprocessing section 304B) and the synchronization processing (second synchronization processing section 306B) can be performed again in the first receiving-side device 102, it is possible to make full use of the image processing performance of the first receiving-side device 102, and to cope with a new color filter array.

Sixth Embodiment

Figure 24:
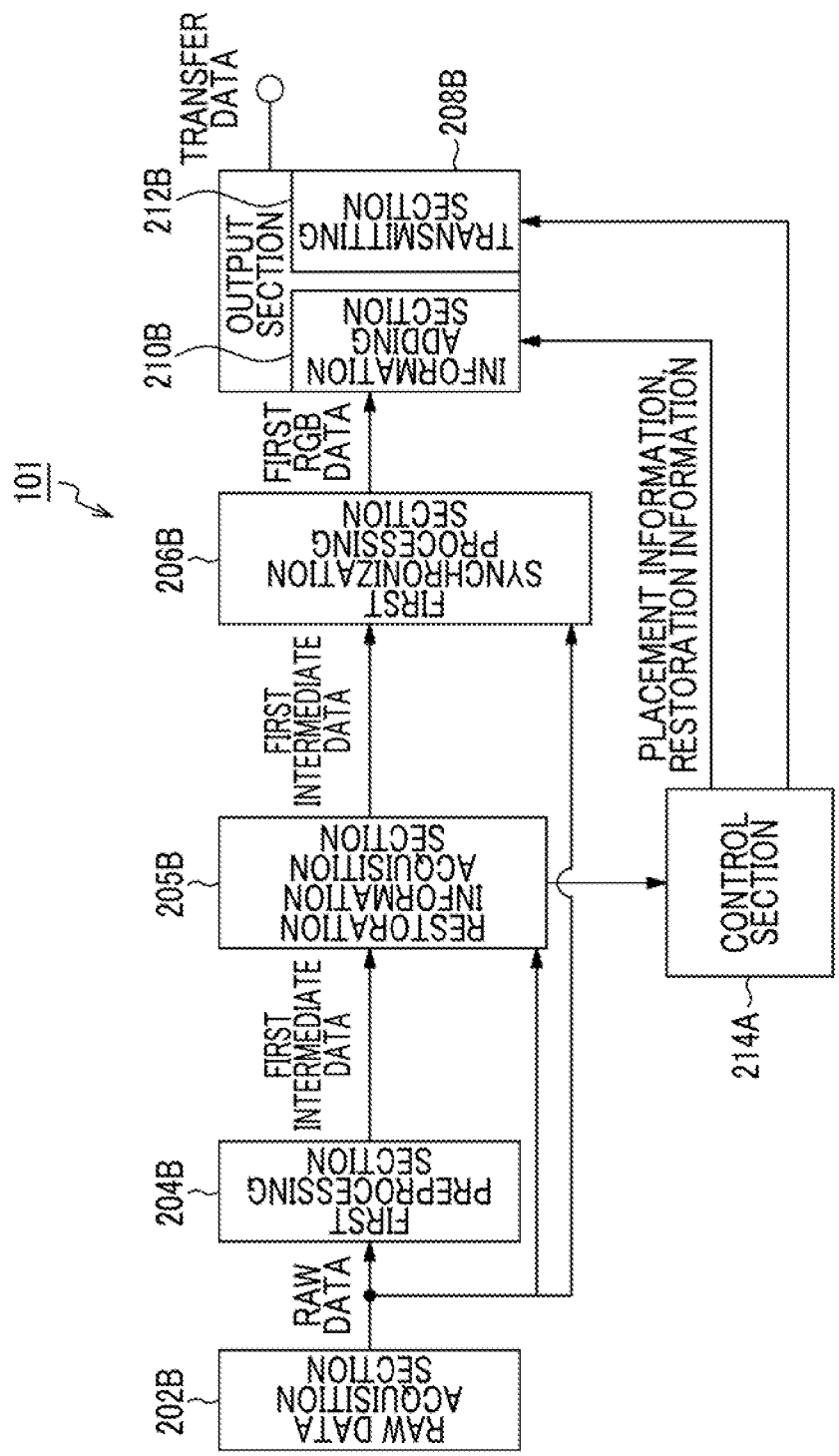
FIG. 24 is a functional block diagram illustrating a transmitting-side device according to a sixth embodiment of the present invention.

FIG. 24 is a functional block diagram illustrating a transmitting-side device 101 according to a sixth embodiment of the present invention. Meanwhile, common components with respect to those in the fifth embodiment are denoted by the same reference numerals and signs, and thus the detailed description thereof will not be given.

The transmitting-side device 101 according to the sixth embodiment of the present invention shown in FIG. 24 is different from the transmitting-side device 101 according to the fifth embodiment shown in FIG. 20, in that a restoration information acquisition section 205B is added.

The restoration information obtained in the restoration information acquisition section 205B is sent to the control section 214B. The control section 214B causes the information adding section 210B to add the restoration information to the first three-plane color data. The restoration information obtained in the restoration information acquisition section 205B is information for performing restoration from the RAW data to the first intermediate data. Here, in the transmitting-side device 101, the placement information and the restoration information are added to the three-plane color data, and thus it is possible to output data capable of corresponding to both the first receiving-side device 102 compatible with RAW development and the second receiving-side device 103 incompatible with RAW development, and to output data on which the synchronization processing can be performed again in the receiving-side device.

Figure 25:
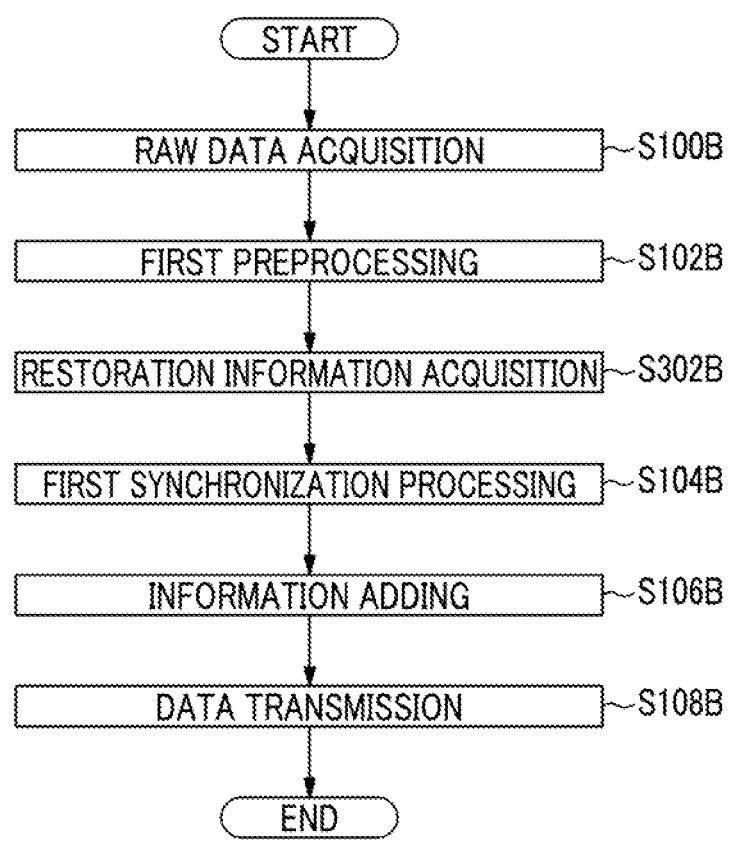
FIG. 25 is a flow diagram illustrating a processing procedure of the transmitting-side device according to the sixth embodiment of the present invention.

FIG. 25 is a flow diagram illustrating processing operations which are performed in the transmitting-side device 101 of the sixth embodiment. Meanwhile, common processes with respect to those in the flow diagram illustrating the processing operations of the transmitting-side device 101 according to the first embodiment shown in FIG. 21 are denoted by the same step numbers, and thus the detailed description thereof will not be given.

The processing operations of the transmitting-side device 101 according to the sixth embodiment shown in FIG. 25 are different from the processing operations of the transmitting-side device 101 according to the fifth embodiment shown in FIG. 21, in that restoration information acquisition (step S302B) is added. Information used for restoration processing from the RAW data to the second intermediate data is obtained by the restoration information acquisition processing (step S302B).

Figure 26:
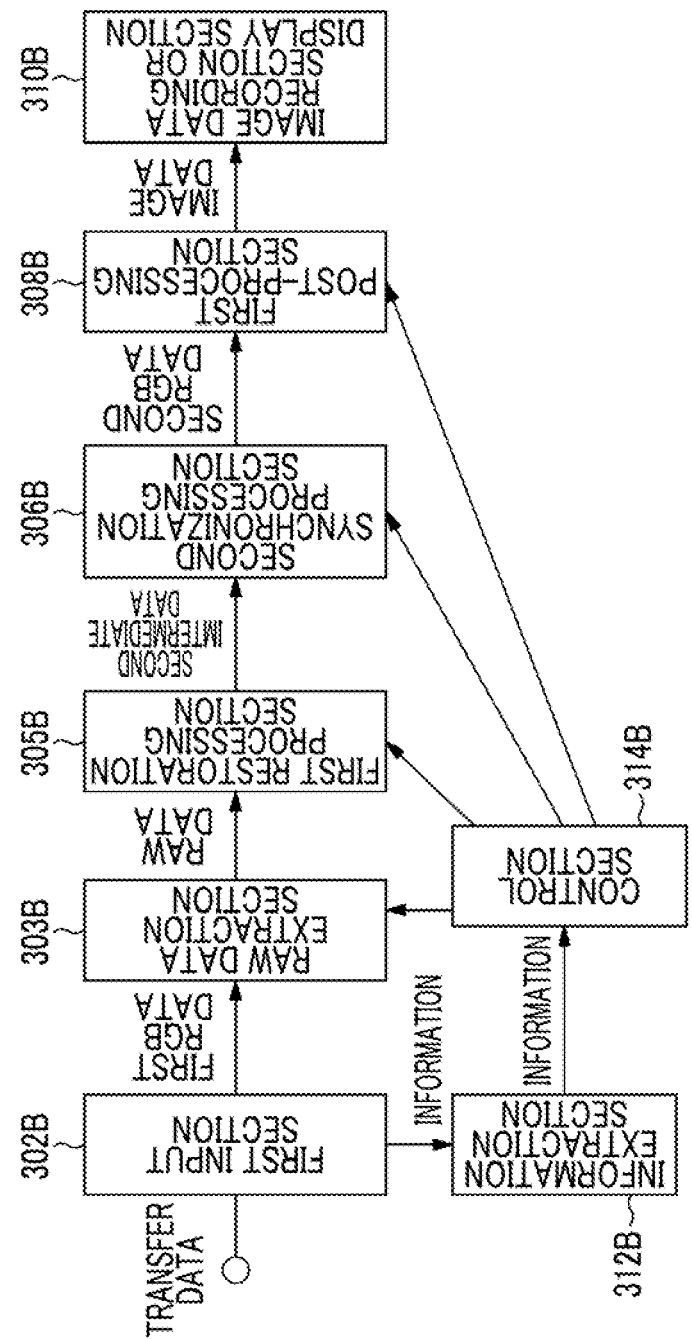
FIG. 26 is a functional block diagram illustrating a first receiving-side device according to the sixth embodiment of the present invention.

FIG. 26 is a functional block diagram illustrating a first receiving-side device 102 according to the sixth embodiment. Meanwhile, common components with respect to those in the first embodiment shown in FIG. 22 are denoted by the same reference numerals and signs, and thus the detailed description thereof will not be given.

The first receiving-side device 102 according to the sixth embodiment shown in FIG. 26 is different from the first receiving-side device 102 according to the fifth embodiment shown in FIG. 22, in that a first restoration processing section 305B is added, and that the second preprocessing section 304B is not present.

The RAW data is sent from the RAW data extraction section 303B to the first restoration processing section 305B. In the first restoration processing section 305B, the second intermediate data is generated from the sent RAW data using the restoration information. For example, the processing performed in the first preprocessing section 204B of the transmitting-side device 101 is performed on the RAW data, and intermediate data is generated from the RAW data. The obtained intermediate data is sent to the second synchronization processing section 306B.

Figure 27:
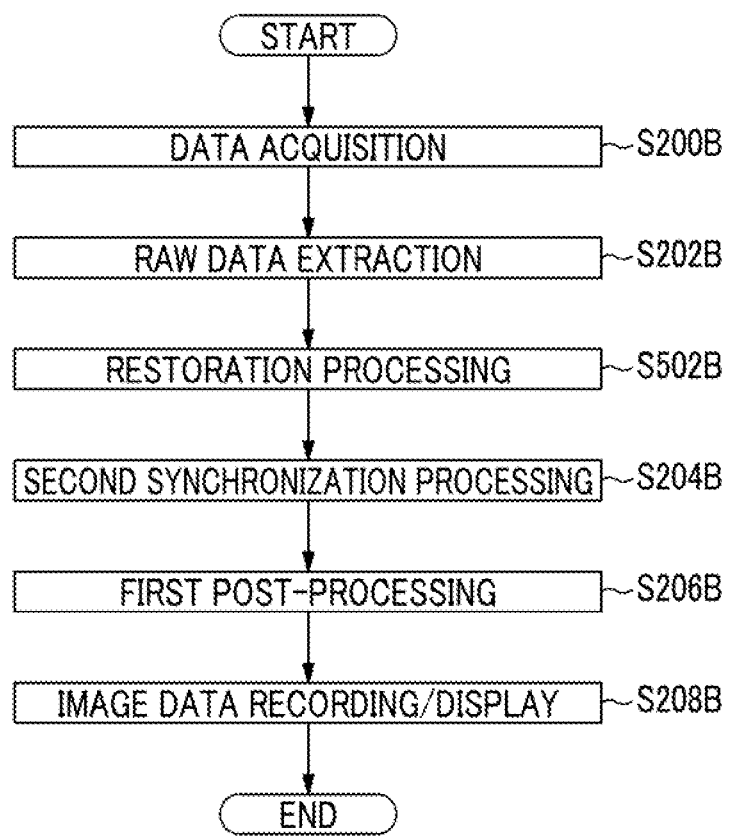
FIG. 27 is a flow diagram illustrating a processing procedure of the first receiving-side device according to the sixth embodiment of the present invention.

FIG. 27 is a flow diagram illustrating processing operations which are performed in the first receiving-side device 102 according to the eighth embodiment of the present invention. Meanwhile, common components with respect to those of the first receiving-side device 102 according to the first embodiment shown in FIG. 23 are denoted by the same step numbers, and thus the detailed description thereof will not be given.

The first receiving-side device 102 shown in FIG. 27 is different from the first receiving-side device 102 shown in FIG. 23, in that restoration processing (step S502B) is added, and that the first preprocessing (step S203B) is not present.

In the restoration processing (step S502B), processing of generating the second intermediate data from the sent RAW data is performed. For example, the same processing as the preprocessing performed in the transmitting side is performed, thereby allowing the second intermediate data to be generated from the RAW data.

The second intermediate data obtained in the restoration processing (step S502B) is used in the second synchronization processing (step S204B).

Figure 28:
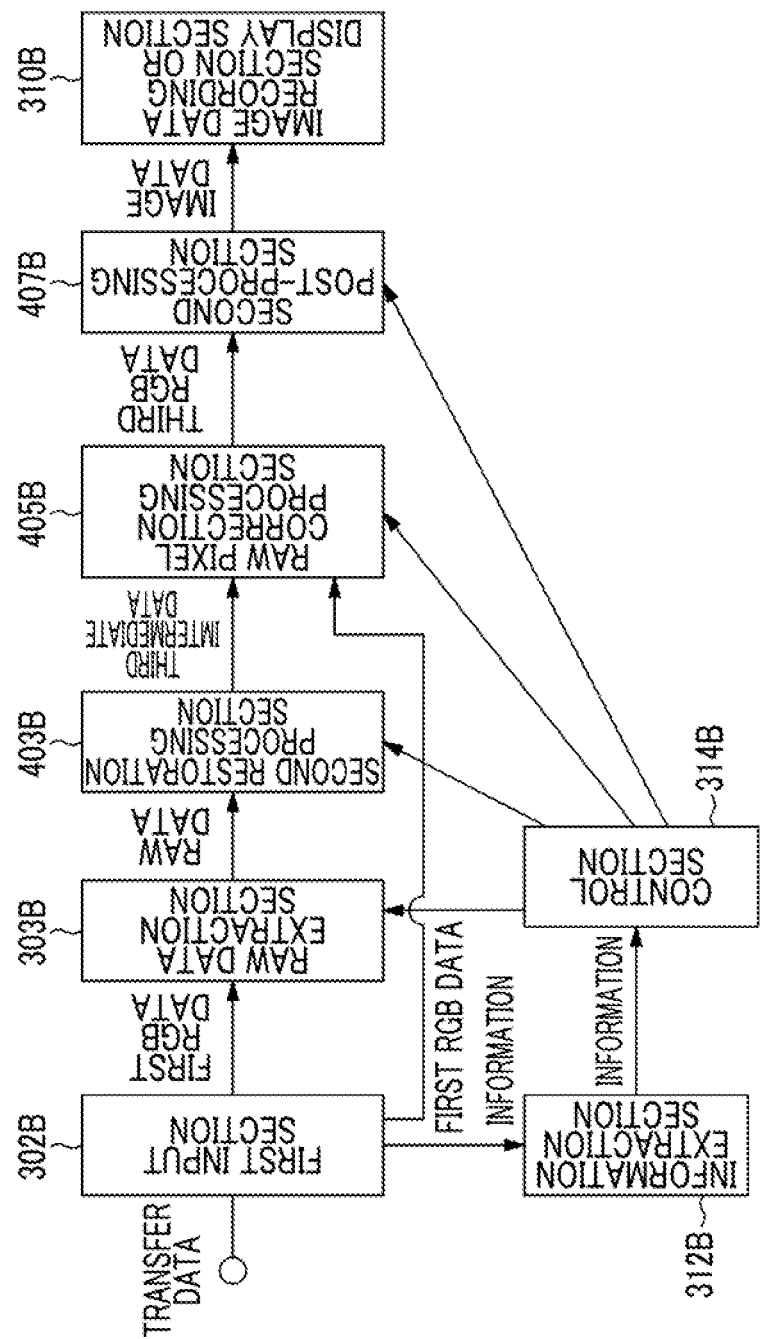
FIG. 28 is a functional block diagram illustrating a second receiving-side device according to the sixth embodiment of the present invention.

FIG. 28 is a functional block diagram illustrating a second receiving-side device 103 according to the sixth embodiment. Meanwhile, common components with respect to those in the first embodiment shown in FIG. 26 are denoted by the same reference numerals and signs, and thus the detailed description thereof will not be given.

The second receiving-side device 103 according to the sixth embodiment shown in FIG. 28 is different from the first receiving-side device 102 according to the sixth embodiment shown in FIG. 26, in that a second restoration processing section 403B, a RAW pixel correction processing section 405B, and a second post-processing section 407B are added, and the first restoration processing section 305B, the second synchronization processing section 306B, and the first post-processing section 308B are not present.

The RAW data is sent from the RAW data extraction section 303B to the second restoration processing section 403B. In the second restoration processing section 403B, the second intermediate data is generated from the sent RAW data using the restoration information. For example, the processing performed in the first preprocessing section 204B of the transmitting-side device 101 is performed on the RAW data, and the second intermediate data is generated from the RAW data. The obtained intermediate data is sent to the RAW pixel correction processing section 405B.

In the RAW pixel correction processing section 405B, processing of replacing pixels of the RAW data with intermediate data is performed on the three-plane color data which is sent from the transmitting-side device 101. In the first synchronization processing in the transmitting-side device 101, on the three-plane color data, the data is use in a color which is present in the RAW data, synchronization processing is performed on the first intermediate data with respect to a color which is not present in the RAW data, and the three-plane color data is generated using interpolated data. In the RAW pixel correction processing section 405B in the second receiving-side device 103, processing of replacing a portion in which the data is used with third intermediate data obtained in the second restoration processing is performed on the color which is present in the RAW data. That is, in the RAW pixel correction processing section 405B, correction processing of replacing the RAW pixel which is present on first RGB data with the third intermediate data is performed. According to third RGB data obtained by such processing, it is possible to obtain an image having a better quality. The three-plane color data obtained by performing the RAW pixel correction processing is sent to the second post-processing section 407B.

Figure 29:
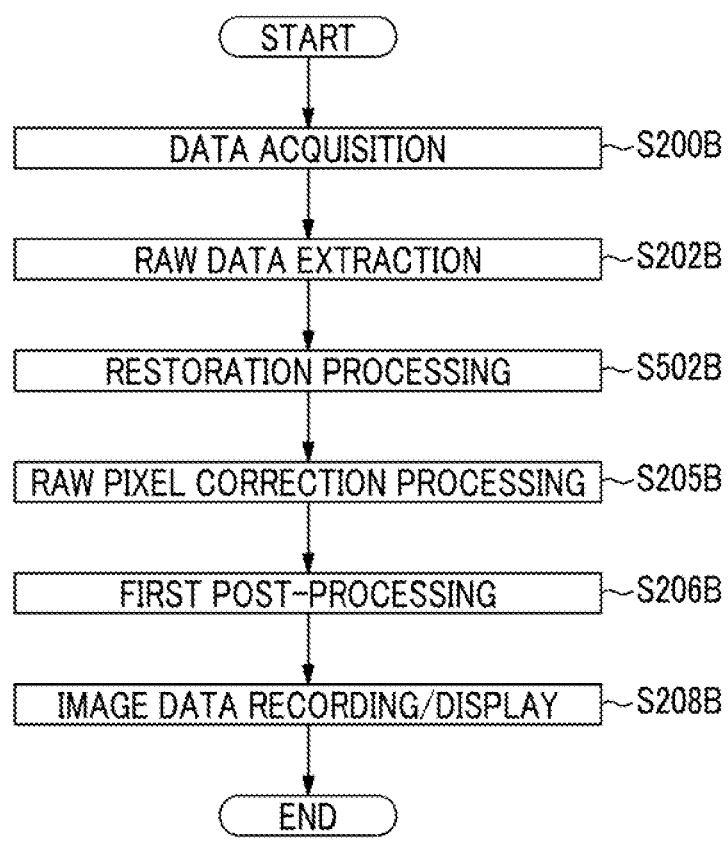
FIG. 29 is a flow diagram illustrating a processing procedure of the second receiving-side device according to the sixth embodiment of the present invention.

The second receiving-side device 103 shown in FIG. 29 is different from the first receiving-side device 102 shown in FIG. 27, in that RAW pixel correction processing (step S205B) is added, and that the second synchronization processing (step S204B) is not present (204B of FIG. 27).

In the RAW pixel correction processing (step S205B), processing of replacing a portion in which the RAW data on the first three-plane color data sent from the transmitting-side device 101 is used with the second intermediate data obtained in the restoration processing (step S502B) is performed.

In the sixth embodiment, particularly, the second three-plane color data is generated again from the RAW data by the processing of the RAW data extraction section 303B, the first restoration processing section 305B, and the second synchronization processing section 306B of the first receiving-side device 102. Thereby, since the synchronization processing (second synchronization processing section 306B) can be performed again in the first receiving-side device 102, it is possible to make full use of the image processing performance of the first receiving-side device 102, and to cope with a new color filter array.

In addition, in the sixth embodiment, particularly, three-plane color data having a better image quality is generated by the processing of the RAW data extraction section 303B, the second restoration processing section 403B, and the RAW pixel correction processing section 405B of the second receiving-side device 103.

Seventh Embodiment

Figure 30:
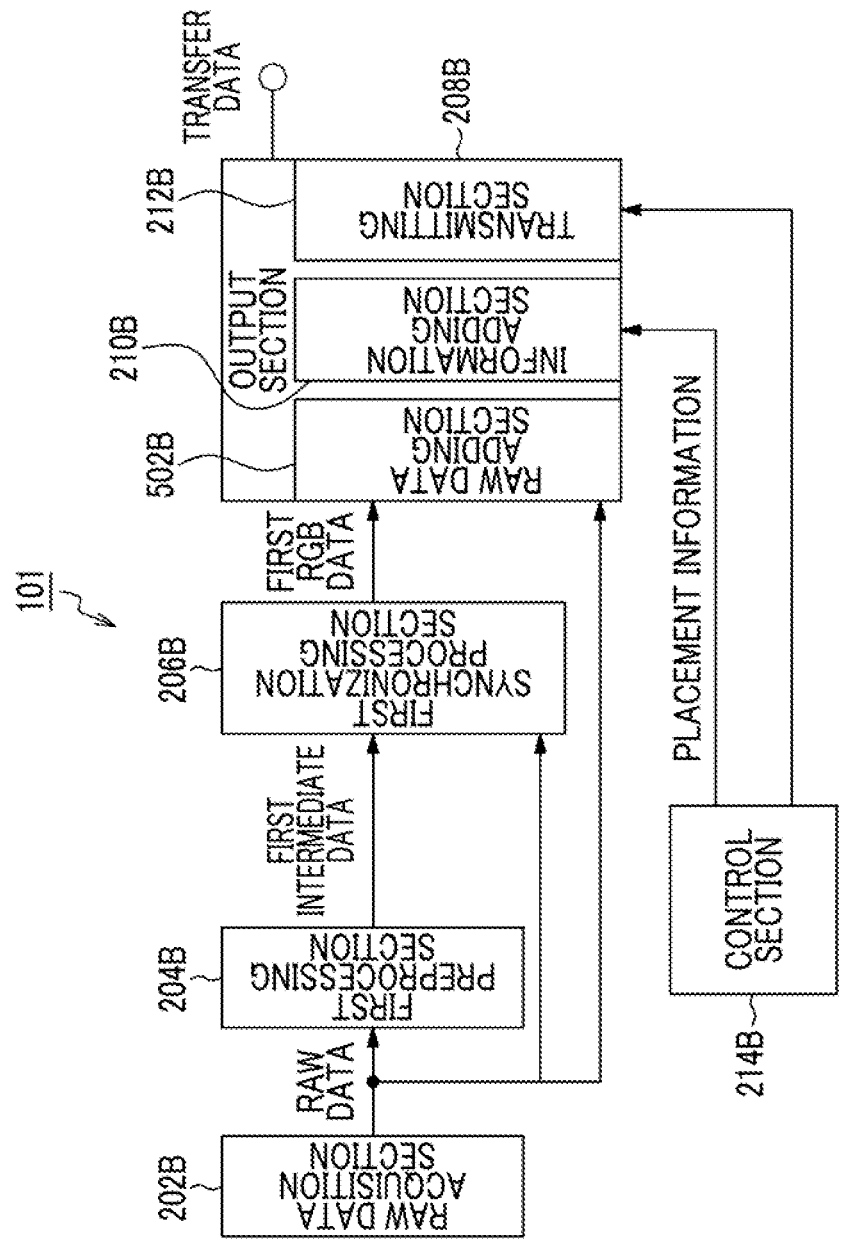
FIG. 30 is a functional block diagram illustrating a transmitting-side device according to a seventh embodiment of the present invention.

FIG. 30 is a functional block diagram illustrating a transmitting-side device 101 according to a seventh embodiment of the present invention. Meanwhile, common components with respect to those in the fifth embodiment (see FIG. 20) are denoted by the same reference numerals and signs, and thus the detailed description thereof will not be given.

The seventh embodiment is different from the fifth embodiment, in that the RAW data is separately output in the transmitting-side device 101, and that the data is used in the processing of the first receiving-side device 102.

The transmitting-side device 101 according to the seventh embodiment of the present invention shown in FIG. 30 is different from the transmitting-side device 101 according to the fifth embodiment shown in FIG. 20, in that a RAW data adding section 502B is present in FIG. 30. In the RAW data adding section 502B, the RAW data obtained in the RAW data acquisition section 202B is added to the first three-plane color data.

The flow of processing operations which are performed in the transmitting device according to the seventh embodiment is basically the same as the flow shown in FIG. 21, the detailed description thereof will not be given.

Figure 31:
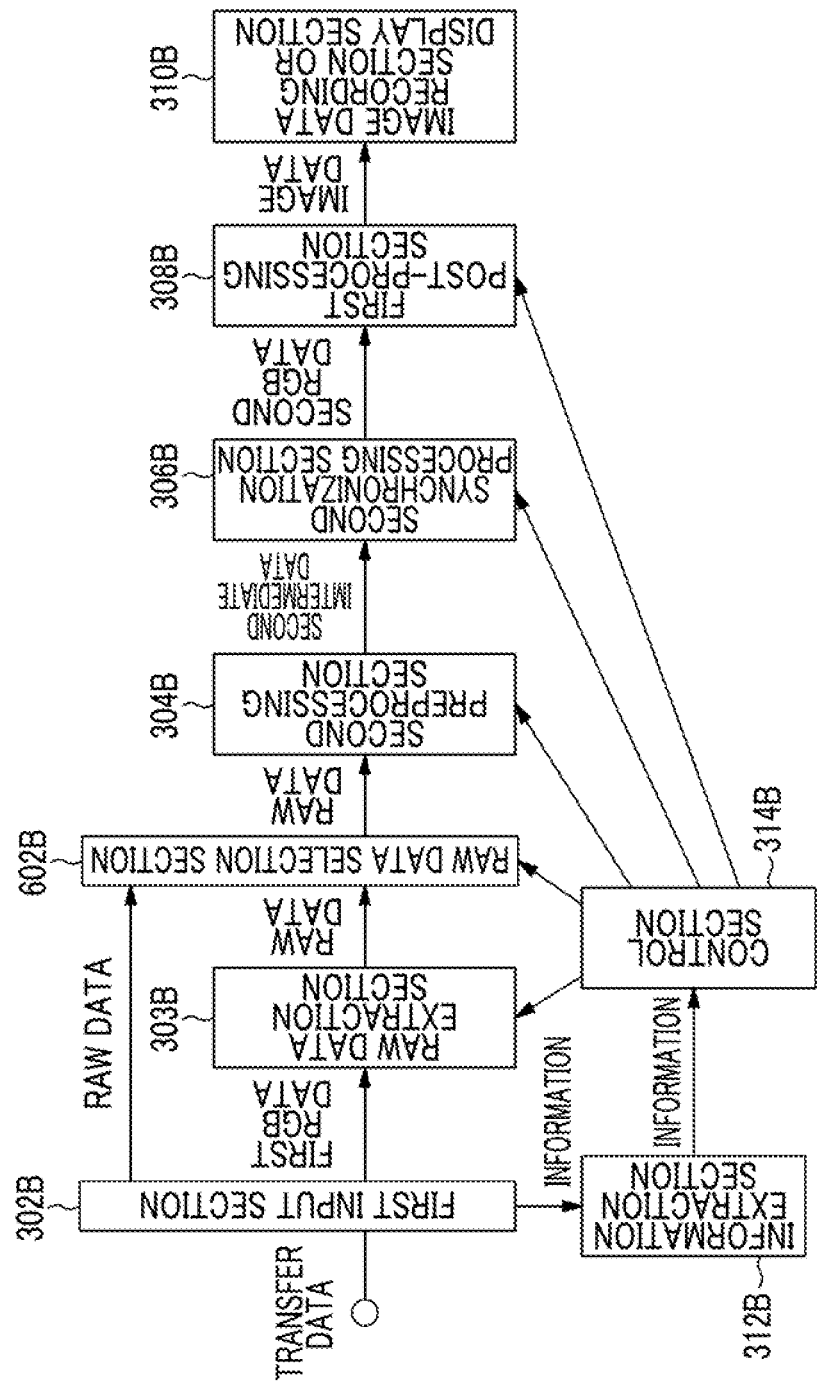
FIG. 31 is a functional block diagram illustrating a first receiving-side device according to the seventh embodiment of the present invention.

FIG. 31 is a functional block diagram illustrating a first receiving-side device 102 according to the seventh embodiment. Meanwhile, common components with respect to those in FIG. 22 which is the functional block diagram of the first receiving-side device according to the fifth embodiment are denoted by the same reference numerals and signs, and thus the detailed description thereof will not be given.

The functional block diagram of the first receiving-side device 102 according to the seventh embodiment shown in FIG. 31 is different from the functional block diagram of the first receiving-side device 102 according to the fifth embodiment shown in FIG. 22, in that a RAW data selection section 602B is present. In the RAW data selection section 602B, the RAW data which is sent from the first input section 302B or the RAW data which is generated in the RAW data extraction section 303B is selected. The RAW data which is selected in the RAW data selection section 602B is sent to the second preprocessing section 304B.

Figure 32:
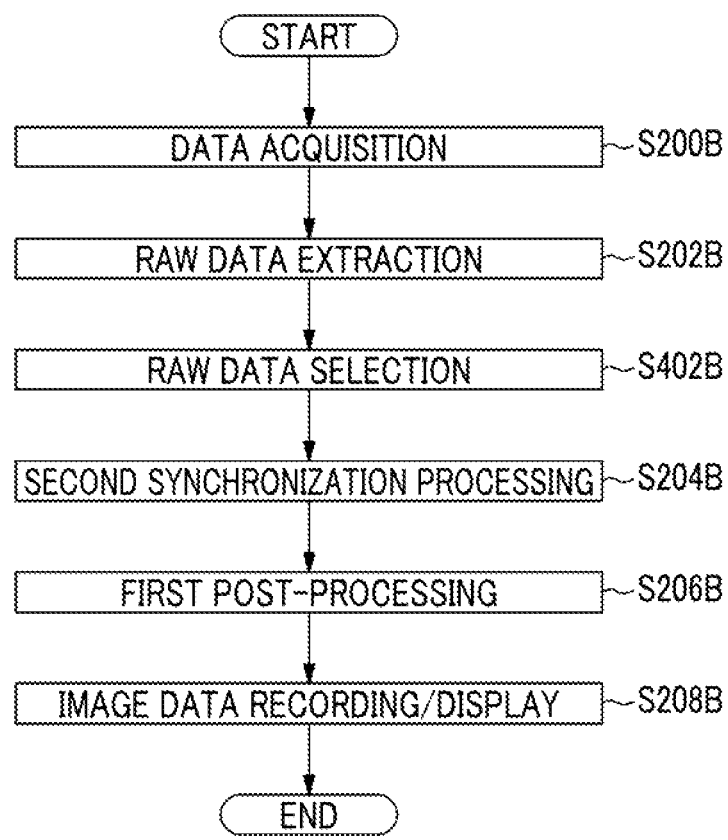
FIG. 32 is a flow diagram illustrating a processing procedure of the first receiving-side device according to the seventh embodiment of the present invention.

FIG. 32 is a flow diagram illustrating operation processing of the first receiving-side device 102 according to the seventh embodiment. Meanwhile, common processes with respect to those in the flow diagram illustrating the operation processing of the transmitting-side device 101 according to the fifth embodiment shown in FIG. 23 are denoted by the same step numbers, and thus the detailed description thereof will not be given.

The operation processing of the first receiving-side device 102 according to the seventh embodiment shown in FIG. 32 is different from the operation processing of the receiving-side device 102 according to the first embodiment shown in FIG. 23, in that processing of RAW data selection (step S402B) is added, and that the first preprocessing is not present. The RAW data selection (step S402B) refers to selection of the RAW data which is sent from the transmitting-side device 101 or the RAW data which is obtained by the restoration processing. The selected RAW data is sent to the second synchronization processing (step S204B).

A second receiving-side device 103 according to the seventh embodiment has the same configuration and flow of processing operations of the device as those of the second receiving-side device 103 according to the first embodiment (see FIGS. 6 and 7).

In the seventh embodiment, particularly, in the processing of the output section 208B of the transmitting-side device 101, the three-plane color data, the placement information, and the RAW data are output. Thereby, the number of, options of processing capable of being performed in the first receiving-side device 102 increases, and thus it is possible to make full use of the image processing performance of the first receiving-side device 102, and to cope with a new color filter array.

Eighth Embodiment

Figure 33:
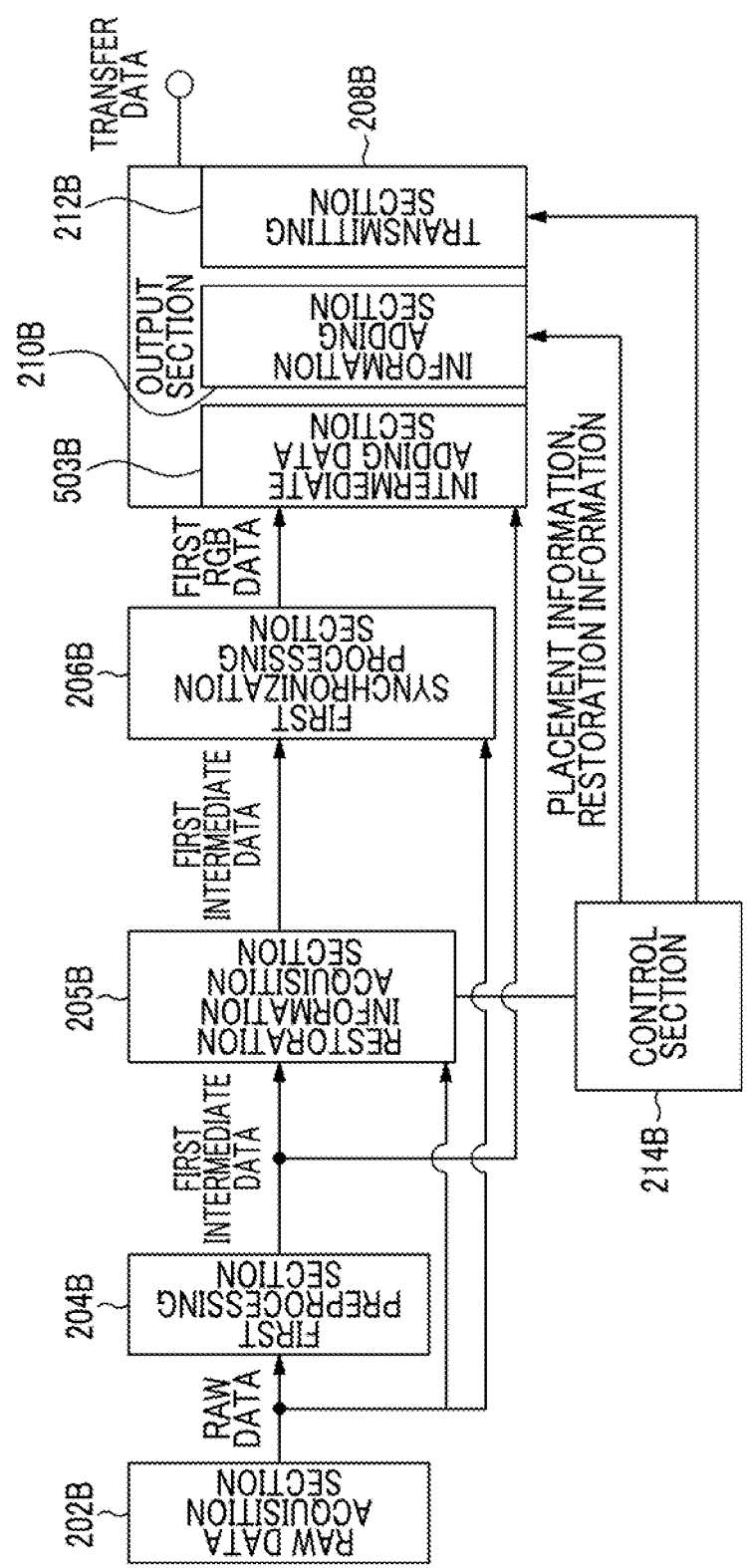
FIG. 33 is a functional block diagram illustrating a transmitting-side device according to an eighth embodiment of the present invention.

FIG. 33 is a functional block diagram illustrating a transmitting-side device 101 according to an eighth embodiment of the present invention. Meanwhile, common components with respect to those, in the eighth embodiment are denoted by the same reference numerals and signs, and thus the detailed description thereof will not be given.

The eighth embodiment is different from the sixth embodiment, in that the intermediate data is separately output in the transmitting-side device 101, and that the data is used in the processing of the first receiving-side device 102.

The transmitting-side device 101 according to the eighth embodiment shown in FIG. 33 is different from the transmitting-side device 101 according to the sixth embodiment shown in FIG. 24, in that the first intermediate data generated in the first preprocessing section 204B is sent to the intermediate data adding section 503B, and is added to the first three-plane color data.

The processing flow which is performed in the transmitting device according to the eighth embodiment is basically the same as the processing flow of FIG. 25, and thus the detailed description thereof will not be given.

Figure 34:
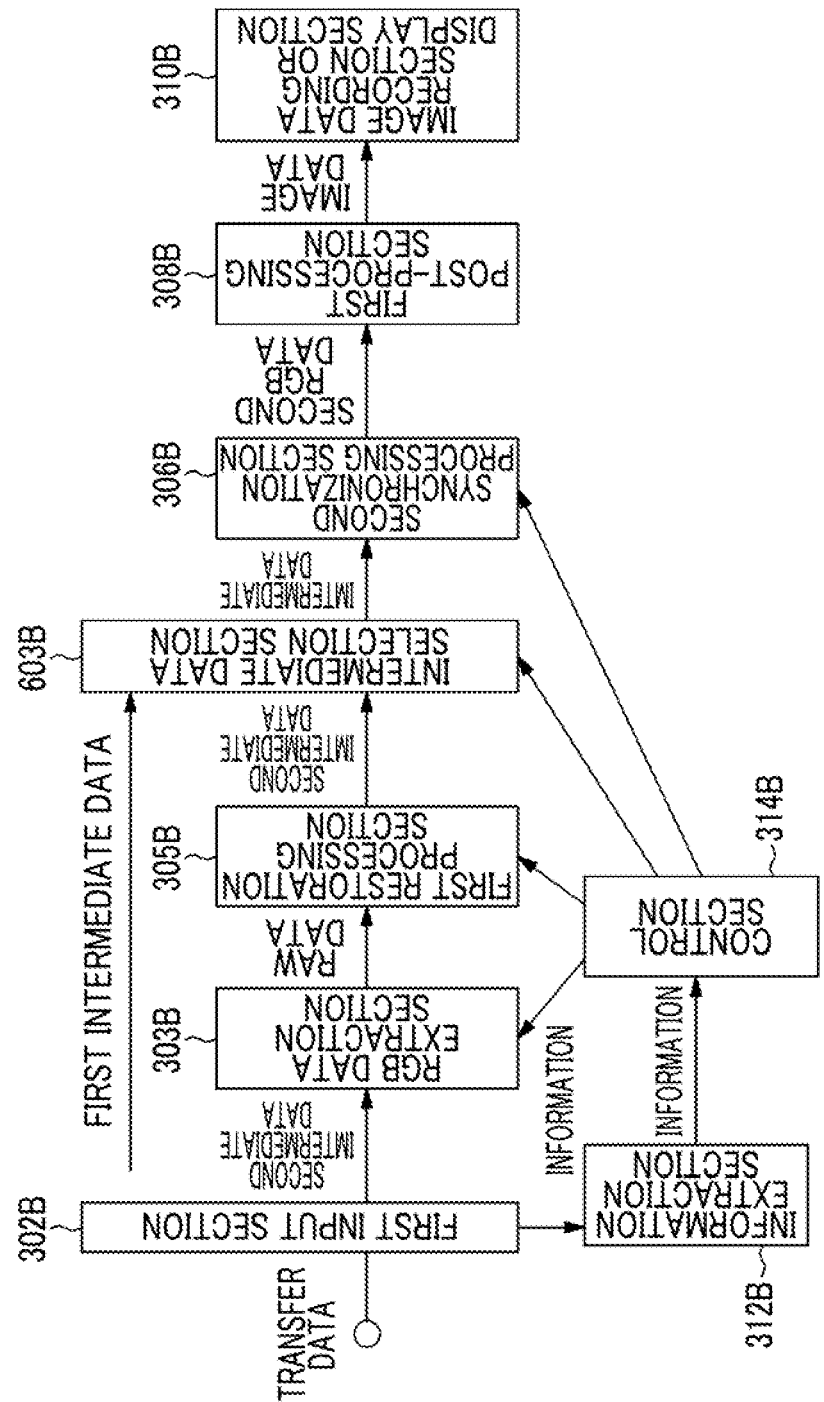
FIG. 34 is a functional block diagram illustrating a first receiving-side device according to the eighth embodiment of the present invention.

FIG. 34 is a functional block diagram illustrating a first receiving-side device 102 according to the eighth embodiment. Meanwhile, common components with respect to those in the sixth embodiment shown in FIG. 26 are denoted by the same reference numerals and signs, and thus the detailed description thereof will not be given.

The functional block diagram of the first receiving-side device 102 according to the eighth embodiment shown in FIG. 34 is different from the functional block diagram of the first receiving-side device 102 according to the sixth embodiment shown in FIG. 26, in that an intermediate data selection section 603B is present. In the intermediate data selection section 603B, the first intermediate data which is sent from the first input section 302B or the second intermediate data which is generated in the first restoration processing section 305B is selected. The intermediate data which is selected in the intermediate data selection section 603B is sent to the second synchronization processing section 306B.

Figure 35:
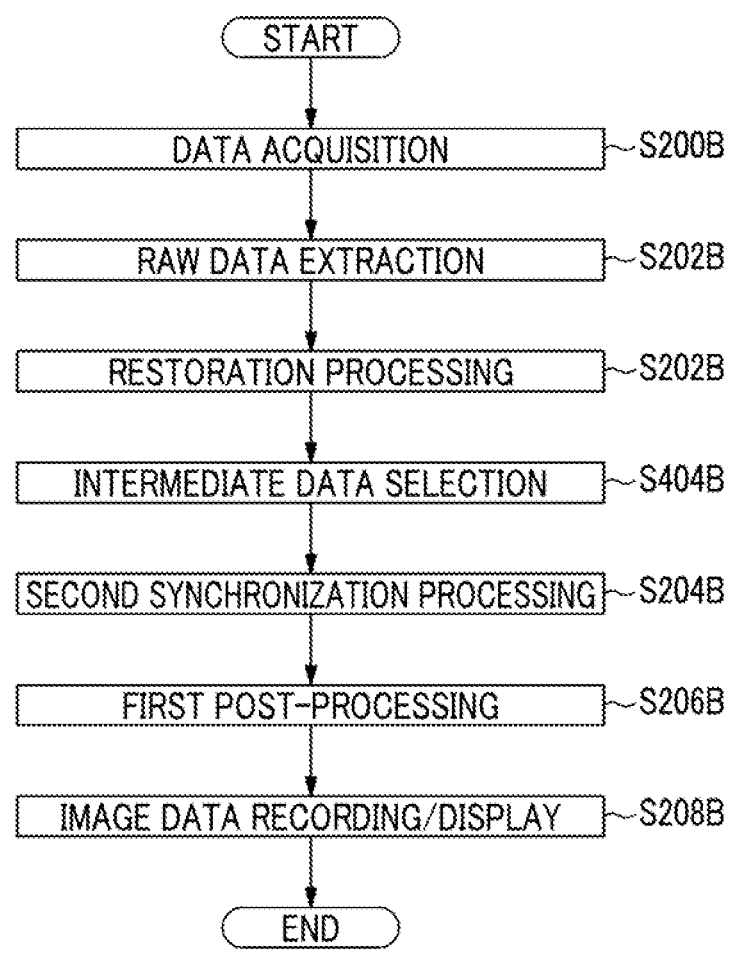
FIG. 35 is a flow diagram illustrating a processing procedure of the first receiving-side device according to the eighth embodiment of the present invention.

FIG. 35 is a flow diagram illustrating operation processing of the first receiving-side device 102 according to the eighth embodiment. Meanwhile, common processes with respect to those in the flow diagram illustrating the operation processing of the transmitting-side device 101 according to the first embodiment shown in FIG. 27 are denoted by the same step numbers, and thus the detailed description thereof will not be given.

The operation processing of the first receiving-side device 102 according to the eighth embodiment shown in FIG. 35 different from the operation processing of the receiving-side device 102 according to the sixth embodiment shown in FIG. 27, in that processing of intermediate data selection (step. S404B) is added. The intermediate data selection refers to selection of the first intermediate data which is sent from the transmitting-side device 101 or the second intermediate data which is generated in the first restoration processing. The selected intermediate data is sent so as to be subject to the second synchronization processing (step S204B).

A second receiving-side device 103 according to the eighth embodiment has the same configuration and flow of processing operations of the device as those of the second receiving-side device 103 according to the sixth embodiment (see FIGS. 28 and 29), and thus the detailed description thereof will not be given.

In the eighth embodiment, particularly, in the processing of the output section 208B of the transmitting-side device 101, the three-plane color data, the placement information, and the intermediate data are output. Thereby, the number of options of processing capable of being performed in the first receiving-side device 102 increases, and thus it is possible to make full use of the image processing performance of the first receiving-side device 102, and to cope with a new color filter array.

Ninth Embodiment

An image processing system 100 according to a ninth embodiment of the present invention will be described below. The ninth embodiment is implemented more specifically than the second embodiment, in that information acquired by restoration information acquisition unit is difference data between the RAW data and the intermediate data. That is, in the ninth embodiment, information acquired by the restoration information acquisition section 504A in the transmitting-side device 101 (see FIG. 8) is difference data between the RAW data and the intermediate data. The difference data can be acquired by comparing the RAW data with the intermediate data. Conversion from the intermediate data to the RAW data is performed by the difference data in the restoration processing section 602A (see FIG. 10) in the first receiving-side device 102.

In the ninth embodiment, particularly, the difference data between the RAW data and the intermediate data is acquired by the processing of the restoration information acquisition section 205B of the transmitting-side device 101. Thereby, the restoration processing (restoration processing section 602A) performed in the first receiving-side device 102 can be efficiently performed, and thus it is possible to make full use of the image processing performance of the first receiving-side device 102, and to cope with a new color filter array.

In addition, the image processing system 100 according to the ninth embodiment of the present invention will be described below. The ninth embodiment is implemented more specifically than the second embodiment, in that the information acquired by the restoration information acquisition unit is a processing content of preprocessing. That is in the ninth embodiment, the information acquired by the restoration information acquisition section 504A in the transmitting-side device 101 (see FIG. 8) is data of the processing content of preprocessing. The data of the processing content of preprocessing is used, and thus conversion from the intermediate data to RAW data is performed in the restoration processing section 602A (see FIG. 10) in the first receiving-side device 102.

In addition, the image processing system 100 according to the ninth embodiment of the present invention will be described below. In the ninth embodiment, particularly, the processing content of preprocessing is acquired by the processing of the restoration information acquisition section 205B of the transmitting-side device 101. Thereby, the restoration processing (restoration processing section 602A) performed in the first receiving-side device 102 can be efficiently performed, and thus it is possible to make full use of the image processing performance of the first receiving-side device 102, and to cope with a new color filter array.

The image processing system 100 according to the ninth embodiment of the present invention will be described below. The ninth embodiment is implemented more specifically than the sixth embodiment, in that the information acquired by the restoration information acquisition unit is difference data between the RAW data and the intermediate data. That is, in the ninth embodiment, the information acquired by the restoration information acquisition section 205B in the transmitting-side device 101 (see FIG. 24) is difference data between the RAW data and the intermediate data. The difference data can be acquired by comparing the RAW data with the intermediate data. The intermediate data is generated from the RAW data by the difference data, in the restoration processing section 305B (see FIG. 26) of the first receiving-side device 102, and the second restoration processing section 403B of the second receiving-side device 103.

In the ninth embodiment, particularly, the difference data between the RAW data and the intermediate data is acquired by the processing of the restoration information acquisition section 205B of the transmitting-side device 101. Thereby, processes of the first restoration processing section (305B) and the second restoration processing section (403B) which are performed in the first and second receiving-side devices 102 and 103 can be efficiently performed, and thus it is possible to make full use of the image processing performance of the first receiving-side device 102, and to cope with a new color filter array.

The image processing system 100 according to the ninth embodiment of the present invention will be described below. The ninth embodiment is implemented more specifically than the sixth embodiment, in that the information acquired by the restoration information acquisition unit is a processing content of the first preprocessing. That is, in the ninth embodiment, the information acquired by the restoration information acquisition section 205B of the transmitting-side device 101 (see FIG. 24) is a processing content of the first preprocessing. The intermediate data is generated from the RAW data by the processing content, in the restoration processing section 305B (see FIG. 26) in the first receiving-side device 102, and the second restoration processing section 403B in the second receiving-side device 103.

In the ninth embodiment, particularly, the processing content of preprocessing is acquired by the processing of the restoration information acquisition section 205B of the transmitting-side device 101. Thereby, processes of the first restoration processing section (305B) and the second restoration processing section (403B) which are performed in the first and second receiving-side devices 102 and 103 can be efficiently performed, and thus it is possible to make full use of the image processing performance of the first receiving-side device 102, and to cope with a new color filter array.

Tenth Embodiment

Figure 36:
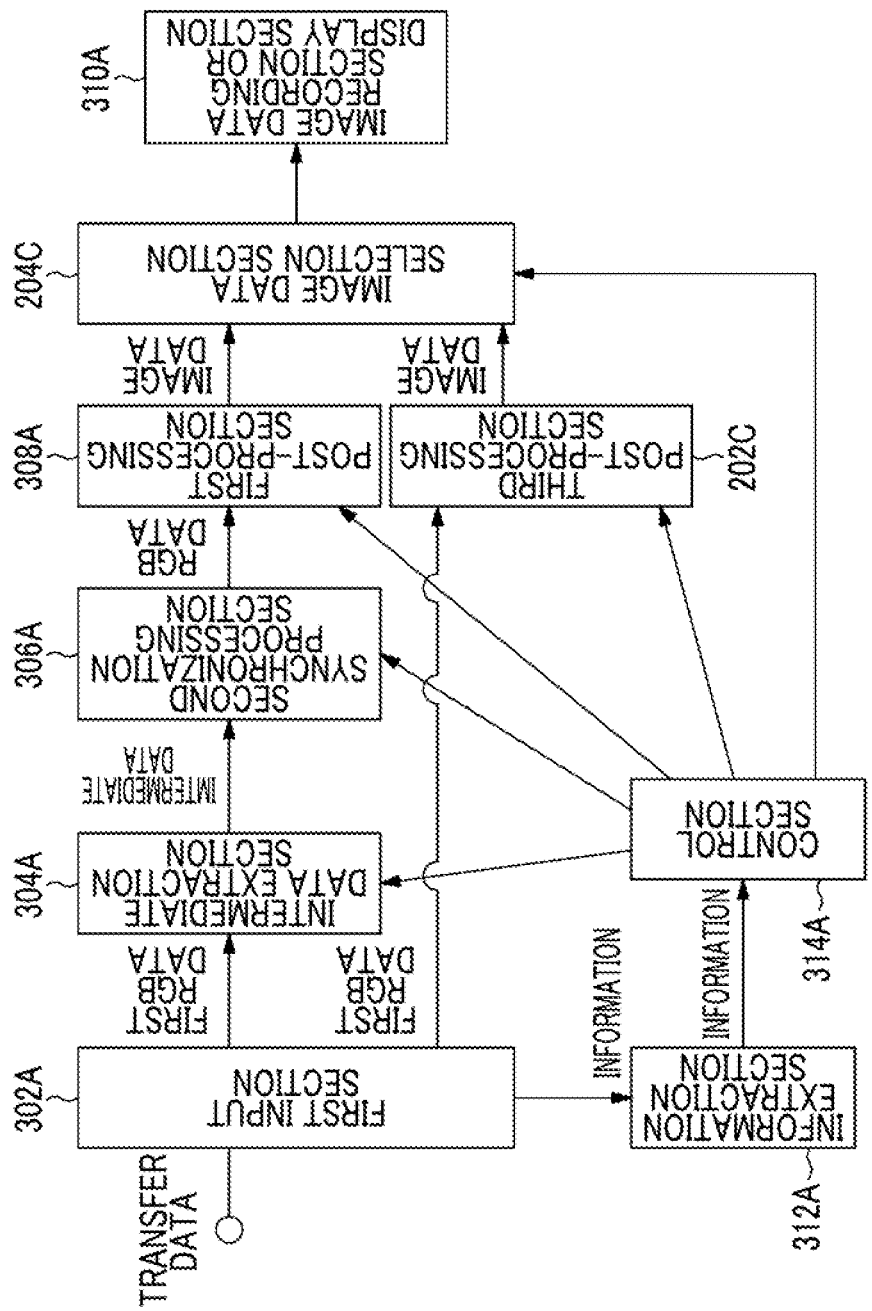
FIG. 36 is a functional block diagram illustrating a first receiving-side device according to a tenth embodiment of the present invention.

FIG. 36 is a functional block diagram illustrating a first receiving-side device 102 in an image processing system 100 according to a thirteenth embodiment of the present invention. Meanwhile, common components with respect to those in the first embodiment are denoted by the same reference numerals and signs, and thus the detailed description thereof will not be given.

The functional block diagram of the first receiving-side device 102 shown in FIG. 36 is different from the functional block diagram of the first receiving-side device 102 shown in FIG. 4, in that a third post-processing section 202C and an image data selection section 204C are added.

The third post-processing section 202C receives the first three-plane color data from the first input section 302A. In the third post-processing section 202C, post-processing is performed on the first three-plane color data which is obtained. The post-processing as used herein is substantially the same as the first post-processing.

In the image data selection section 204C, image data for recording or display which is obtained from the first post-processing section 308A, or image data for recording or display which is obtained from the third post-processing section 202C is selected. The data which is selected in the image data selection section 204C is sent to the image data recording section or the display section 310B.

In the tenth embodiment, particularly, two-system image processing is performed by the processing of the third post-processing section 202C and the image data selection section 204C of the first receiving-side device 102, and the result is selected. Thereby, the number of options increases in the processing of the first receiving-side device 102, and thus it is possible to make full use of the image processing performance of the first receiving-side device 102, and to cope with a new color filter array.

Eleventh Embodiment

Figure 37:
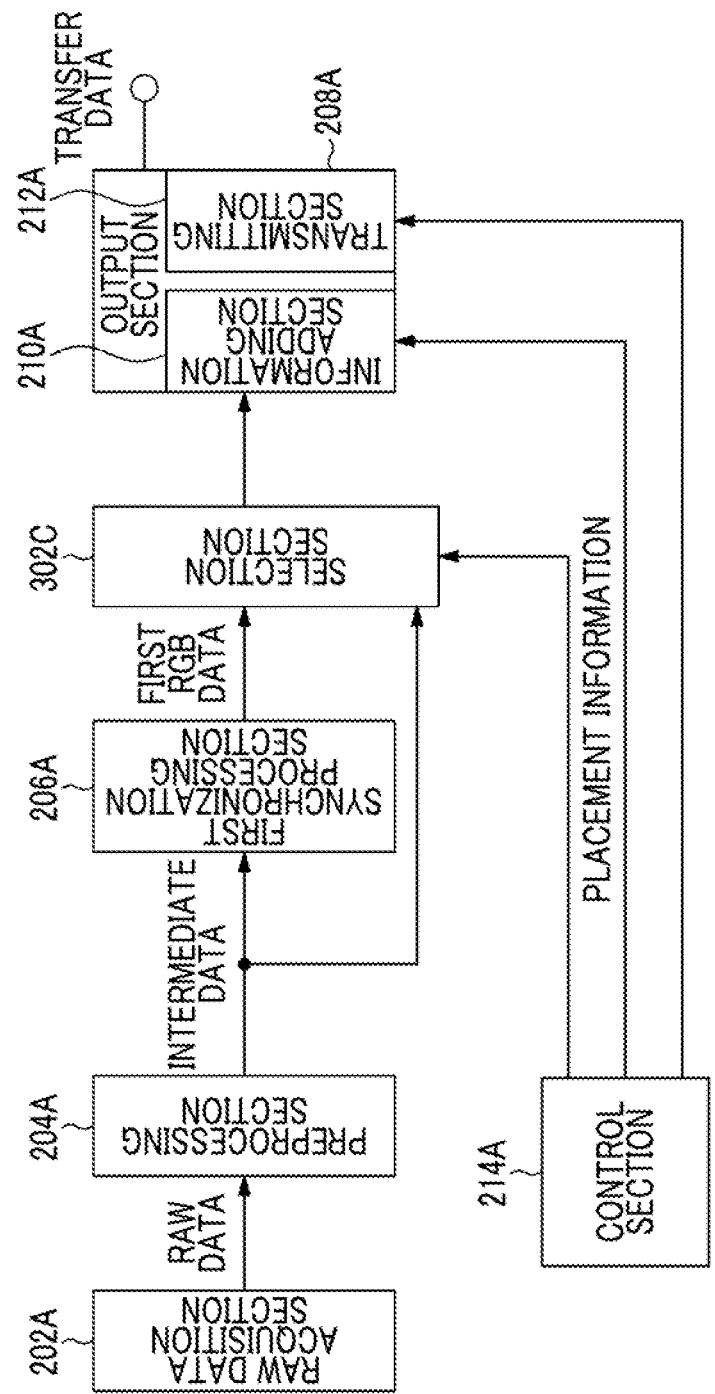
FIG. 37 is a functional block diagram illustrating a transmitting-side device according to an eleventh embodiment of the present invention.

FIG. 37 is a functional block diagram illustrating a transmitting-side device 101 in an image processing system 100 according to an eleventh embodiment of the present invention. Meanwhile, common components with respect to those in the third embodiment are denoted by the same reference numerals and signs, and thus the detailed description thereof will not be given.

The functional block diagram of the transmitting-side device 101 shown in FIG. 37 is different from the functional block diagram of the transmitting-side device 101 shown in FIG. 12, in that a selection section 302C is present, and that the intermediate data adding section 702A is not present. In the selection section 302C, the first three-plane color data which is obtained from the first synchronization processing section 206A, or the intermediate data which is obtained from the preprocessing section 204A is selected. Thereafter, the selected data is sent to the output section 208A. The eleventh embodiment can be appropriately applied to another embodiment. For example, the transmitting-side device 101 of the fourth embodiment can be provided with the selection section 302C as mentioned above (twelfth embodiment), the transmitting-side device 101 of the fifth embodiment can be provided with the selection section 302C (thirteenth embodiment), and the transmitting-side device 101 of the sixth embodiment can be provided with the selection section 302C (fourteenth embodiment).

In the eleventh to fourteenth embodiments, particularly, the transmitting-side device 101 is provided with the selection section 302C (in the case of the fourteenth embodiment), thereby allowing information which is output in the transmitting-side device 101 to be selected. Thereby, it is possible to reduce output data of the transmitting-side device 101.

Fifteenth Embodiment

Figure 38:
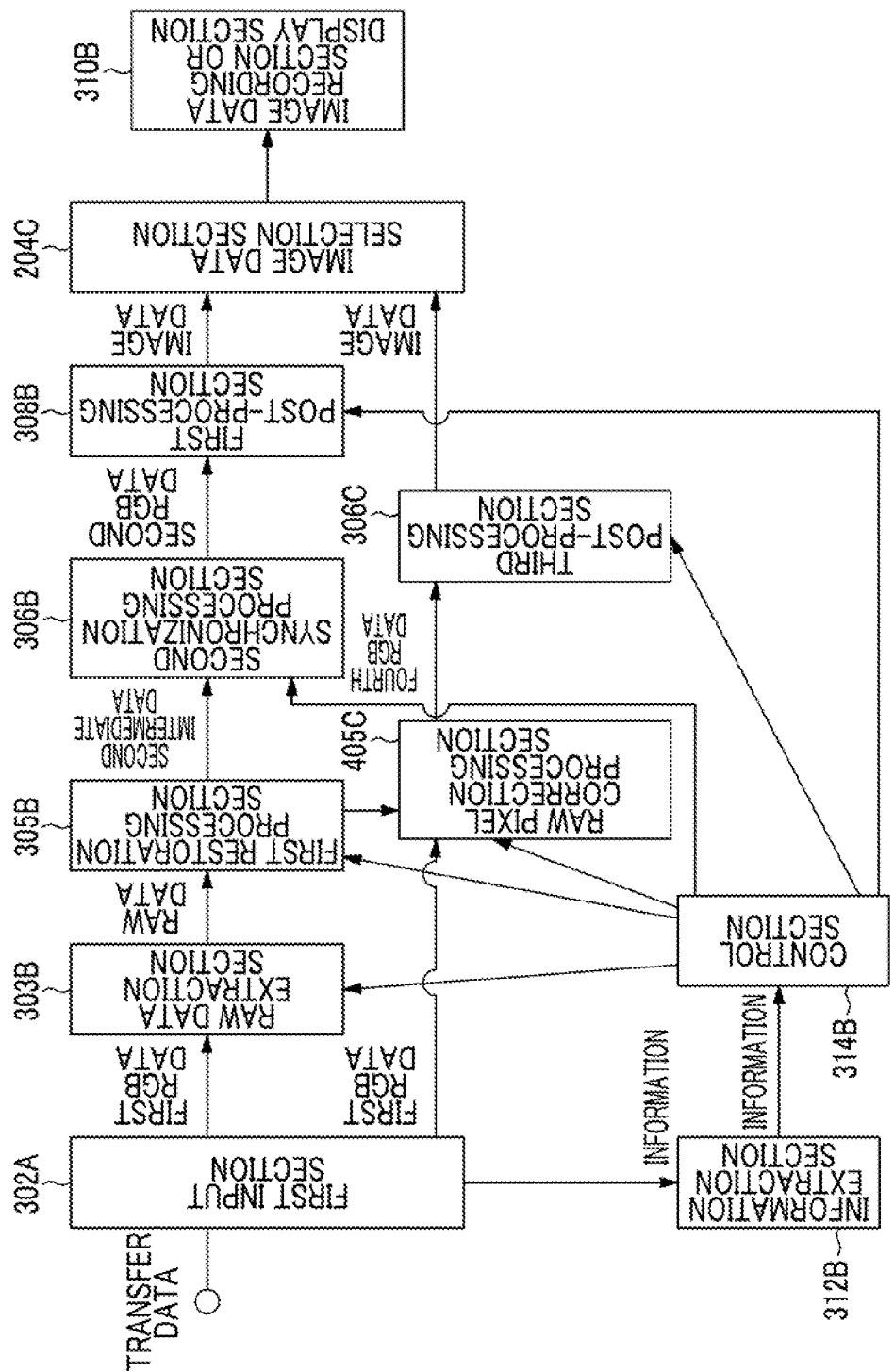
FIG. 38 is a functional block diagram illustrating a transmitting-side device according to a fifteenth embodiment of the present invention.

FIG. 38 shows a first receiving-side device 102 in an image processing system 100 according to a fifteenth embodiment of the present invention. The first receiving-side device 102 shown in FIG. 38 is different from the first receiving-side device 102 shown in FIG. 26, in that a RAW pixel correction processing section 405C, a third post-processing section 306C, and an image data selection section 204C are included.

The RAW pixel correction processing section 405C performs processing of replacing the pixel of the RAW data with the intermediate data, in the first three-plane color data which is sent from the transmitting-side device 101. That is, the RAW pixel correction processing section 405C performs processing of replacing data (pixel) (shaded places in FIGS. 1D(b) to 1D(d)), having a color in the RAW data, which is used in the first three-plane color data as it is, with the intermediate data which is obtained in the first restoration processing section (305B). Fourth three-plane color data which is obtained by performing the RAW pixel correction processing is sent to the third post-processing section 306C.

In the third post-processing section 306C, post-processing is performed on the obtained three-plane color data. The post-processing as used herein is substantially the same as the first post-processing.

In the image data selection section 204C, image data which is obtained from the first post-processing section 308B or, image data which is obtained from the third post-processing section 306C is selected. The selected image data is sent to the image data recording section or the display section 310B.

In the fifteenth embodiment, particularly, the image data is acquired and selected from two systems by the processing of the RAW pixel correction processing section 405C, the third post-processing section 306C, and the image data selection section 204C of the first receiving-side device 102. Thereby, there is room for selection in the image data, and thus it is possible to make full use of the image processing performance of the first receiving-side device 102, and to cope with a new color filter array.

[Device Constituting Image System]

Another embodiment of the present invention includes a transmitting-side device 101 constituting the image processing system 100 of the present invention. In addition, another embodiment of the present invention includes a receiving-side device constituting the image processing system 100 of the present invention. According to this, it is possible to perform appropriate processing on data which is obtained in a new color filter array, and to make full use of the performance of the receiving-side device by reducing the influence of a difference in the performance of the receiving-side device on an image quality.

Meanwhile, the control sections 214A and 214B shown in the drawings represent control in a broadest sense.

In addition, in the control sections 214A and 214B, each section may be automatically controlled on the basis of conditions determined in advance, a user may input conditions to control each section on the basis of the conditions, and the like.

An example of RGB and three-plane color data may be described in the drawings and the specification, but the three-plane color data is not limited to RGB data, and may be data capable of representing an image.

In the selection and the selection section which are described in the drawings and the specification, selection may be performed by a user, but selection may be automatically performed on the basis of conditions given in advance.

As the embodiments of the image capture device of the present invention, a digital camera has been described, but the configuration of the image capture device is not limited thereto. Other image capture devices of the present invention include, for example, a built-in or external camera for a PC, or a portable terminal device having an image capture function as described below.

The portable terminal device which is an embodiment of the image capture device of the present invention includes, for example, a cellular phone, a smartphone, a PDA (Personal Digital Assistants), and a portable game console. Hereinafter, a detailed description will be given by way of an example of a smartphone with reference to the accompanying drawings.

Figure 39:
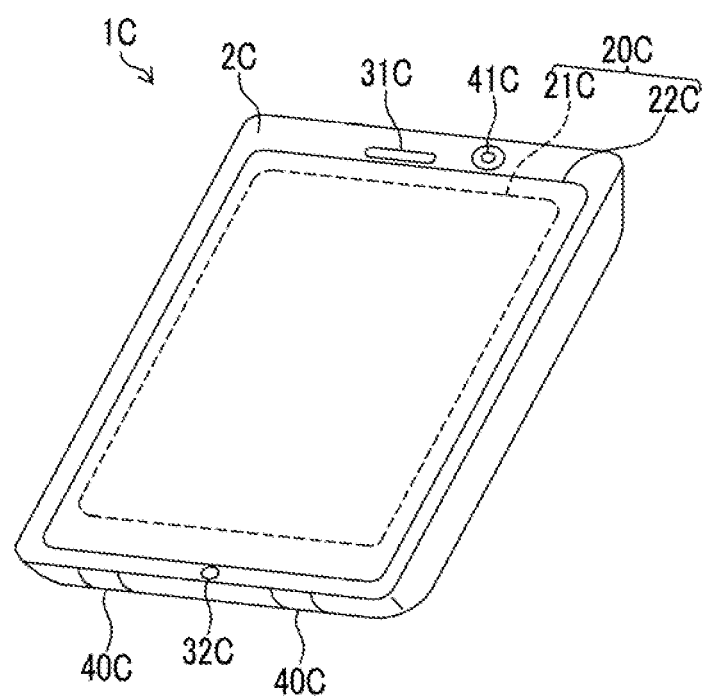
FIG. 39 is a diagram illustrating an embodiment of an image capture device according to the present invention.

FIG. 39 shows an appearance of a smartphone 1C which is an embodiment of the image capture device of the present invention. The smartphone 1C shown in FIG. 39 has a plate-like housing 2C, and includes a display and input section 20C in which a display panel 21C used as a display section and an operating panel 22C used as an input section are integrally formed on one surface of a housing 2C. In addition, such a housing 2C includes a speaker 31C, a microphone 32C, an operating section 40C, and a camera section 41C. Meanwhile, the configuration of the housing 2C is not limited thereto, and can adopt, for example, a configuration in which the display section and the input section are independent of each other, or adopt a configuration having a folding structure or a slide mechanism.

Figure 40:
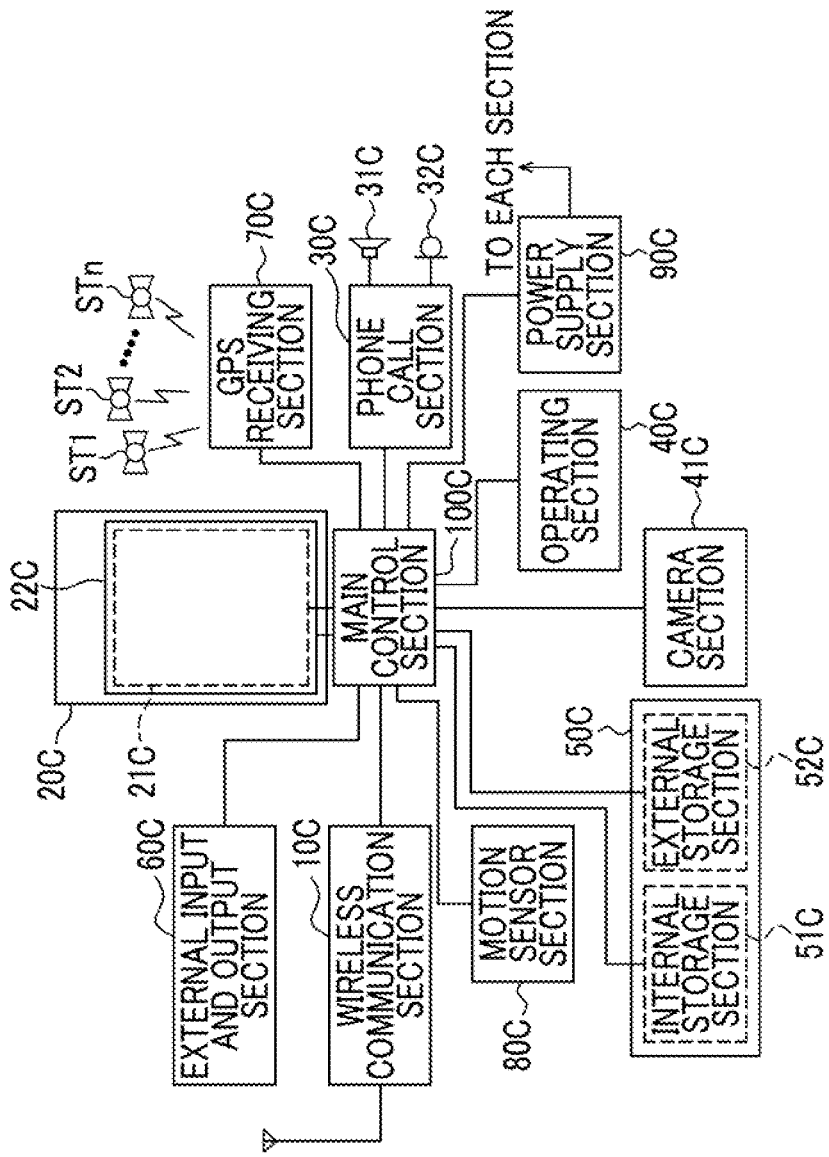
FIG. 40 is a block diagram illustrating a configuration of the image capture device shown in FIG. 39.

FIG. 40 is a block diagram illustrating a configuration of the smartphone 1C shown in FIG. 39, As shown in FIG. 40, the main component of the smartphone includes a wireless communication section 10C, a display and input section 20C, a phone call section 30C, an operating section 40C, a camera section 41C, a storage section 50C, an external input and output section 60C, a GPS (Global Positioning System) receiving section 70C, a motion sensor section 80C, a power supply section 90C, and a main control section 100C. In addition, the main function of the smartphone 1C includes a wireless communication function of performing mobile wireless communication through a base station device BS and a mobile communication network NW.

The wireless communication section 10C performs wireless communication with respect to the base station device BS accommodated in the mobile communication network NW, according to the instructions of the main control section 1000. Using such wireless communication, various file data such as voice data and image data, electronic mail data, and the like are transmitted and received, or Web data, streaming data, and the like are received.

The display and input section 20C is a so-called touch panel that visually transmits information to a user by displaying an image (still image and moving image), character information, and the like through the control of the main control section 100C, and detects a user's operation for the displayed information, and includes the display panel 21C and the operating panel 22C.

The display panel 21C uses an LCD (Liquid Crystal Display), an OELD (Organic Electro-Luminescence Display), and the like as a display device. The operating panel 22C is a device that is placed so as to be capable of being in visual contact with an image displayed on the display surface of the display panel 21C and detects one or a plurality of coordinates selected by a user's finger or a stylus. When such a device is operated by a user's finger or a stylus, a detection signal generated due to the operation is output to the main control section 100C. Next, the main control section 100C detects an operation position (coordinates) on the display panel 21C on the basis of the received detection signal.

As shown in FIG. 39, the display panel 21C and the operating panel 22C of the smartphone 1C illustrated as an embodiment of the image capture device of the present invention are integrally formed to constitute the display and input section 20C, but are arranged so that the operating panel 22C completely covers the display panel 21C. When such an arrangement is adopted, the operating panel 22C may also have a function of detecting a user's operation in a region except for the display panel 21C. In other words, the operating panel 22C may include a detection region (hereinafter, called a display region) for an overlapping portion which overlaps the display panel 21C and a detection region (hereinafter, called a non-display region) for an outer edge portion which does not overlap the display panel 21C other than that.

Meanwhile, the size of the display region and the size of the display panel 21C may be completely identical to each other, but both are not necessarily required to be identical to each other. In addition, the operating panel 22C may include an outer edge portion and two sensitive regions of an inside portion other than that. Further, the width of the outer edge portion is appropriately designed depending on the size of the housing 2C, or the like. Further, a position detection system adopted in the operating panel 22C includes a matrix switch system, a resistance film system, a surface acoustic wave system, an infrared ray system, an electromagnetic induction system, an electrostatic capacitance system, or the like, and any of the systems can also be adopted.

The phone call section 30C includes the speaker 31C and the microphone 32C, and converts a user's voice which is input through the microphone 32C into voice data capable of being processed by the main control section 100C to output the converted data to the main control section 100C, or decodes voice data received by the wireless communication section 10C or the external input and output section 60C to output the decoded data from the speaker 31C. In addition, as shown in FIG. 39, for example, the speaker 31C can be mounted on the same surface as a surface on which the display and input section 20C is provided, and the microphone 32C can be mounted on the lateral side of the housing 2C.

The operating section 40C is a hardware key using a key switch or the like, and accepts instructions from a user. For example, as shown in FIG. 39, the operating section 40C is a push-button type switch, mounted on the lateral side of the housing 2C of the smartphone 1C, which is turned on when the switch is held down by a finger or the like, and is turned off by the restoring force of a spring or the like when the finger is taken off the switch.

The storage section 50C stores control programs and control data of the main control section 100C, application software, address data associated with names, phone numbers and the like of communications parties, data of electronic mails transmitted and received, Web data downloaded by Web browsing, and downloaded content data, and temporarily stores streaming data and the like. In addition, the storage section 50C is constituted by a smartphone built-in internal storage section 51C and an external storage section 52C having a detachable external memory slot. Meanwhile, each of the internal storage section 51C and the external storage section 52C constituting the storage section 50C is realized using a storage medium such as a flash memory type, a hard disk type, a multimedia card micro type, a card type memory (such as, for example, a MicroSD (registered trademark) memory), a RAM (Random Access Memory), a ROM (Read Only Memory), or the like.

The external input and output section 60C serves as an interface with all the external devices which are connected to the smartphone 1C, and is used by being directly or indirectly connected to other external devices through communication (such as, for example, universal serial bus (USB) or IEEE 1394) or a network (such as, for example, the Internet, wireless LAN, Bluetooth (registered trademark), RFID (Radio Frequency Identification), Infrared Data Association (IrDA) (registered trademark), UWB (Ultra Wideband) (registered trademark), or ZigBee (registered trademark)).

External devices which are connected to the smartphone 1C include, for example, a wired or wireless headset, a wired or wireless external charger, a wired or wireless data port, a memory card (Memory card) or a SIM (Subscriber Identity Module Card)/UIM (User Identity Module Card) card which is connected through a card socket, an external audio and video device which is connected through an audio and video I/O (Input/Output) terminal, an external audio and video device which is wirelessly connected, a smartphone which is wired or wirelessly connected, a personal computer which is wired or wirelessly connected, a PDA which is wired or wirelessly connected, a personal computer which is wired or wirelessly connected, earphones, and the like. The external input and output section can transmit data transmitted from such an external device to each component inside the smartphone 1C, and can transmit data inside the smartphone 1C to the external device.

The GPS receiving section 70C receives GPS signals which are transmitted from GPS satellites ST1 to STn according to the instructions of the main control section 100C, executes positioning arithmetic operation processing based on a plurality of received GPS signals, and detects a position which is composed of the latitude, longitude, and altitude of the smartphone 1C. When position information can be acquired from the wireless communication section 10C or the external input and output section 60C (for example, wireless LAN), the GPS receiving section 70C can also detect a position using the position information.

The motion sensor section 80C includes, for example, a triaxial acceleration sensor or the like, and detects the physical motion of the smartphone 1C according to the instructions of the main control section 100C. The moving direction or acceleration of the smartphone 1C is detected by detecting the physical motion of the smartphone 1C Such a detection result is output to the main control section 100C.

The power supply section 90C supplies power which is stored in a battery (not shown) to each section of the smartphone 1C, according to the instructions of the main control section 100C.

The main control section 100C includes a microprocessor, operates according to a control program or control data which is stored by the storage section 50C, and collectively controls each section of the smartphone 1C. In addition, the main control section 100C has a mobile communication control function of controlling each section of a communication system and an application processing function in order to perform voice communication or data communication through the wireless communication section 10C.

The application processing function is realized by the main control section 100C operating according to application software which is stored by the storage section 50C, The application processing function includes, for example, an infrared communication function of controlling the external input and output section 60C in order to perform data communication with a counter device, an electronic mail function of transmitting and receiving an electronic mail, a Web browsing function of browsing a Web page, or the like.

In addition, the main control section 100C has an image processing function of displaying an image on the display and input section 20C on the basis of image data (data of a still image or a moving image) such as received data or downloaded streaming data. The image processing function refers to a function of displaying an image on the display and input section 20C by the main control section 100C decoding the above-mentioned image data and performing image processing on such a decoding result.

Further, the main control section 100C executes display control for the display panel 21C and operation detection control for detecting a user's operation through the operating section 40C and the operating panel 22C.

By the display control being executed, the main control section 100C displays an icon for starting up application software or a software key such as a scroll bar, or displays a window for creating an electronic mail. Meanwhile, the scroll bar refers to a software key for accepting an instruction to move a display portion of an image with respect to a large image or the like which does not completely fall within the display region of the display panel 21C.

In addition, by the operation detection control being executed, the main control section 1000 detects a user's operation through the operating section 40C, accepts an operation for the above icon or an input of a character string for an entry field of the above window through the operating panel 22C, or accepts a scroll request for a display image through the scroll bar.

Further, by the operation detection control being executed, the main control section 100C determines whether the operation position for the operating panel 22C is the overlapping portion (display region) which overlaps the display panel 21C or the outer edge portion (non-display region) which does not overlap the display panel 21C other than that, and has a touch panel control function of controlling the sensitive region of the operating panel 22C and the display position of the software key.

In addition, the main control section 100C can also detect a gesture operation for the operating panel 22C to execute a preset function in accordance with the detected gesture operation. The gesture operation unit an operation of drawing a locus using a finger or the like, simultaneously designating a plurality of positions, or drawing a locus with respect to at least one position from the plurality of positions by a combination thereof, rather than a simple touch operation of the related art.

The camera section 41C is a digital camera that performs electronic image capture using an image pickup element such as CMOS (Complementary Metal Oxide Semiconductor), a CCD (Charge-Coupled Device), or the like. In addition, the camera section 41C converts image data obtained by image pickup into compressed image data such as, for example, JPEG (Joint Photographic coding Experts Group) through the control of the main control section 100C, and can record the converted data in the storage section 50C, or output the data through the input and output section 60C or the wireless communication section 10C. In the smartphone 1C shown in FIG. 39, the camera section 41C is mounted on the same surface as the display and input section 20C, but the mounting position of the camera section 41C is not limited thereto, and may be mounted on the back surface of the display and input section 20C, or a plurality of camera sections 41C may be mounted thereon. Meanwhile, when a plurality of camera sections 41C are mounted, image capture can be performed individually by switching between the camera sections 41C for image capture, or image capture can also be performed using the plurality of camera section 41C simultaneously.

In addition, the camera section 41C can use various functions of the smartphone 1C. For example, an image acquired in the camera section 41C can be displayed on the display panel 21C, or the image of the camera section 41C can be used as one of the operation inputs of the operating panel 22C. In addition, when the GPS receiving section 70C detects a position, the position can also be detected referring to the image from the camera section 41C. Further, referring to the image from the camera section 41C, the optical axis direction of the camera section 41C of the smartphone 1C can be determined without using a triaxial acceleration sensor, or in conjunction with the triaxial acceleration sensor, and the current usage environment can also be determined. The image from the camera section 41C can also be, of course, used within application software.

Besides, position information acquired by the GPS receiving section 70C, voice information (text information may be formed by the main control section or the like performing voice-to-text conversion) acquired by the microphone 32C, posture information acquired by the motion sensor section 80C, or the like can be added to image data of a still image or a moving image and be recorded in the storage section 50C, or can also be output through the input and output section 60C or the wireless communication section 10C.

Although the embodiments of the image processing system, the transmitting-side device and the receiving-side device according to the present invention have been described, the disclosure as described herein is merely illustrative of the embodiments of the present invention, and is not limited thereto. In addition, in the above description, sections as used herein also include means conceptually.

What is claimed is:

1. An image processing system comprising:
a transmitting-side device; and
at least one receiving-side device of a first receiving-side device compatible with RAW development and a second receiving-side device incompatible with RAW development,
wherein the transmitting-side device includes at least one processor configured to:
acquire unprocessed RAW data corresponding to a predetermined color filter array from a single-plate color image pickup element having color filters of the color filter array arranged on a plurality of pixels which are arrayed two-dimensionally,
generate intermediate data before synchronization processing by performing preprocessing on the RAW data,
process synchronization of the intermediate data, and generate first three-plane color data, and
add placement information after synchronization processing for specifying a pixel position of the intermediate data of each piece of color data to the first three-plane color data, and output the resultant data,
the first receiving-side device includes at least one processor configured to:

input the first three-plane color data and the placement information, extract the intermediate data from the first three-plane color data on the basis of the placement information, process synchronization of the extracted intermediate data, and generate second three-plane color data, and generate image data for recording or image data for display by performing processing after synchronization processing on the second three-plane color data, and the second receiving-side device includes at least one processor configured to:

input the first three-plane color data, and generate image data for recording or image data for display by performing processing after synchronization processing on the first three-plane color data which is input.

2. The image processing system according to claim 1, wherein the at least one processor of the transmitting-side device adds the placement information and the intermediate data to the first three-plane color data, and outputs the resultant data, inputs the first three-plane color data, the placement information and the intermediate data to the input unit of the first receiving-side device, selects the intermediate data which is sent from the transmitting-side device, or the extracted intermediate data, and performs synchronization processing on the selected intermediate data, and generates the second three-plane color data.

3. The image processing system according to claim 2, wherein the at least one processor of the transmitting-side device is configured to:

select at least a piece of data of the first three-plane color data and the intermediate data, add the placement information to the at least a piece of selected data, and output the resultant data.

4. The image processing system according to claim 1, wherein the at least one processor of first receiving-side device is configured to:

generate image data for recording or image data for display by performing processing after synchronization processing on the first three-plane color data, and select the image data for recording or the image data for display which is obtained by performing processing after synchronization processing on the second three-plane color data, or the image data for recording or the image data for display which is obtained by performing processing after synchronization processing on the first three-plane color data.

5. The image processing system according to claim 1, wherein the intermediate data is original data in the first synchronization processing.

* * * * *